United States Patent
Song et al.

(10) Patent No.: US 9,743,085 B2
(45) Date of Patent: *Aug. 22, 2017

(54) VIDEO ENCODING/DECODING APPARATUS AND METHOD USING BATCH MODE TOGETHER WITH SKIP MODE

(71) Applicant: SK TELECOM CO., LTD., Seoul (KR)

(72) Inventors: Jinhan Song, Seoul (KR); Jeongyeon Lim, Seongnam-si (KR); Joohee Moon, Seoul (KR); Yunglyul Lee, Seoul (KR); Haekwang Kim, Seoul (KR); Byeungwoo Jeon, Seongnam-si (KR); Jongki Han, Seoul (KR); Hyoungmee Park, Suwon-si (KR); Juock Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/231,315

(22) Filed: Aug. 8, 2016

(65) Prior Publication Data

US 2016/0353104 A1 Dec. 1, 2016

Related U.S. Application Data

(63) Continuation of application No. 14/668,501, filed on Mar. 25, 2015, now Pat. No. 9,451,270, which is a
(Continued)

(30) Foreign Application Priority Data

Apr. 16, 2010 (KR) .................. 10-2010-0035450
Apr. 16, 2011 (KR) .................. 10-2011-0035425

(51) Int. Cl.
*H04N 19/159* (2014.01)
*H04N 19/12* (2014.01)
(Continued)

(52) U.S. Cl.
CPC .......... *H04N 19/12* (2014.11); *H04N 19/117* (2014.11); *H04N 19/119* (2014.11);
(Continued)

(58) Field of Classification Search
CPC .... H04N 19/119; H04N 19/12; H04N 19/157; H04N 19/159; H04N 19/176;
(Continued)

(56) References Cited

U.S. PATENT DOCUMENTS

| 8,509,551 B2 | 8/2013 | Moriya et al. | |
| 2008/0049845 A1* | 2/2008 | Liu | H04N 19/176 375/240.27 |

(Continued)

FOREIGN PATENT DOCUMENTS

| CN | 1589023 A | 3/2005 |
| KR | 1020090129926 A | 12/2009 |

(Continued)

OTHER PUBLICATIONS

International Search Report mailed Dec. 28, 2011 for PCT/KR2011/002763.
(Continued)

*Primary Examiner* — William C Vaughn, Jr.
*Assistant Examiner* — Naod Belai
(74) *Attorney, Agent, or Firm* — Hauptman Ham, LLP

(57) ABSTRACT

A video decoding method, includes: reconstructing a syntax corresponding to at least one of a first block, a second block and a third block, wherein the first block is generated by dividing a frame for decoding, the second block corresponds to a unit of a prediction and is generated by dividing the first
(Continued)

block, and the third block corresponds to a unit of transformation and is generated by dividing the first block in a tree structure; and reconstructing a prediction block corresponding to at least one of the first block, the second block and the third block.

6 Claims, 53 Drawing Sheets

Related U.S. Application Data continuation of application No. 13/641,677, filed as application No. PCT/KR2011/002763 on Apr. 18, 2011.

(51) Int. Cl.
| | |
|---|---|
| *H04N 19/176* | (2014.01) |
| *H04N 19/119* | (2014.01) |
| *H04N 19/61* | (2014.01) |
| *H04N 19/96* | (2014.01) |
| *H04N 19/157* | (2014.01) |
| *H04N 19/117* | (2014.01) |
| *H04N 19/139* | (2014.01) |
| *H04N 19/15* | (2014.01) |
| *H04N 19/182* | (2014.01) |
| *H04N 19/615* | (2014.01) |

(52) U.S. Cl.
CPC ......... *H04N 19/139* (2014.11); *H04N 19/15* (2014.11); *H04N 19/157* (2014.11); *H04N 19/159* (2014.11); *H04N 19/176* (2014.11); *H04N 19/182* (2014.11); *H04N 19/61* (2014.11); *H04N 19/615* (2014.11); *H04N 19/96* (2014.11)

(58) Field of Classification Search
CPC .... H04N 19/117; H04N 19/139; H04N 19/15; H04N 19/182; H04N 19/61; H04N 19/615; H04N 19/96
USPC ........................................ 375/240.02, 240.12
See application file for complete search history.

(56) References Cited

U.S. PATENT DOCUMENTS

| | | | | |
|---|---|---|---|---|
| 2008/0175316 A1* | 7/2008 | Han | ..................... | H04N 19/593 375/240.12 |
| 2011/0194613 A1* | 8/2011 | Chen | .................... | H04N 19/176 375/240.24 |
| 2013/0039423 A1 | 2/2013 | Helle et al. | | |

FOREIGN PATENT DOCUMENTS

| | | |
|---|---|---|
| KR | 1020090129939 A | 12/2009 |
| KR | 1020100018191 A | 2/2010 |
| KR | 1020100020984 A | 2/2010 |
| WO | 2011/1127963 A1 | 10/2011 |

OTHER PUBLICATIONS

Chinese Office Action dated Dec. 23, 2014 for corresponding application No. 201180029771.8.
Martin Winken et al., "Description of video coding technology proposal by Fraunhofer HHI", JCTVC-A116, Apr. 15-23, pp. 1-44.
ITU-T Recommendation H.264., "Advanced Video Coding for Generic Audiovisual Services", Mar. 2005, pp. 1-343.

\* cited by examiner

Layer 0

Layer 1

PMV=median(mvA, mvB, mvC)

1510: 4x4 Transform
1520: 4x4 Transform or 8x8 Transform
1530: 4x4 Transform, 8x8 Transform, or 8x16 Transform
1540: 4x4 Transform, 8x8 Transform, or 16x8 transform
1550, 1560, 1570, 1580: 4x4 Transform, 8x8 Transform, or 16x16 transform

| Partition Type | Intra Prediction Mode | CBPX Flag/CBP (X=64, 32) | Transform Coefficient |

| Encoding Sequence | Layer Number | Partition Number | Partition Type |
|---|---|---|---|
| 1 | 0 | 0 | 3 |
| 2 | 1 | 0 | 3 |
| 3 | 2 | 0 | 3 |
| 4 | 3 | 0 | 3 |
| 5 | 3 | 1 | 3 |
| 6 | 3 | 2 | 0 |
| 7 | 3 | 3 | 0 |
| 8 | 2 | 1 | 0 |
| 9 | 2 | 2 | 0 |
| 10 | 2 | 3 | 1 |
| 11 | 1 | 1 | 2 |
| 12 | 1 | 2 | 1 |
| 13 | 1 | 3 | 3 |
| 14 | 2 | 0 | 0 |
| 15 | 2 | 1 | 0 |
| 16 | 2 | 2 | 0 |
| 17 | 2 | 3 | 0 |

| Prediction Mode Flag | Prediction Mode | Prediction Mode Flag | Prediction Mode Flag | Prediction Mode Flag | ... |

38A

| Mx(0,0) | Mx(0,1) | Mx(0,2) | Mx(0,3) | . . . |
| Mx(1,0) | Mx(1,1) | Mx(1,2) | Mx(1,3) | . . . |
| Mx(2,0) | Mx(2,1) | Mx(2,2) | Mx(2,3) | . . . |
| Mx(3,0) | Mx(3,1) | Mx(3,2) | Mx(3,3) | . . . |
| ⋮ | ⋮ | ⋮ | ⋮ | |

38B

| $M_{x-1}(0,0)$ | $M_{x-1}(0,1)$ | . . . |
| $M_{x-1}(1,0)$ | $M_{x-1}(1,1)$ | . . . |
| ⋮ | ⋮ | |

$M_{x-1}(0,0) = \min \{Mx(0,0), Mx(0,1), Mx(1,0), Mx(1,1)\}$
$M_{x-1}(0,1) = \min \{Mx(0,2), Mx(0,3), Mx(1,2), Mx(1,3)\}$
$M_{x-1}(1,0) = \min \{Mx(2,0), Mx(2,1), Mx(3,0), Mx(3,1)\}$
$M_{x-1}(1,1) = \min \{Mx(2,2), Mx(2,3), Mx(3,2), Mx(3,3)\}$

⋮

38C

| $M_1(0,0)$ | $M_1(0,1)$ |
| $M_1(1,0)$ | $M_1(1,1)$ |

$M_1(0,0) = \min \{M_2(0,0), M_2(0,1), M_2(1,0), M_2(1,1)\}$
$M_1(0,1) = \min \{M_2(0,2), M_2(0,3), M_2(1,2), M_2(1,3)\}$
$M_1(1,0) = \min \{M_2(2,0), M_2(2,1), M_2(3,0), M_2(3,1)\}$
$M_1(1,1) = \min \{M_2(2,2), M_2(2,3), M_2(3,2), M_2(3,3)\}$

38D $M_0(0,0)$ $M_0(0,0) = \min \{M_1(0,0), M_1(0,1), M_1(1,0), M_1(1,1)\}$

*FIG. 38*

| ctx_inc | Condition |
|---|---|
| 0 | All of Upper Side Block and Left Side Block are Batch Mode |
| 1 | Even Any One of Upper Side Block and Left Side Block is Batch Mode |
| 2 | Both of Upper Side Block and Left Side Block are Not Batch Mode |

*FIG. 53*

| ctx_inc | Condition |
|---|---|
| 0 | All of Upper Side Block and Left Side Block Have Threshold X Flag of 0 |
| 1 | Any one of upper side block and left side block has threshold X Flag of 0 |
| 2 | Both of Upper Side Block and Left Side Block Have Threshold X Flag of 1 |

*FIG. 54*

VIDEO ENCODING/DECODING APPARATUS AND METHOD USING BATCH MODE TOGETHER WITH SKIP MODE

CROSS-REFERENCE TO RELATED APPLICATIONS

The present application is a continuation of U.S. patent application Ser. No. 14/668,501 filed Mar. 25, 2015, which a continuation of U.S. patent application Ser. No. 13/641,677 filed Oct. 16, 2012, which is the National Phase application of International Application No. PCT/KR2011/002763, filed on Apr. 18, 2011, which is based on and claims priority to Korean Patent Application Nos. 10-2010-0035450 filed on Apr. 16, 2010, and 10-2011-0035425 filed on Apr. 16, 2011 in Korea. The disclosures of the above-listed applications are hereby incorporated by reference herein in their entirety.

TECHNICAL FIELD

The present disclosure relates to a video encoding/decoding apparatus and method for improving video compression efficiency by dividing an extended macroblock into subblocks of various sizes and shapes and encoding a video and for improving the video reconstruction efficiency by decoding a video.

BACKGROUND

The statements in this section merely provide background information related to the present disclosure and may not constitute prior art.

Current video data compression technologies include H.261, H.263, H.264, MPEG-2, and MPEG-4. According to the existing video compression technologies, encoding each image is carried out after dividing the same into fixedly sized macroblocks which are composed of rectangular 16×16 pixel areas of a luminance or luma component and rectangular 8×8 pixel areas of a chrominance or chroma component. All of the luma and chroma components of the respective macroblocks are spatially or temporally predicted, and the resultant predicted residuals undergo transform, quantization, entropy coding and the like before they are eventually compressed.

An encoding apparatus by the H.264/AVC compression standard subdivides each macroblock into blocks of smaller sizes 16×16, 8×8, and 4×4 to enter into an intra prediction encoding wherein 16×16 pixel blocks are processed in one of four prediction modes and 8×8 pixel blocks and 4×4 pixel blocks in one of nine prediction modes. As for an inter prediction encoding, each macroblock may be first divided into blocks of pixel sizes 16×16, 16×8, 8×16, 8×8, 8×4, 4×8, and 4×4. Transform is carried out in units of 8×8 or 4×4 pixel blocks, and quantization of transform coefficients utilizes a scalar quantization.

However, the inventor(s) has noted that 16×16 macroblock is deemed to be of an appropriate size for QCIF and CIF classes of small images, and would not be a size fit for high-resolution videos such as 4K×2K videos. In addition, the inventor(s) has noted that since typical video compression technologies utilize fixed size of macroblocks in encoding a video (although H.264/AVC prescribes subdividing and encoding macroblocks, the size of macroblocks is still fixed), an effective encoding of the high-resolution videos is yet to be achieved.

Further, the inventor(s) has noted that the operation in unison between encoding and decoding the video makes it difficult to expect a highly efficient video decoding from the already deteriorated compression efficiency of the high-resolution video encoding.

Therefore, to solve the above-mentioned problems, the present disclosure seeks to improve a video compression efficiency and a video reconstruction efficiency by extending a macroblock to various sizes, dividing an extended macroblock into subblocks of various sizes and shapes, and encoding/decoding a video by using different prediction units and transform units according to the sizes of the subblocks.

SUMMARY

In accordance with an aspect of the present disclosure, a method performed by a video decoding apparatus including one or more processors or and/or application-specific integrated circuits (ASICs), the processors and/or the ASICs executing the method comprising: reconstructing a syntax corresponding to at least one of a first block, a second block and a third block; and reconstructing a prediction block corresponding to at least one of the first block, the second block and the third block. Herein, the first block is generated by dividing a frame for decoding, the second block corresponds to a unit of a prediction and is generated by dividing the first block, and the third block corresponds to a unit of transformation and is generated by dividing the first block in a tree structure.

In accordance with an aspect of the present disclosure, a video encoding apparatus comprises an encoder and a predictor. The encoder is configured to encode a syntax corresponding to at least one of a first block, a second block and a third block, wherein the first block is generated by dividing a frame, the second block corresponds to a unit of a prediction and is generated by dividing the first block, and the third block corresponds to a unit of transformation and is generated by dividing the first block in a tree structure. And the predictor is configured to generate a prediction block corresponding to at least one of the first block, the second block and the third block.

DESCRIPTION OF DRAWINGS

FIG. 11 is an illustration diagram of various subblock types for a 64×64 pixel extended macroblock according to at least one embodiment of the present disclosure;

FIG. 21 is an illustration diagram for describing a process of sequentially encoding a layer-by-layer partition type number of a macroblock;

FIG. 22 is an illustration diagram illustrating an encoding sequence of an intra prediction mode according to at least one embodiment of the present disclosure;

FIGS. 38 and 39 are diagrams for describing a process of encoding partition type information by using a tree structure according to at least one embodiment of the present disclosure;

FIG. 53 is an illustration diagram for a ctx_inc of a batch mode flag; and

FIG. 54 is an illustration diagram for a ctx_inc of an x component of a differential motion vector.

DETAILED DESCRIPTION

Some embodiments of the present disclosure relates to a video encoding/decoding apparatus and method. More particularly, some embodiments of the present disclosure relates to an apparatus and method for improving video compression efficiency by dividing an extended macroblock into subblocks of various sizes and shapes and encoding a video by using different prediction units and transform units according to the sizes and the shapes of the subblocks. In addition, some embodiments of the present disclosure relates to an apparatus and method for improving the video reconstruction efficiency by decoding a video according to a bitstream received from such a video encoding apparatus.

A video encoding apparatus and a video decoding apparatus according to embodiments of the present disclosure may be a personal computer (PC), a notebook or laptop computer, a personal digital assistant (PDA), a portable multimedia player (PMP), a PlayStation Portable (PSP), or a wireless communication terminal, a smart phone, or the like, and represent a variety of apparatuses equipped with, for example, a communication device such as a modem for performing communications between various devices or wired/wireless communication networks, a memory for storing various programs for encoding or decoding videos and relevant data, and a microprocessor for executing the programs to perform operations and controls.

In addition, the video encoded into a bitstream by the video encoding apparatus may be transmitted in real time or non-real-time to the video decoding apparatus for decoding the same where it is reconstructed and reproduced into the video after being transmitted via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 1:
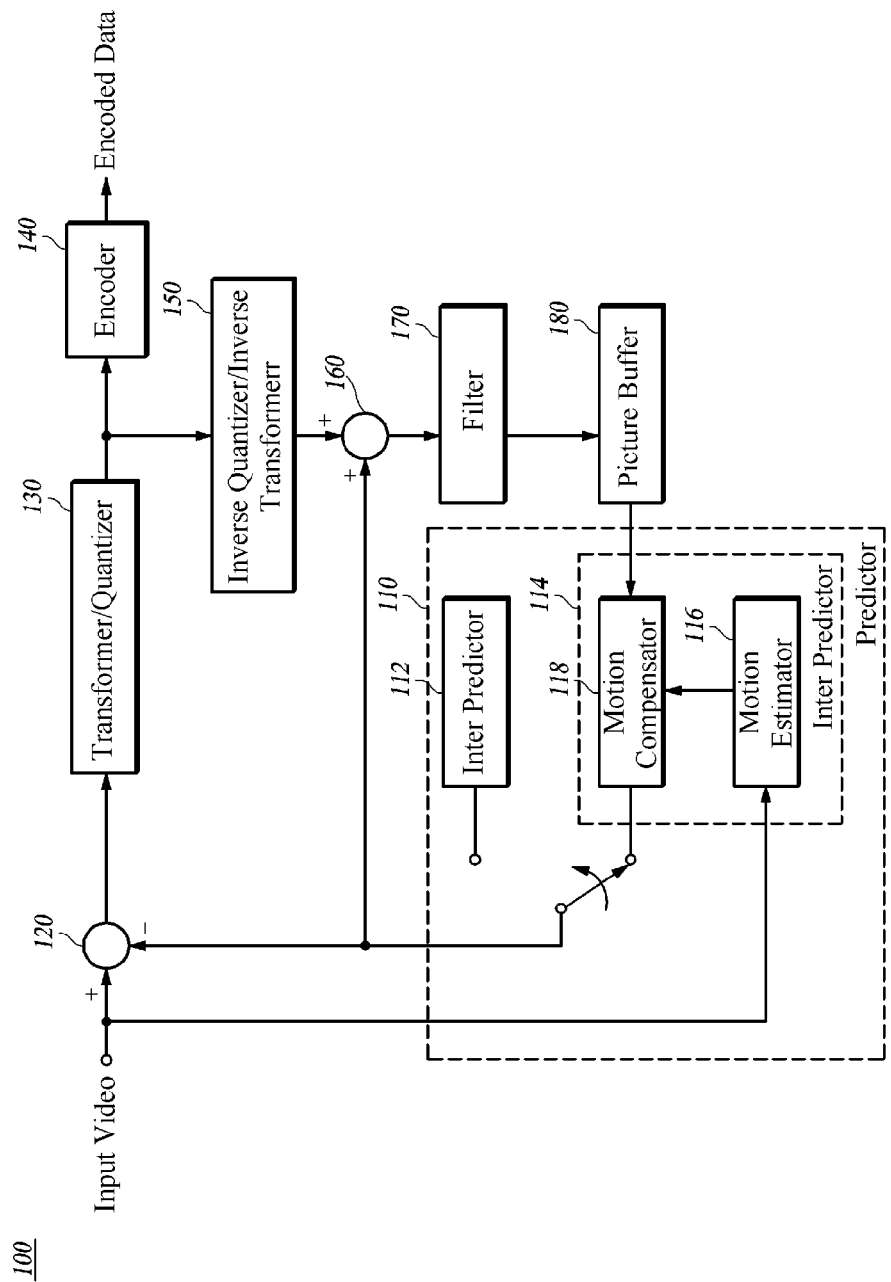
FIG. 1 is a block diagram of a schematic configuration of a video encoding apparatus according to at least one embodiment of the present disclosure.

FIG. 1 is a block diagram illustrating a schematic configuration of a video encoding apparatus according to at least one embodiment of the present disclosure.

A video encoding apparatus 100 according to an embodiment of the present disclosure may include a predictor 110, a subtracter 120, a transformer/quantizer 130, an encoder 140, an inverse quantizer and inverse transformer 150, an adder 160, a filter 170, and a picture buffer 180. Other components of the video encoding apparatus 100, such as each of the predictor 110, the subtracter 120, the transformer/quantizer 130, the encoder 140, the inverse quantizer and inverse transformer 150, the adder 160, and the picture buffer 180 is implemented by, or includes, one or more processors and/or application-specific integrated circuits (ASICs). The video encoding apparatus 100 comprises input units such as one or more buttons, a touch screen, a mic and so on, and output units such as a display, an indicator and so on.

The predictor 110 may include an intra predictor 112 and an inter predictor 114. The inter predictor 114 may include a motion estimator 116 and a motion compensator 118.

An input video may be inputted to the video encoding apparatus 100 in units of frames or fields, or may be inputted to the video encoding apparatus 100 after being divided into macroblocks having N×N pixels (N: an integer greater than or equal to 16). If an input video is a high-resolution video such as a 4K×2K video, the input video may be encoded after being divided into macroblocks having N×N pixels (N: an integer greater than 16), thereby achieving improvement in video compression efficiency. Herein, a macroblock having N×N pixels (N: an integer greater than 16) will be referred to as an extended macroblock (EMB). For example, the extended macroblock may include square pixel blocks of sizes such as 64×64 and 32×32. It should be noted that macroblocks described below may include extended macroblocks and general macroblocks of 16×16 pixel blocks.

When a video compression is performed by using extended macroblocks having N×N pixels (N: an integer greater than 16), if an input video is not a multiple of 16 pixels, the video compression may be performed after the input video is padded to be a multiple of 16 pixels.

Figure 2:
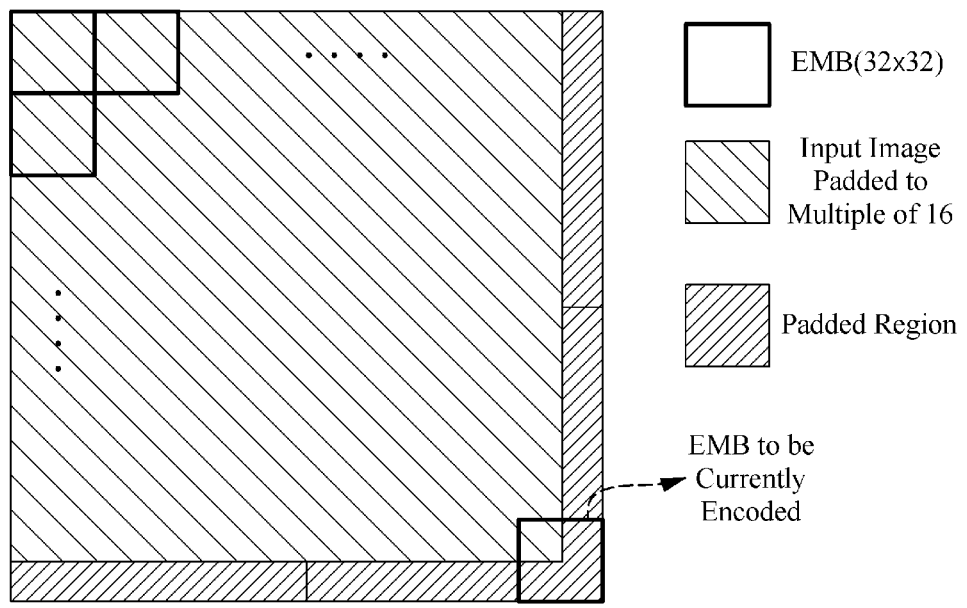
FIG. 2 is a diagram for describing an encoding and decoding in the event where an input image is padded according to at least one embodiment of the present disclosure, which is a diagram illustrating an input image and a position of an extended macroblock to be currently encoded.
Figure 3:
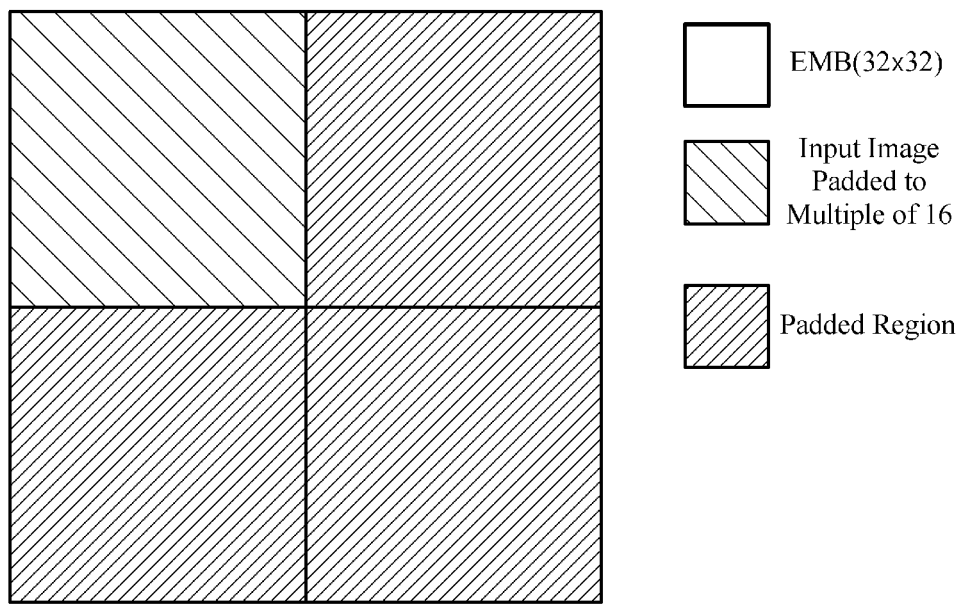
FIG. 3 is an enlarged view of the extended macroblock to be currently encoded in FIG. 2.

FIG. 2 is a diagram for describing a video encoding and decoding in the case where an input video is padded according to at least one embodiment of the present disclosure. FIG. 3 is an enlarged view of the extended macroblock to be currently encoded in FIG. 2. If an input video padded to a multiple of 16 pixels and an extended macroblock to be currently encoded are positioned as illustrated in FIG. 2, the current extended macroblock may be encoded by using only a pixel value belonging in the input video padded to a multiple of 16 pixels. That is, in FIG. 3, a padded region in a current extended macroblock may be undesirable for use in encoding the current extended macroblock. In addition, data encoded in a bitstream may also use only a pixel value belonging in the input video padded to a multiple of 16 pixels.

If an input video is a video of 4:2:0 format, a macroblock includes a luminance block having N×N pixels and a chrominance block having two pixels. The improvement of compression efficiency of a high-resolution video by such an extended macroblock may be achieved by specific embodiments described below.

Figure 4:
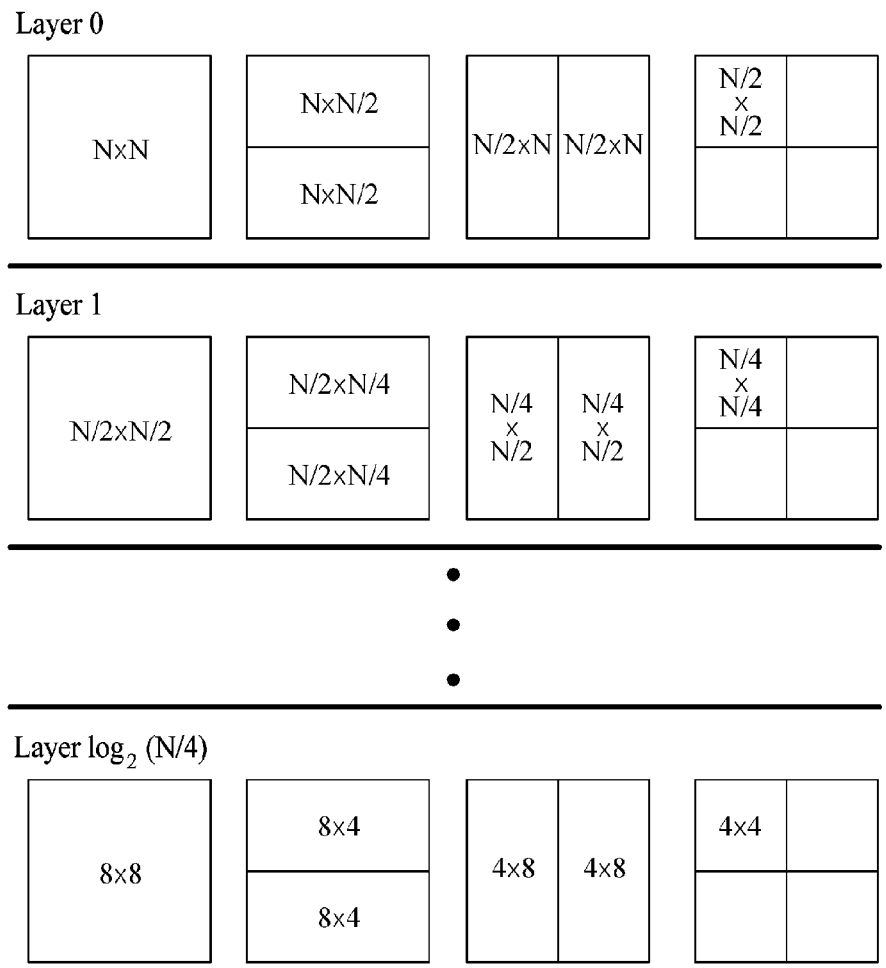
FIG. 4 is a diagram of an example of a process of dividing a macroblock into subblocks of various sizes for an intra prediction encoding and an inter prediction encoding according to at least one embodiment of the present disclosure.

As illustrated in FIG. 4, an extended macroblock according to at least one embodiment of the present disclosure may be divided into subblocks prior to an intra prediction encoding or an inter prediction encoding.

Figure 5:
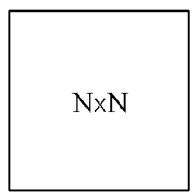
FIG. 5 is a diagram illustrating an example of a process of dividing a macroblock into subblocks of various sizes for an intra prediction encoding and an inter prediction encoding according to at least another embodiment of the present disclosure.
Figure 5:
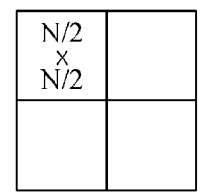
Figure 5:
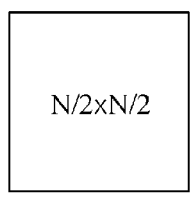
Figure 5:
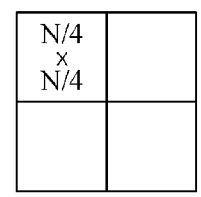
Figure 5:
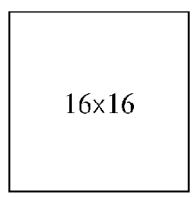
Figure 5:
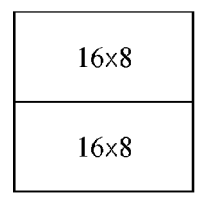
Figure 5:
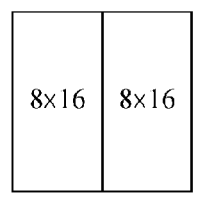
Figure 5:
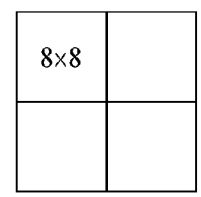
Figure 5:
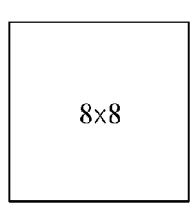
Figure 5:
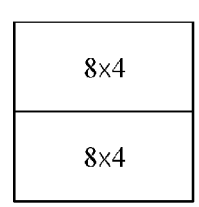
Figure 5:
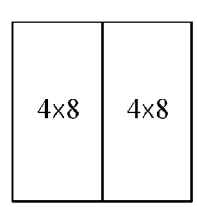
Figure 5:
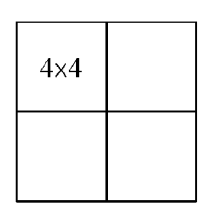

That is, if a macroblock having N×N pixels (N: an integer greater than or equal to 16 is used to encode a high-resolution video, an extended macroblock may be divided into pixel blocks prior to encoding, and each of the pixel blocks may be divided into subblocks prior to encoding. In addition, as illustrated in FIG. 5, if the length of one side of the extended macroblock or the pixel block is larger than 16 pixels, the division into pixel blocks having rectangular shapes such as 32×64, 64×32, 16×32 or 32×16 is omitted, and the extended macroblock is divided into square pixel blocks and then an encoding may be performed in units of 16×16 pixel blocks. FIGS. 4 and 5 illustrate each subblock with a minimum block size of 4×4 with respect to an extended macroblock. For example, as illustrated in FIG. 4, if an extended macroblock is a 64×64 pixel block, subblocks of a 64×64 pixel block, 64×32 pixel block, 32×64 pixel block and a 32×32 pixel block may belong to a macroblock layer 0, and subblocks of a 32×32 pixel block, a 32×16 pixel block, 16×32 pixel block and 16×16 pixel block may belong to a macroblock layer 1. In addition, as illustrated in FIG. 5, with respect to subblocks larger than a 16×16 pixel block, the division into rectangular subblocks such as a 64×32 pixel block, 32×64 pixel block, a 32×16 pixel block and a 16×32 pixel block may be omitted. In this case, subblocks of a 64×64 pixel block and a 32×32 pixel block belong to the macroblock layer 0, and 32×32 pixel block and a 16×16 pixel block as subblocks belong to the macroblock layer 1. Herein, the subblocks of a macroblock layer K+1 may be used only if the largest subblock among the subblocks of a macroblock layer K ($0 \leq K \leq \log_2(N/4)$) is divided into four blocks. That is, as in the case of FIG. 5, the subblocks of the macroblock layer 1 may be used only if a 64×64 subblock of the macroblock layer 0 is divided into four subblocks, and the subblocks of the macroblock layer 2 may be used only if a 32×32 subblock of the macroblock layer 1 is divided into four 16×16 subblocks.

The video encoding apparatus 100 calculates an encoding efficiency of each subblock in the case of dividing a macroblock into subblocks prior to encoding, and determines a subblock with the highest encoding efficiency as a final intra predicted block or inter predicted block. The encoding efficiency may be measured based on a rate-distortion optimization (RDO) technique as expressed in Equation 1.

$$RDcost = Distortion + \lambda \cdot Bit \quad \text{Equation 1}$$

In Equation 1, 'Distortion' denotes an error value between an encoding target block and a reconstructed block, '$\lambda$' denotes a constant determined by quantization parameters, and 'Bit' denotes the number of bits used to encode the encoding target block.

Determining a block mode may include a process of determining an optimal prediction mode (intra prediction mode and motion data) of each block with respect to all types of available blocks and another process of determining a block type. In general, SAD (Sum of Absolute Difference) or SATD (Sum of Absolute Transformed Difference) is used to reduce a calculation amount in determining a prediction mode (in selecting an intra prediction mode or a motion vector/reference picture), and bits of transform coefficients are not considered in 'Bit'. This may be summarized and expressed as Equation 2.

$$RDcost = SATD(\text{or } SAD) + \lambda \cdot Bit[\text{block type,prediction info,}CBP] \quad \text{Equation 2}$$

In Equation 2, 'SAD' denotes the sum of the absolute values of the difference values between an original video and predicted videos, and 'SATD' denotes the sum of the absolute values of the transformed values of residual blocks.

In determining a block type, 'RDcost' may be strictly calculated by using Equation 3.

$$RDcost = Distortion + \lambda \cdot Bit[\text{block type,prediction info,}CBP] \quad \text{Equation 3}$$

'Distortion' in Equation 3 may be expressed as Equation 4.

$$Distortion = \sum_{l=1}^{N} \sum_{k=1}^{M} |B(k,l) - B^*(k,l)|^2 \quad \text{Equation 4}$$

As compared to Equation 3, Equation 2 requires a smaller calculation amount but causes nearly similar Distortion in the case of a motionless region or an uncomplicated region. Therefore, the use of Equation 2 makes it difficult to determine an optimal mode. On the other hand, as compared to Equation 2, Equation 3 may calculate more accurate encoding efficiency but requires a larger calculation amount. Therefore, in embodiments of the present disclosure, Equation 2 or Equation 3 may be used selectively according to a priority of data (whether to be used as a reference picture) or a desired encoding mode. For example, Equation 3 may be used in determining an intra prediction mode and in determining a motion vector/reference picture of a block. However, exceptionally, in a process of determining a prediction direction (L0 prediction, L1 prediction, and bidirectional prediction) and a motion vector/reference picture of a 16×16 or more pixel block of a B picture, according to each prediction direction, the motion vector and the reference picture may be determined by using Equation 3, and the prediction direction may be determined by using Equation 2. Equation 3 may be used in determining a block type. In addition, an encoding cost may be determined according to Equation 3 if the size of a subblock is larger than or equal to the size of a preset pixel block, and an encoding cost may be determined according to Equation 2 if the size of a subblock is smaller than the size of a preset pixel block.

For example, it is assumed that a criterion for selection of an encoding cost is set to a 16×16 pixel block. In this case, available encoding modes of a 16×16 pixel block may include a 16×16 block using a 16×16 SKIP mode, a 16×16 Direct mode, and an L0 prediction mode (for example, motion information and residual data), a 16×16 block using an L1 prediction mode (for example, motion information and residual data), a 16×16 block using both of the L0 and L1 prediction modes (for example, motion information and residual data), and a 16×16 intra block. A precise encoding cost may be used for encoding modes of 16×16 or more pixel blocks. The reason for this is that since a block type having a size of 16×16 or more pixels corresponds mainly to a flat region such as a background, an optimal mode is difficult to determine by an approximate equation. Therefore, if 16×16 or more pixel blocks are used, an encoding cost may be used selectively according to a block size and mode in determining an intra macroblock mode. In addition, when considering parameters considered in an encoding cost calculation equation, parameters used to determine a mode between small blocks may be differentiated from parameters used to determine a mode between large blocks.

A minimum block size is determined according to a maximum layer value (MaxLayer) that is a maximum available layer value. For example, in the case of a N×N pixel macroblock, a minimum block size is determined as $N/(2^{MaxLayer})$.

The respective elements of the video encoding apparatus 100 will be described below with reference to the relevant drawings.

When encoding a video, the video encoding apparatus 100 discriminates picture types in units of pictures constituting the video and performs a prediction encoding differently according to the picture type. For example, if a certain picture is an intra picture, macroblocks in the intra picture are all intra macroblocks by macroblock type, and an intra prediction encoding is performed on each of the macroblocks. In addition, if a certain picture is an inter picture, macroblocks in the inter picture may be either inter macroblocks or intra macroblocks by macroblock type, and an intra prediction encoding or an inter prediction encoding may be performed according to the macroblock type. Such picture type information may be inserted into a picture header or a sequence header of encoded data without or after being encoded, and an video decoding apparatus described later may extract picture type information from a picture header or a sequence header to determine the picture type of a picture to be decoded.

Hereinafter, an encoding method according to at least one embodiment of the present disclosure and encoded data generated through the encoding method will be described according to picture types.

Figure 6:
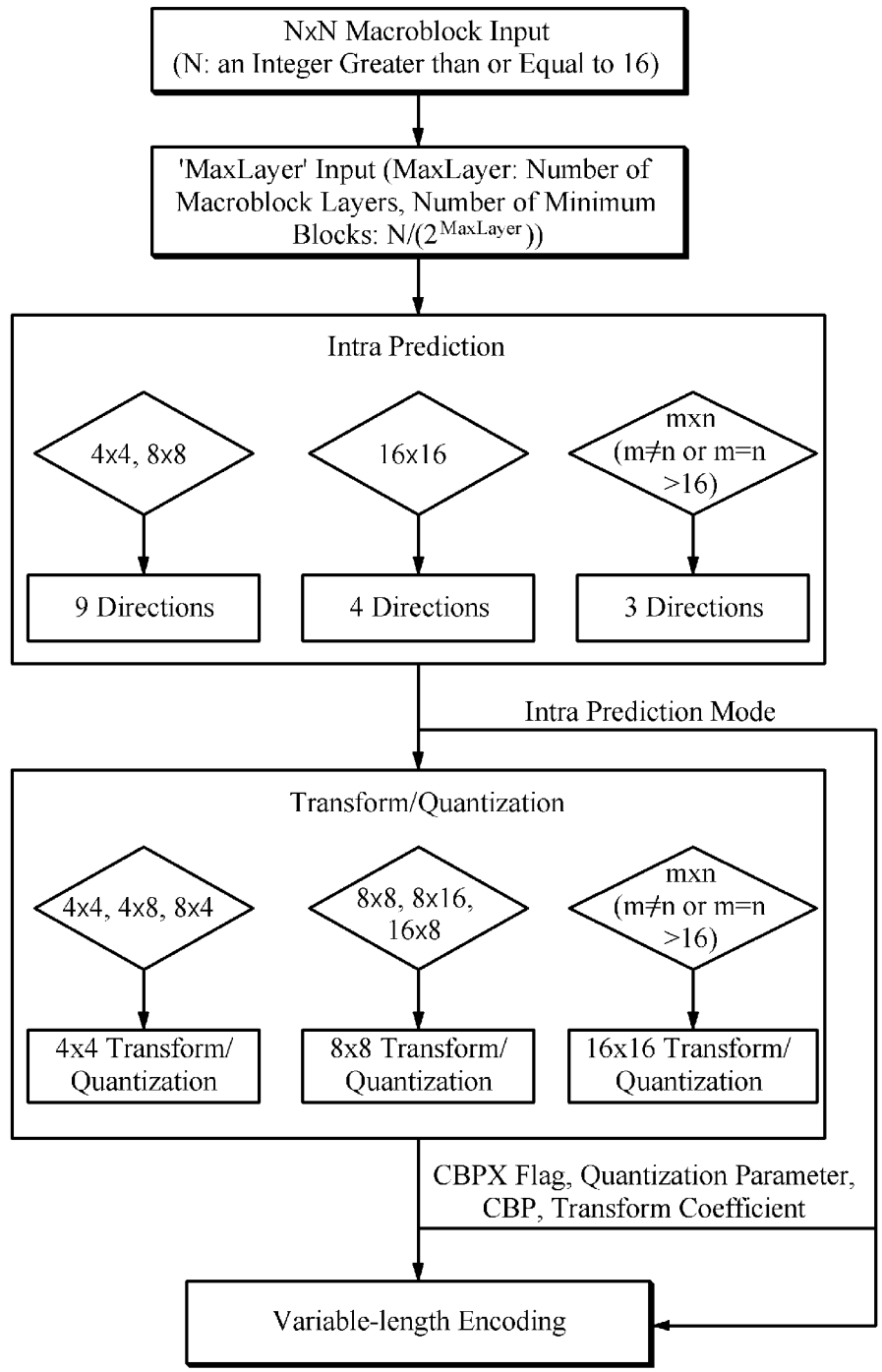
FIG. 6 is an illustration diagram for describing an intra picture encoding method and relevant data to be transmitted through encoded data, according to at least one embodiment of the present disclosure.

FIG. 6 is an illustration diagram for describing an intra picture encoding method and relevant data to be transmitted through encoded data, according to at least one embodiment of the present disclosure.

The intra predictor 112 of the predictor 110 generates a reference block by using adjacent pixels of a block to be currently encoded (hereinafter referred to as 'current block'), and determines an intra prediction mode by comparing the current block with the reference block. Herein, the adjacent pixels refer to pixels in blocks adjacent to the current block, and include adjacent pixels that are included in blocks adjacent to the current block and are adjacent to the current block.

Figure 7:
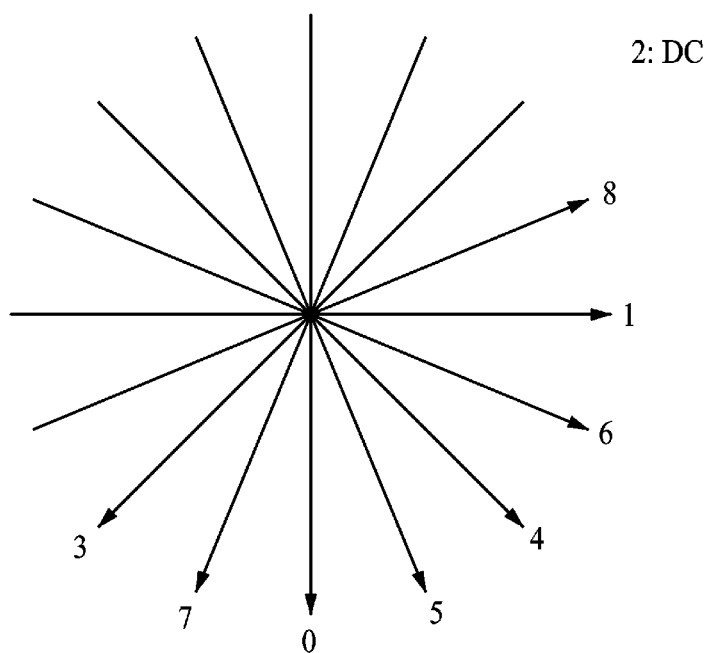
FIG. 7 is an illustration diagram of nine prediction directions and prediction mode numbers in an intra prediction mode of a luminance component according to at least one embodiment of the present disclosure.

It is assumed that an extended macroblock is divided into subblocks of 4×4 pixels with respect to a luminance component to perform an intra prediction. In this case, referring to FIG. 7 illustrating nine prediction directions and prediction mode numbers according to an intra prediction mode of a luminance component, the most suitable prediction direction for each 4×4 pixel current block is selected among nine prediction directions (prediction directions according to prediction modes 0 to 8), and the selected prediction direction is used to perform an intra prediction encoding of the current block. Prediction mode 2 represents an average value to be calculated from eight adjacent pixels which include four adjacent pixels of the left side block of the current block and four adjacent pixels of an upper side block of the current block to predict all of the 4×4 pixels of the current block.

In the cases of a block located at a left side boundary of a picture and a block located at an upper side boundary thereof, the left side block and the upper side block are located outside the picture. In this case, since a block deviating from a picture boundary cannot be referred to, the use of a prediction direction is restricted. For example, prediction directions of the prediction modes 0, 3, 4, 5, 6 and 7 referring to pixels of an upper block cannot be used in the uppermost block of a picture. Exceptionally, in the case of a DC mode, the current block is predicted with reference to only pixels that do not deviate from the picture boundary. If the left side block and the upper side block adjacent to the current block are unavailable, a value of 128 is used as a DC value.

The selected prediction direction of the current block is compared with the prediction direction of the smaller prediction mode numbered one of the left side block and the upper side block of the current block. If the two prediction directions are identical, an encoding is performed on a prediction mode flag (representable by, for example, 1 bit), which indicates whether the prediction direction of the current block estimated from the adjacent blocks and the selected prediction direction of the current block are identical so as to indicate that the selected prediction direction is identical to the estimated prediction direction.

If the prediction direction of the current block estimated from the adjacent blocks and the selected prediction direction of the current block are different, the prediction mode flag is encoded to indicate that the selected prediction direction is different from the estimated prediction direction. Then, an encoding is performed on prediction mode information (representable by, for example, 3 bits) which is to indicate which of the remaining eight prediction modes of nine prediction modes except the prediction mode corresponding to the estimated prediction direction of the current block is the selected prediction direction of the current block.

It is assumed that the extended macroblock is divided into subblocks of 8×8 pixels with respect to a luminance component to perform an intra prediction. In this case, as with the intra prediction in units of 4×4 pixels, an intra prediction in units of 8×8 pixels with respect to a luminance component uses nine prediction directions as illustrated in FIG. 7. Except for a difference in the block size (4×4 pixels and 8×8 pixels), a method of calculating predicted pixels is the same as in the case of the intra prediction encoding in units of 4×4 pixels.

It is assumed that the extended macroblock is divided into subblocks of 16×16 pixels with respect to a luminance component to perform an intra prediction. In this case, among four prediction directions illustrated in FIG. 8, a prediction direction providing the highest encoding efficiency is selected. According to the selected prediction direction, a 16×16 pixel block is prediction-encoded from 32 adjacent pixels including 16 adjacent pixels in an upper side 16×16 pixel block of a 16×16 pixel current block and 16 adjacent pixels in a left side 16×16 pixel block of the 16×16 pixel current block.

Figure 8:
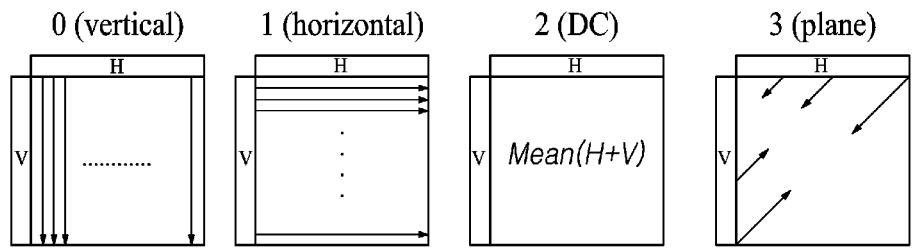
FIG. 8 is an illustration diagram of four prediction directions and prediction mode numbers in an intra prediction mode of a luminance component according to at least one embodiment of the present disclosure.

Referring to FIG. 8, in the case of a plane prediction corresponding to the prediction mode 3, adjacent pixels in an upper side block of the current block and adjacent pixels in a left side block of the current block are interpolated in a diagonal direction prior to the prediction. In the case of an average value prediction corresponding to the prediction mode 2, an average value of 16 adjacent pixels in the upper side block of the current block and 16 adjacent pixels in the left side block of the current block is predicted by all of the 16×16 pixels of the current block. Herein, if the current block is located at an uppermost position in the picture, an average value of 16 adjacent pixels in the left side block of the current block is used as a prediction value. If the current block is located at a leftmost position in the picture, an average value of 16 adjacent pixels in the upper side block of the current block is used as a prediction value. If the left side block and the upper side block of the current block are unavailable, a value of 128 is used as a prediction value. A prediction mode of the 16×16 pixel block is not prediction-encoded, and a number of a selected prediction mode is simply encoded as prediction mode information (representable by, for example, 2 bits).

Figure 9:
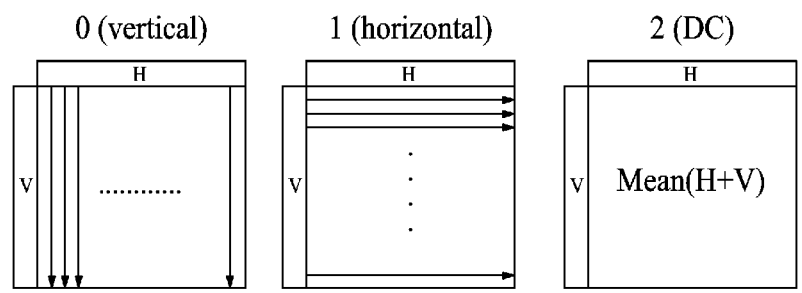
FIG. 9 is an illustration diagram of three prediction directions and prediction mode numbers in an intra prediction mode of a luminance component according to at least one embodiment of the present disclosure.

If the extended macroblock is divided into subblocks, except the above-described 4×4 pixel block, 8×8 pixel block or 16×16 pixel block, to perform an intra prediction, an intra prediction mode of a luminance component may be represented by three prediction directions and prediction mode numbers as illustrated in FIG. 9. If the extended macroblock is divided into the remaining subblocks, except the 4×4 pixel block, 8×8 pixel block or 16×16 pixel block, to perform intra prediction, and if the size of a relevant subblock is m×n, an m×n pixel block is intra-prediction-encoded from m adjacent pixels in the upper side block of the current block and n adjacent pixels in the left side block of the current block, according to the prediction direction proving the highest encoding efficiency, which is selected among three prediction directions illustrated in FIG. 9.

In the case of an average value prediction corresponding to the prediction mode 2, an average value of m adjacent pixels in the upper side block of the current block and n adjacent pixels in the left side block of the current block is used to prediction-encode the current block. Herein, if the current block is located at an uppermost position in the picture, an average value of n adjacent pixels in the left side block of the current block is used as a prediction value of the current block. If the current block is located at a leftmost position in the picture, an average value of m adjacent pixels in the upper side block of the current block is used as a prediction value of the current block. If the left side block and the upper side block of the current block are unavailable, a value of 128 is used as a prediction value of the current block.

If the selected prediction direction of the current block is identical to the prediction direction of the smaller prediction mode numbered one of the left side block and the upper side block of the current block, an encoding is performed on a prediction mode flag (representable by, for example, 1 bit), which indicates whether the prediction direction of the current block estimated from the adjacent blocks of the current block and the selected prediction direction of the current block are identical, as information indicating the selected prediction direction of the current block is identical to the estimated prediction direction of the current block. Since available prediction mode numbers of the m×n pixel block are 0 to 2, if the prediction mode number of the current block estimated by using the left side block and the upper side block of the current block is greater than or equal to 3, the prediction direction of the current block may use a prediction mode number 2 (DC mode). For example, the prediction mode number of the current block estimated from the adjacent blocks is 4, the prediction mode number of the current block is set to 2 to encode the prediction mode flag (representable by, for example, 1 bit), which indicates whether the estimated prediction direction of the current block and the selected prediction direction of the current block are identical.

Herein, the intra prediction of the extended macroblock may be performed in units of 16×16 or less pixel blocks, that is, in units of 4×4 pixel blocks, 8×8 pixel blocks, 16×16 pixel blocks, or m×n pixel blocks (herein, m#n, and m and n are numbers smaller than 16).

Figure 10:
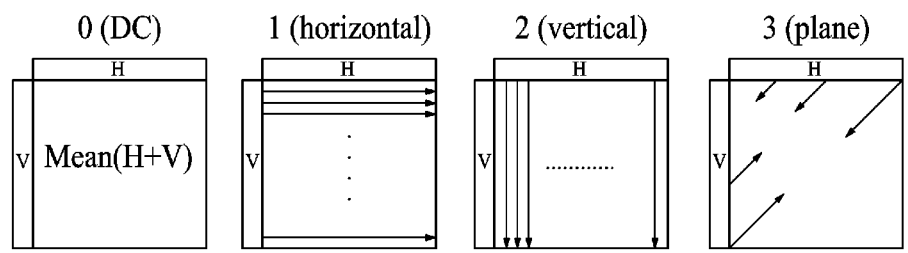
FIG. 10 is an illustration diagram of four prediction directions and prediction mode numbers in an intra prediction mode of a chrominance component according to at least one embodiment of the present disclosure.

The intra prediction of a chrominance component may be performed in units of N/2×N/2 pixel blocks. As illustrated in FIG. 10, four prediction directions such as an average value prediction, a horizontal prediction, a vertical prediction, and a plane prediction may be used. The intra prediction of a chrominance component may be performed in units of 8×8 pixel blocks.

FIG. 10 illustrates prediction directions and prediction mode numbers corresponding to four intra prediction modes of a chrominance component according to at least one embodiment of the present disclosure. Referring to FIG. 10, except for a difference in the block size (16×16 pixels and 8×8 pixels), a prediction value calculation method for a plane prediction corresponding to the prediction mode 3 and a average value prediction corresponding to the prediction mode 0 is the same as in the case of the intra prediction encoding method of a luminance component in units of 16×16 pixels. A prediction mode of a chrominance signal may be selected independently from a prediction mode of a luminance signal. There are two types of chrominance signals, that is, U and V, but the prediction method is the same. A prediction mode of a chrominance signal is one for each of U and V. There is one prediction mode of each chrominance signal is not prediction-encoded, and a selected prediction mode number is simply represented by using 2 bits.

Referring back to FIG. 6, in the same way as described above with reference to FIGS. 7 to 10, the intra predictor 112 determines an intra prediction mode of the current block with one intra prediction mode determined by rate-distortion optimization among the intra prediction mode determined in RDO and similar methods by predicting and prediction-encoding the current block in nine prediction directions with respect to the unit of 4×4 pixel, the intra prediction mode determined in RDO and similar methods by predicting and prediction-encoding the current block in nine prediction directions with respect to the unit of 8×8 pixel, the intra prediction mode determined in RDO and similar methods by predicting and prediction-encoding the current block in four prediction directions with respect to the unit of 16×16 pixel, and the intra prediction mode determined in RDO and similar methods by predicting and prediction-encoding the current block in three prediction directions with respect to the unit of m×n pixel. A rate-distortion optimization equation used herein may be expressed as Equation 3. When the intra prediction mode is determined in this way, the size of a subblock is also determined accordingly.

According to the intra prediction mode determined as described above, the intra predictor 112 generates a predicted block by predicting the current block. The subtracter 120 generates a residual block by subtracting the predicted block from the current block. The transformer/quantizer 130 generates a quantized transform coefficient by transforming and quantizing the residual block. The encoder 140 generates encoded data by entropy-encoding the quantized transform coefficient.

The transformer/quantizer 130 may perform a 4×4 transform on a residual block of the current block for which an intra prediction in units of 4×4, 4×8 or 8×4 pixels is selected, and perform an 8×8 transform on a residual block of the current block for which an intra prediction in units of 8×8, 8×16 or 16×8 pixels is selected. In addition, the transformer/quantizer 130 may perform a 16×16 transform on a residual block of the current block for which an intra prediction in units of 16×16 or more pixels is selected. In this case, since the unit of an intra prediction and the size of a subblock are the same, a transform type may be determined according to the block size of a subblock.

Herein, a residual block having 16×16 pixels (hereinafter referred to as '16×16 pixel residual block'), on which a 16×16 transform is performed, is subdivided into sixteen residual blocks having 4×4 pixels (hereinafter referred to as '4×4 pixel residual blocks'), and a 4×4 transform may be performed on the 4×4 pixel residual blocks. Thereafter, a transform block having a 4×4 transform coefficient (hereinafter referred to as 'DC component block') is constituted by only sixteen DC components of each transform block having 4×4 pixels (hereinafter referred to as '4×4 pixel transform block'), which is generated by 4×4-transforming each 4×4 pixel residual block, and a 4×4 transform is performed once again on the DC component block. Herein, a transform type used to transform the DC component block may be different from a transform type used to transform the residual block. That is, a 4×4 Discrete Cosine Transform (DCT) may be performed on the 4×4 pixel residual block, and a 4×4 Hadamard Transform may be performed on the DC component block. For example, a 16×32 pixel residual block of the current block, for which an intra prediction in units of 16×32 pixels is selected, is divided into two 16×16 pixel residual blocks, and each of the 16×16 pixel residual blocks is 4×4-transformed in units of 4×4 pixels. Thereafter, a DC component block is constituted by the DC components of each 4×4 transform block in the 16×16 pixel residual block, and a 4×4 transform is performed once again on the DC component block.

It is assumed that an extended macroblock being a 32×32 pixel block is positioned across an image padded to a multiple of 16 pixels and a padded region as illustrated in FIG. 2, and the extended macroblock is an intra mode. In this case, as illustrated in FIG. 3, an encoding mode is determined only with respect to an actual image region (16×16 pixel block), and a partition type of the relevant region, an intra prediction mode, a CBP, and a transform coefficient are encoded.

Figure 11:
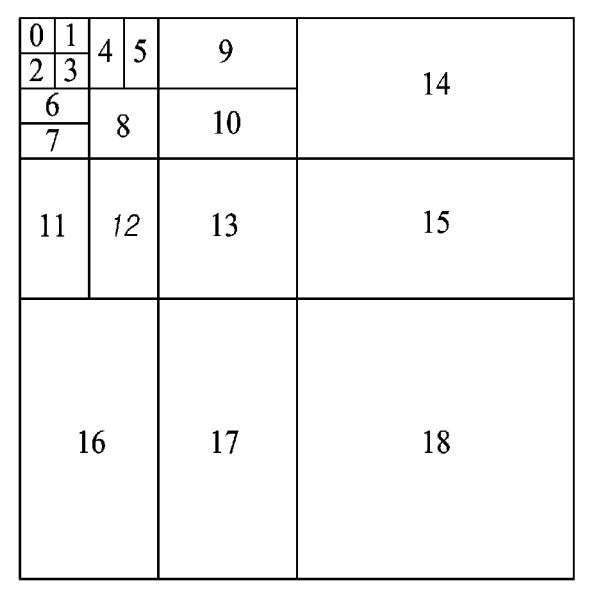

FIG. 11 is an illustration diagram illustrating block types of subblocks for a 64×64 pixel extended macroblock according to at least one embodiment of the present disclosure.

It is assumed that an extended macroblock is a 64×64 pixel block, and an optimal block type is determined after an intra prediction as illustrated in FIG. 11. In this case, a 4×4 transform is performed on blocks 0 to 7, an 8×8 transform is performed on blocks 8 to 12, a 4×4 transform is performed on blocks 13 to 18 in a 16×16 pixel block, and a transform is again performed on a DC component block constituted by the DC components of each 4×4 transform block in each 16×16 pixel block.

In the case of a chrominance signal, as in the case of an intra prediction in units of 16×16 or more pixels, a 4×4 transform is performed and then a 4×4 transform is again performed on a DC component block. However, a residual block of a macroblock of a chrominance component is divided into residual blocks having 8×8 pixels (hereinafter referred to as '8×8 pixel residual blocks'), and a 4×4 transform is performed on four 4×4 pixel residual blocks in each 8×8 pixel residual block. A DC component block having a 2×2 transform coefficient is constituted by the DC components of four 4×4 pixel residual blocks in the 8×8 pixel residual block, and a 2×2 transform is performed on the DC component block. In this case as well, a 4×4 transform type on the 8×8 pixel residual block and a 2×2 transform type on the DC component block may be different.

Instead of determining an optimal block type with respect to an extended block and then performing a transform according to the above-described transform type, a high-efficiency transform type may be selected and used according to the size of a subblock used in an intra prediction in units of 16×16 pixel blocks. That is, the transformer/quantizer 130 may perform one or more transforms and quantizations in units of 16×16 pixel blocks, select a highest-efficiency transform type, and generate a quantized transform coefficient according to the selected transform type. In this case, the encoder 140 may generate transform type data by generating and encoding a transform type for identifying the type of a transform selected for each block. The transform type data are included in encoded data. However, different transforms cannot be used in the 16×16 pixel block.

More specifically, if the 16×16 pixel block is divided into 8×8 pixel blocks and if one or more of four 8×8 pixel blocks are divided into subblocks smaller than the 8×8 pixel block, only a 4×4 transform may be performed on the 16×16 pixel block. In this case, a transform type is not encoded. In addition, if the 16×16 pixel block is divided into four 8×8 pixel blocks, a 4×4 transform and an 8×8 transform may be performed on the 16×16 pixel block to select a transform type requiring a low encoding cost, and a transform type indicating the type of a selected transform (which may be represented by, for example, 1 bit) may be encoded. In addition, if the 16×16 pixel block is divided into two 8×16 pixel subblocks, a 4×4 transform, an 8×8 transform, and an 8×16 transform may be performed on the residual blocks of the 16×16 pixel subblock to select a transform type requiring the lowest encoding cost, and if the 16×16 pixel block is divided into two 16×8 pixel subblocks, a 4×4 transform, an 8×8 transform, and a 16×8 transform may be performed on the residual blocks of the 16×16 pixel subblock to select a transform type requiring the lowest encoding cost, and a transform type indicating the type of a selected transform (which may be represented by, for example, 1 bit or 2 bits) may be encoded. A 4×4 transform, an 8×8 transform, and a 16×16 transform may be performed on 16×16 or more pixel subblocks to select a transform type requiring the lowest encoding cost, and a transform type indicating the type of a selected transform (which may be represented by, for example, 1 bit or 2 bits) may be encoded.

Figure 12:
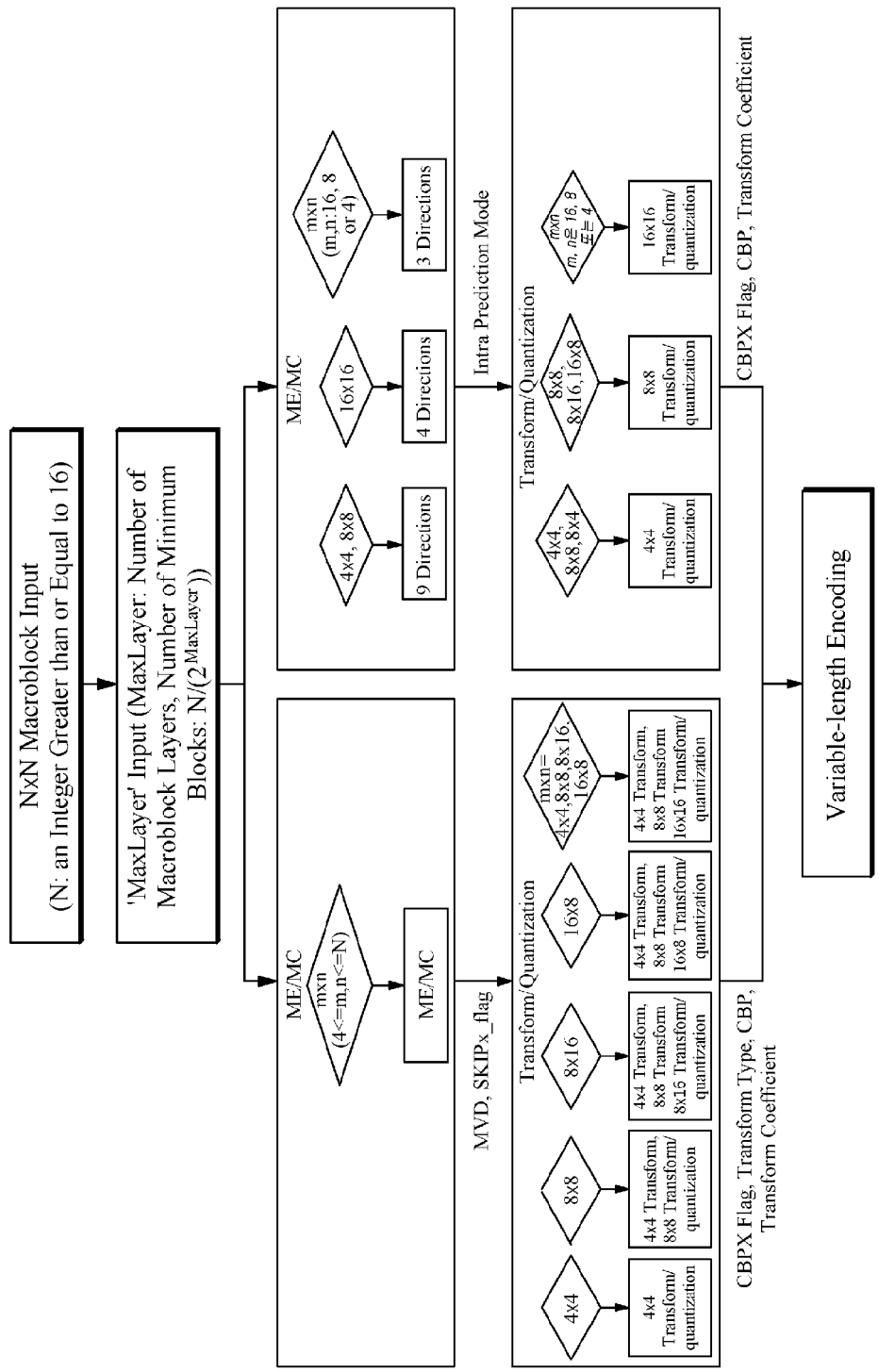
FIG. 12 is an illustration diagram for describing an inter-picture encoding method and relevant data to be transmitted through encoded data, according to at least one embodiment of the present disclosure.

FIG. 12 is an illustration diagram for describing an inter picture encoding method and relevant data to be transmitted through encoded data, according to at least one embodiment of the present disclosure.

In the case of a P-picture or a P-slice, all of the block types in FIG. 4 may be used for a motion estimation, and an intra mode or an inter mode may be selected in an extended macroblock in units of 16×16 pixel blocks. That is, both the intra mode and the inter mode may be used in an extended macroblock of a P-picture or a P-slice.

In the case of a B-picture or a B-slice, up to two reference pictures may be selected, which will be respectively referred to as an L0 prediction and an L1 prediction. The two reference pictures perform different functions. In general, the L0 prediction (List 0 Prediction, used mainly as a forward prediction) is used as a forward prediction, and the L1 prediction (List 1 Prediction, used mainly as a reverse prediction) is used as a reverse prediction. Inter-picture encoding methods for a P-picture and a B-picture will be described later in detail.

If the extended macroblock is a 32×32 pixel block, whether to perform an encoding in units of 32×32 pixel blocks or in units of 16×16 pixel blocks may be indicated by an extended macroblock flag (extended_mb_flag). For example, if the extended macroblock flag is 1, it may indicate that an encoding is performed in units of 32×32 pixel blocks, and if the extended macroblock flag is 0, it may indicate that an encoding is performed in units of 16×16 pixel blocks. If the extended macroblock flag is 0, the extended macroblock may be divided into four 16×16 pixel blocks, so that whether it is an intra mode or an inter mode may be determined in units of 16×16 pixel blocks. In addition, each 16×16 pixel block may be divided into smaller subblocks prior to encoding.

Referring back to FIG. 1, the motion estimator 116 of the inter predictor 114 of the predictor 110 detects a block most similar to a current block being a current encoding target in a current picture, that is, a reference block from a reference picture, and outputs a motion vector (MV) representing the relative position of the reference block with respect to the current block. This process is called a motion estimation. The motion estimation generates a motion vector by comparing subblocks in the macroblock with one or more reference pictures in the picture buffer 180. 8×8 pixel blocks may use different reference pictures, but subblocks in an 8×8 pixel block use the same reference picture.

The motion vector is encoded by the encoder 140 and is included in encoded data. The encoder 140 uses a mean value of motion vectors of adjacent blocks of the current block as a predicted motion vector (PMV). The encoder 140 generates motion information data by encoding only a differential motion vector (DMV) that is a difference vector between the predicted motion vector and the motion vector of the current block. Herein, the encoder 140 may also encode a reference picture index in addition to the differential motion vector. That is, the motion information may include the differential motion vector and the reference picture index. The encoder 140 may generate motion information data by encoding the motion information, and include the motion information data in the encoded data.

Figure 13:
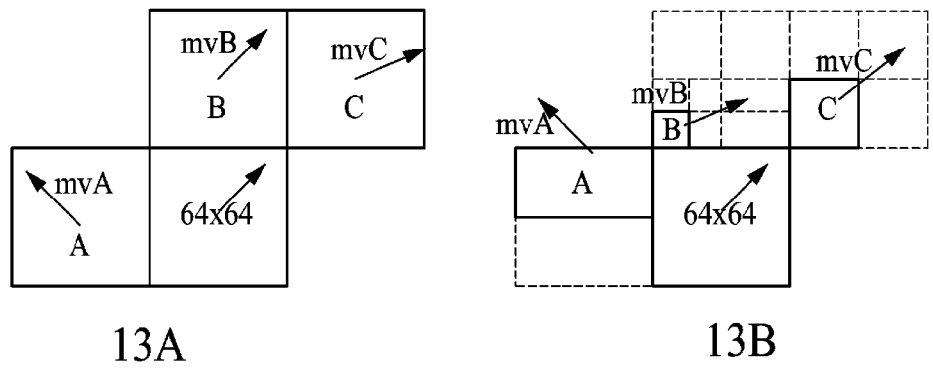
FIG. 13 is an illustration diagram for describing a process of determining a predicted motion vector according to at least one embodiment of the present disclosure.

FIG. 13 is an illustration diagram for describing a process of determining a predicted motion vector according to at least one embodiment of the present disclosure.

FIG. 13A illustrates motion vectors of adjacent blocks that are used to determine a motion vector and a predicted motion vector of a current block when all of the current block and adjacent blocks are 64×64 pixel blocks. If all of the current block and adjacent blocks have the same size, a mean value of the motion vectors of the adjacent blocks may be determined as a predicted motion vector as in the previous method.

FIG. 13B illustrates motion vectors of adjacent blocks that are used to determine a motion vector and a predicted motion vector of a current block when the current block and the adjacent blocks have different sizes. If the current block and the adjacent blocks have different sizes, it may be necessary to select one of the adjacent blocks, which is used to determine the predicted motion vector.

In at least one embodiment of the present disclosure, as illustrated in FIG. 13B, if an adjacent block located on the left side of the current block were divided into a plurality of blocks, the motion vector mvA of a block A located at the uppermost and rightmost position among them is used for estimation. If an adjacent block located on the upper side of the current block were divided into a plurality of blocks, a motion vector mvB of a block B located at the lowermost and leftmost position among them is used for estimation. If an adjacent block located on the right upper side of the current block were divided into a plurality of blocks, a motion vector mvC of a block C located at the lowermost and leftmost position among them is used for estimation. However, as an exceptional case, if the block B and the block C are all located outside the boundary of a picture, since the predicted motion vector cannot be determined by using the block B and the block C, the predicted motion vector is determined by using only the block A. In addition, if only one of the blocks A, B and C has the same reference picture number as the current block, a motion vector of the relevant block is used to determine the predicted motion vector.

Figure 14:
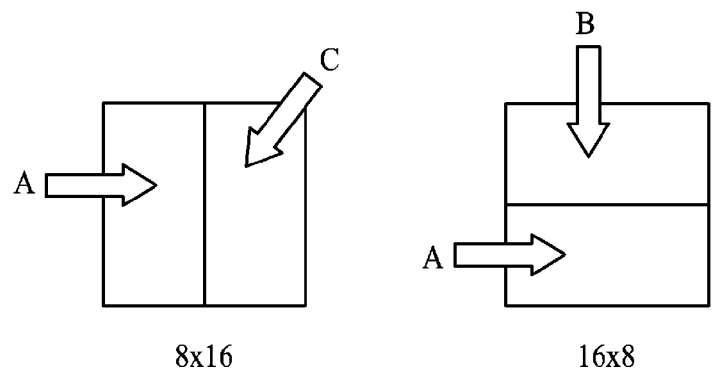
FIG. 14 is an illustration diagram for describing a process of determining a predicted motion vector of an 8×16 pixel block and a 16×8 pixel block according to at least one embodiment of the present disclosure.

FIG. 14 is an illustration diagram for describing a process of determining a predicted motion vector of an 8×16 pixel block and a 16×8 pixel block according to at least one embodiment of the present disclosure.

In addition, if the current block is an 8×16 pixel block or a 16×8 pixel block, a mean value is not used. That is, if the current block is an 8×16 pixel block, the block A as the left adjacent block and the block C as the right adjacent block are used to determine the predicted motion vector. If the current block is a 16×8 pixel block, the block B as the upper adjacent block and the block A as the lower adjacent block are used to determine the predicted motion vector.

In addition, in at least one embodiment of the present disclosure, a SKIP mode is used with respect to a macroblock being a 16×16 or more pixel block. If the macroblock being a 16×16 or more pixel block is a SKIP macroblock, the predicted motion vector is used to perform a motion estimation and compensation. However, if one or more of the motion vectors used to determine the predicted motion vector are 0, the predicted motion vector is determined as 0. For example, if the motion vectors of the adjacent blocks A, B and C are respectively mvA (0,10), mvB (1, 10), and mvC (2, 10), the predicted motion vector of the current block is (0, 10).

It is assumed that an extended macroblock being a 32×32 pixel block is positioned across an image padded to a multiple of 16 pixels and a padded region as illustrated in FIG. 2, and the extended macroblock is a SKIP mode. In this case, as illustrated in FIG. 3, a left side block and an upper side block of an actual image block (16×16 pixel block) are used to obtain a predicted motion vector, and the predicted motion vector is used to perform a motion prediction and compensation on the actual image block. If an optimal encoding mode of the extended macroblock being a current encoding target is a SKIP mode, a skip32_flag is encoded and a next extended macroblock is encoded.

Referring back to FIG. 1, the subtracter 120 generates a residual block by subtracting the reference block, which is indicated by the current block motion vector estimated in the motion estimator 116, from the current block. The transformer/quantizer 130 transforms and quantizes the residual block generated by the subtracter 120. The encoder 140 generates encoded data by entropy-encoding a quantized transform coefficient. Herein, the transformer/quantizer 130 performs one or more transforms and quantizations according to the size of a current block, selects a highest-efficiency transform type, and generates a quantized transform coefficient according to the selected transform type. The encoder 140 generates transform type data by generating and encoding a transform type for identifying the type of a transform selected for each block. The transform type data are included in the encoded data. However, different transforms cannot be used in the 16×16 pixel block.

As in the transform method described in the intra prediction block, if the 16×16 pixel subblock is divided into 8×8 pixel subblocks and if one or more of four 8×8 pixel subblocks are divided into subblocks smaller than the 8×8 pixel block, only a 4×4 transform may be performed on the residual blocks of the 16×16 pixel subblock. In this case, a transform type is not encoded. If the 16×16 pixel subblock is divided into four 8×8 pixel subblocks, a 4×4 transform and an 8×8 transform are performed on the residual blocks of the 16×16 pixel subblock to select a transform type requiring a low encoding cost, and a transform type indicating the type of a selected transform (which may be represented by, for example, 1 bit) is encoded.

If the 16×16 pixel subblock were divided into two 8×16 pixel subblocks, a 4×4 transform, an 8×8 transform, and an 8×16 transform are performed on the residual blocks of the 16×16 pixel subblock to select a transform type requiring the lowest encoding cost, and if the 16×16 pixel subblock were divided into two 16×8 pixel subblocks, a 4×4 transform, an 8×8 transform, and a 16×8 transform are performed on the residual blocks of the 16×16 pixel subblock to select a transform type requiring the lowest encoding cost, and a transform type indicating the type of a selected transform (which may be represented by, for example, 1 bit or 2 bits) is encoded. A 4×4 transform, an 8×8 transform, and a 16×16 transform are performed on 16×16 or more pixel subblocks to select a transform type requiring the lowest encoding cost, and a transform type indicating the type of a selected transform (which may be represented by, for example, 1 bit or 2 bits) is encoded.

If there are two selectable transform types as in the case where the 16×16 pixel block is divided into four 8×8 pixel subblocks, encoding bits used to encode transform types may be configured as illustrated in Table 1.

TABLE 1

| Transform Type | Encoding Bits |
|---|---|
| 4 × 4 Transform | 0 |
| 8 × 8 Transform | 1 |

In addition, if the 16×16 pixel block is divided into two 8×16 pixel blocks or two 16×8 pixel blocks, or if there are three selectable transform types as in the case of a 16×16 or more pixel subblock, encoding bits used to encode transform types may be configured as illustrated in Table 2.

TABLE 2

| Transform Type | Encoding Bits |
|---|---|
| 4 × 4 Transform | 0 |
| 8 × 8 Transform | 10 |
| 8 × 16, 16 × 8 or 16 × 16 Transform | 11 |

Figure 15:
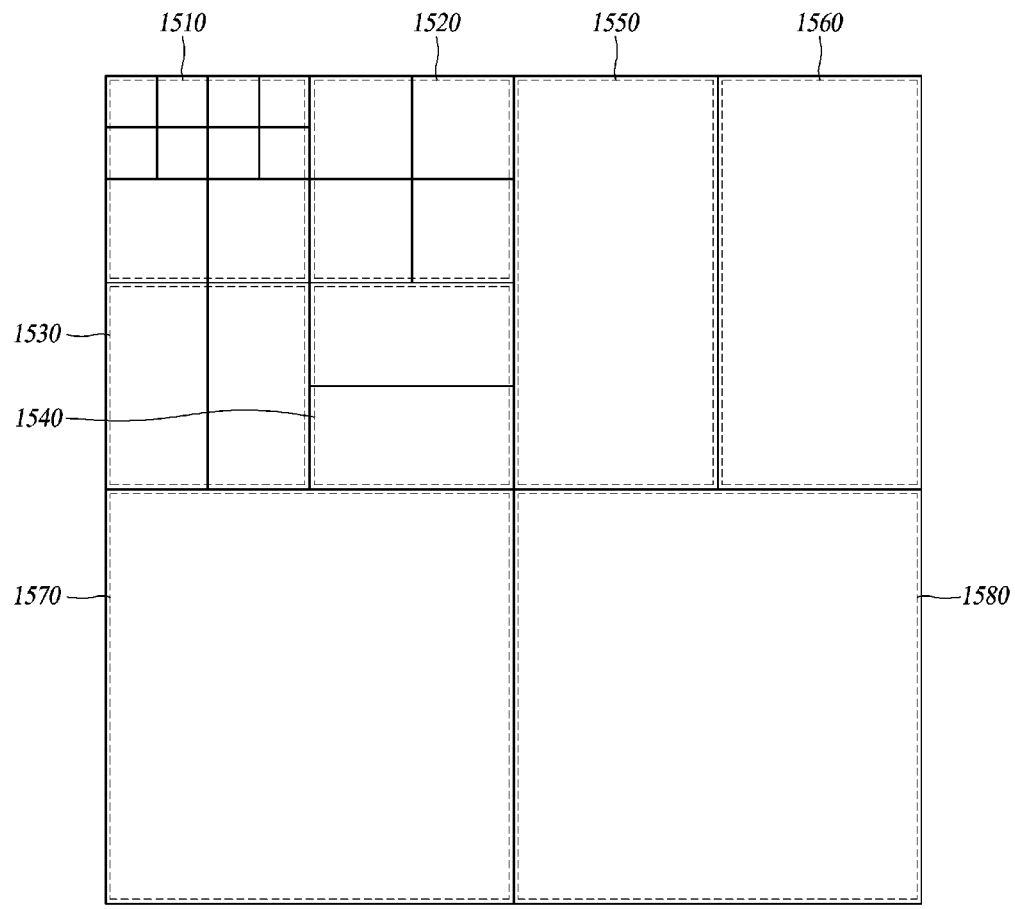
FIG. 15 is an illustration diagram illustrating available transform types and transform type encoding units depending on subblock sizes, according to at least one embodiment of the present disclosure.

FIG. 15 is an illustration diagram illustrating available transform types and transform type encoding units depending on subblock sizes, according to at least one embodiment of the present disclosure.

FIG. 15 illustrates a case where an extended macroblock has 64×64 pixels and are divided into subblocks of various sizes. As described above, since a first 16×16 pixel block 1510 is divided into 4×4 pixel subblocks smaller than 8×8 pixel blocks, an available transform is only a 4×4 transform and a transform type is not encoded. Since a second 16×16 pixel block 1520 is divided into four 8×8 pixel subblocks, one transform requiring the lower encoding cost is selected among a 4×4 transform, and an 8×8 transform and a transform type indicating the type of a selected transform is encoded. Since a third 16×16 pixel block 1530 is divided into two 8×16 pixel subblocks, one transform requiring the lowest encoding cost is selected among a 4×4 transform, an 8×8 transform, and an 8×16 transform, and a transform type indicating the type of a selected transform is encoded. Since a fourth 16×16 pixel block 1540 is divided into two 16×8 pixel subblocks, one transform requiring the lowest encoding cost is selected among a 4×4 transform, an 8×8 transform, and a 16×8 transform, and a transform type indicating the type of a selected transform is encoded. Since a fifth 16×32 pixel block 1550, a sixth 16×32 pixel block 1560, a seventh 32×32 pixel block 1570, and an eighth 32×32 pixel block 1580 are all larger than the 16×16 pixel block, one transform requiring the lowest encoding cost is selected among a 4×4 transform, an 8×8 transform, and a 16×16 transform, and a transform type indicating the type of a selected transform is encoded. With respect to blocks of more than 16×16 pixels, a transform type may be selected in units of 16×16 pixel blocks. In this case, a plurality of transform types are encoded with respect to the 16×16 pixel block included in a 32×32 pixel block or such larger pixel block than 16×16 pixel block and having a nonzero encoded block pattern.

Referring back to FIG. 1, the residual blocks transformed/quantized by the transformer/quantizer 130 are inverse-transformed/inverse-quantized by the inverse transformer/inverse quantizer 150 to reconstruct the residual blocks. The adder 160 reconstructs the current block by adding the reconstructed residual blocks and the predicted blocks predicted by the predictor 110.

The filter 170 filters a picture, which is generated by accumulating the current blocks reconstructed by the adder 160, by using a deblocking filter. The filtered picture is stored in the picture buffer 180, and is used as a reference picture for the next picture.

FIGS. 16A to 16E are illustration diagrams illustrating boundaries of blocks to be deblocking-filtered according to at least one embodiment of the present disclosure.

Figure 16A:
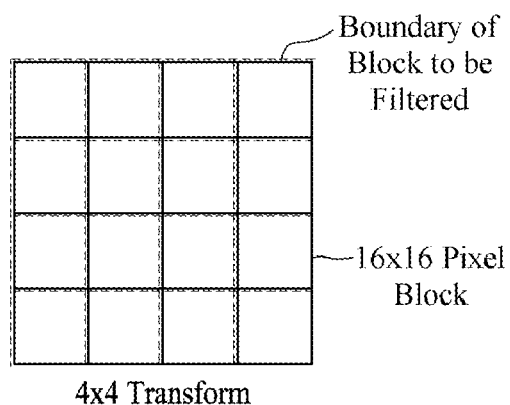
FIGS. 16A to 16E are illustration diagrams of boundaries of blocks to be deblocking-filtered according to at least one embodiment of the present disclosure.
Figure 16B:
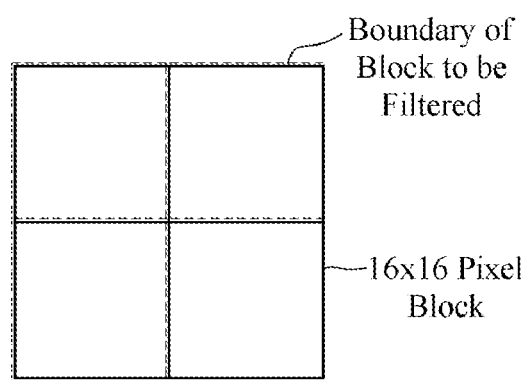
Figure 16C:
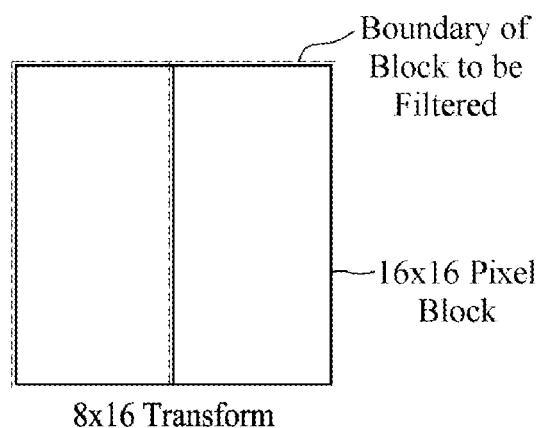
Figure 16D:
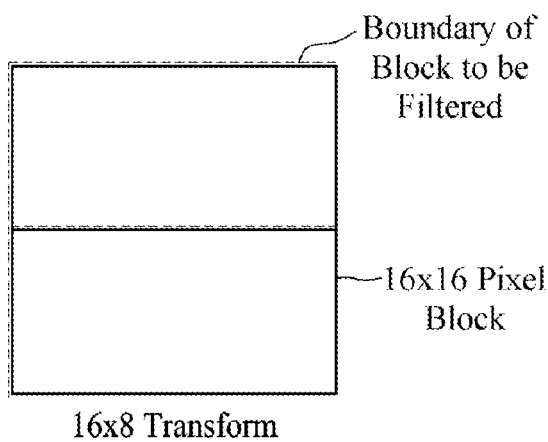
Figure 16E:
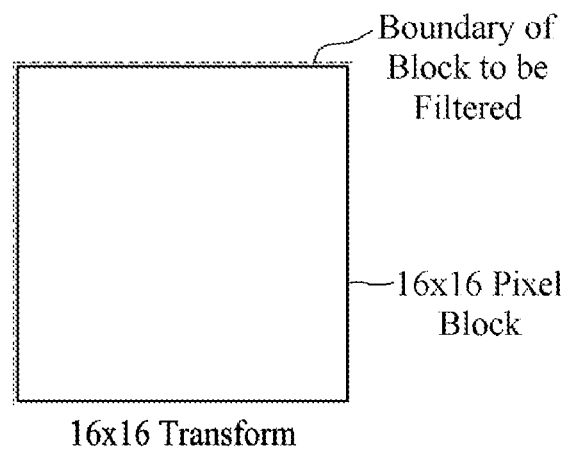

FIGS. 16A to 16E respectively illustrate boundaries of blocks to be deblocking-filtered in a 16×16 pixel block using a 4×4 transform, 8×8 transform, 8×16 transform, 16×8 transform, and 16×16 transform. A 16×16 pixel block using a 4×4 transform illustrated in FIG. 16A is deblocking-filtered at the left and upper block boundaries of each 4×4 pixel block. A 16×16 pixel block using an 8×8 transform illustrated in FIG. 16B is deblocking-filtered at the left and upper block boundaries of each 8×8 pixel block. A 16×16 pixel block using an 8×16 transform illustrated in FIG. 16C is deblocking-filtered at the left and upper block boundaries of each 8×16 pixel block. A 16×16 pixel block using a 16×8 transform illustrated in FIG. 16D is deblocking-filtered at the left and upper block boundaries of each 16×8 pixel block. A 16×16 pixel block using a 16×16 transform illustrated in FIG. 16E is deblocking-filtered at the left and upper block boundaries of the 16×16 pixel block.

Figures 17, 18:
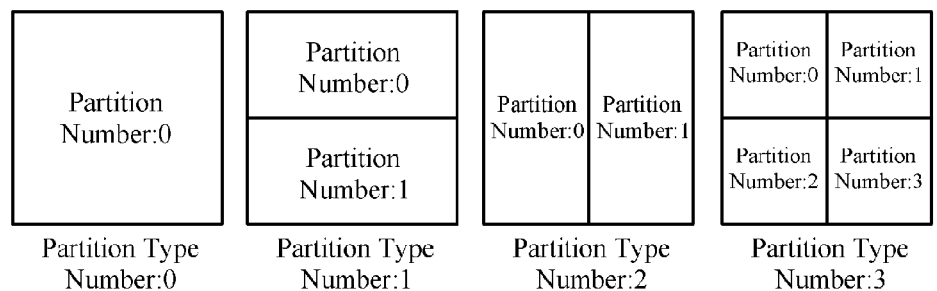
FIG. 17 is an illustration diagram of a syntax of an intra picture according to at least one embodiment of the present disclosure.
FIG. 18 is an illustration diagram of a number of each partition type according to at least one embodiment of the present disclosure.

FIG. 17 is an illustration diagram illustrating syntax of an intra picture according to at least one embodiment of the present disclosure.

If the type of a subblock for an extended macroblock includes a rectangular type as illustrated in FIG. 4 (for example, 32×16 pixel block and 16×32 pixel block), the video encoding apparatus 100 should transmit subblock type information to a video decoding apparatus. Therefore, encoded data of an intra picture may include fields such as Partition Type, Intra Prediction Mode, CBPX_flag/CBP (coded block pattern X-flag/coded block pattern), and Transform Coefficient. The encoder 140 of the video encoding apparatus 100 generates encoded data by encoding Partition Type information, Intra Prediction Mode information, CBPX_flag/CBP information, and Transform Coefficient information and allocating the same to each field.

However, the syntax of encoded data for an intra picture illustrated in FIG. 17 is merely exemplary, and is not necessarily configured as illustrated in FIG. 17. That is, it should be noted that the sequence of all or a portion of the syntax of encoded data for an intra picture may be changed differently from that illustrated in FIG. 17, and a portion of the syntax may be omitted.

On the other hand, if an extended macroblock is divided into square-type pixel blocks as illustrated in FIG. 5 and then an intra prediction is performed in units of 16×16 pixel blocks, an encoding of a CBPX_flag may be omitted and increment/decrement information ($\Delta pq$) of quantization parameters may be encoded. Herein, the increment/decrement information of quantization parameters may be encoded in units of extended macroblocks, and CBP information may be encoded in units of 16×16 pixel blocks.

In FIG. 17, a partition type field is allocated partition type data that is encoded data of partition type information of an extended macroblock, which represents the type of subblocks of the macroblock. The partition type information may be generated by using the number of each partition type illustrated in FIG. 18.

Referring to FIG. 18, if an $N/2^K \times N/2^K$ pixel block of a macroblock layer K is not divided any more, a partition type number 0 is allocated to the $N/2^K \times N/2^K$ pixel block of the macroblock layer K. If the $N/2^K \times N/2^K$ pixel block of the macroblock layer K is divided into two $N/2^K \times N/2^{K+1}$ pixel blocks, partition type number 1 is allocated to the $N/2^K \times N/2^K$ pixel block of the macroblock layer K. If the $N/2^K \times N/2^K$ pixel block of the macroblock layer K is divided into two $N/2^{K+1} \times N/2^K$ pixel blocks, partition type number 2 is allocated to the $N/2^K \times N/2^K$ pixel block of the macroblock layer K. If the $N/2^K \times N/2^K$ pixel block of the macroblock layer K is divided into four $N/2^{K+1} \times N/2^{K+1}$ pixel blocks, partition type number 3 is allocated to the $N/2^K \times N/2^K$ pixel block of the macroblock layer K. The numbers 0, 1, 2 and 3 marked on the respective subblocks in the $N/2^K \times N/2^K$ pixel block of the macroblock layer K are partition numbers for identifying the respective subblocks.

Although FIG. 18 illustrates that the partition type numbers are allocated in ascending order of numbers, the partition type numbers in FIG. 18 are merely exemplary, and the partition type numbers may be allocated in descending order of numbers. In addition, each partition type number may be allocated according to an occurrence probability of each partition type, and the partition type numbers may be adaptively changed. In addition, each of the divided blocks may be divided into smaller blocks. For example, if a 32×32 pixel block is divided into four 16×16 pixel blocks by a partition type number 3, each of the 16×16 pixel blocks may be divided into smaller subblocks by using the partition type numbers of FIG. 18. In addition, if the 16×16 pixel subblock is divided into smaller blocks, the partition type number of an upper pixel block (that is, a partition type number different from the partition type number of the 32×32 pixel block) may be used. If an extended macroblock is divided in units of 16×16 pixel blocks prior to encoding, a partition type number for a larger subblock than 16×16 pixel block (for example, 64×32 pixel block, 32×64 pixel block, 16×32 pixel block, or 32×16 pixel block) may be exempted from encoding.

Figure 19:
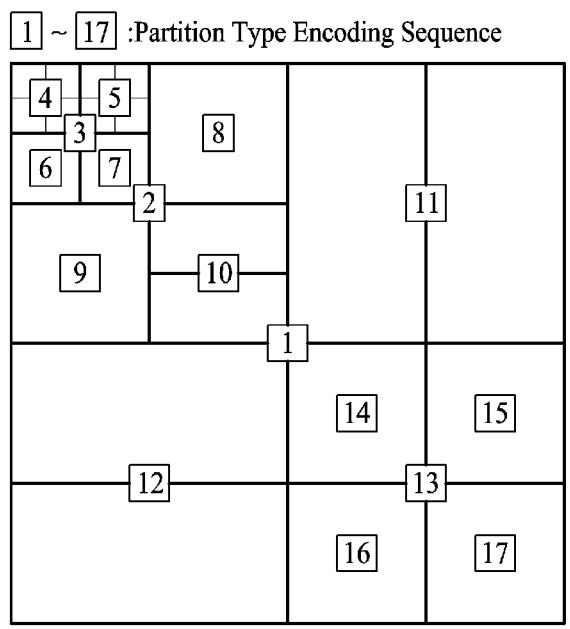
FIG. 19 is a diagram for describing a partition type number encoding sequence in the event where an extended macroblock is divided into subblocks of various sizes, according to at least one embodiment of the present disclosure.

FIG. 19 is a diagram for describing a partition type number encoding sequence in the event where an extended macroblock is divided into subblocks of various sizes, according to at least one embodiment of the present disclosure.

FIG. 19 illustrates a case where the extended macroblock is a 64×64 pixel block and the maximum number of partition layers is 4. According to at least one embodiment of the present disclosure, when the extended macroblock is divided as illustrated in FIG. 19, the partition type numbers of the respective partition layers may be sequentially encoded according to a partition type number encoding sequence to encode partition type information of the macroblock.

Figure 20:
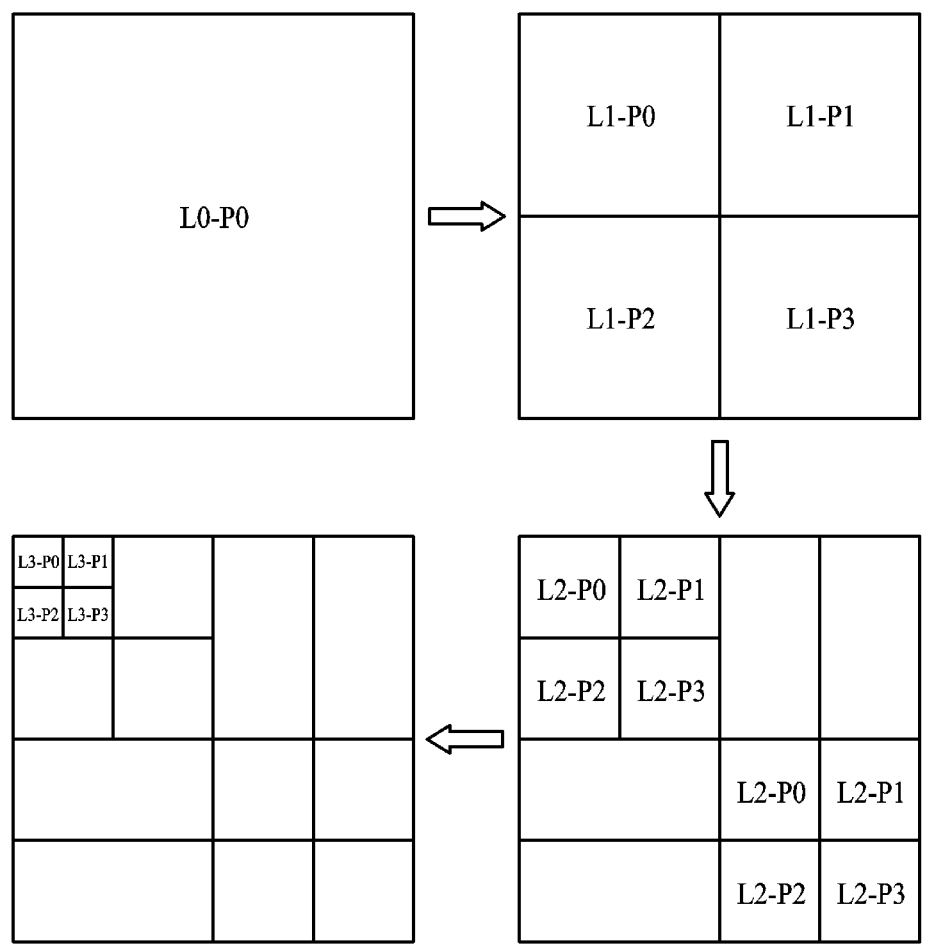
FIG. 20 is an illustration diagram sequentially illustrating a process of dividing a macroblock on a partition layer-by-partition layer basis according to at least one embodiment of the present disclosure.

FIG. 20 is an illustration diagram sequentially illustrating a process of dividing a macroblock on a partition layer-by-partition layer basis, which is illustrated in FIG. 19. Referring to FIG. 20, in a macroblock layer 0 (L0), a 64×64 pixel subblock is divided into four 32×32 pixel subblocks. In a layer 1 (L1), an L1-P0 (partition number 0 of macroblock layer 1) subblock and an L1-P3 (partition number 3 of macroblock layer 1) subblock are subdivided into four 16×16 pixel subblocks, and an L1-P1 (partition number 1 of macroblock layer 1) subblock and an L1-P2 (partition number 2 of macroblock layer 1) subblock are respectively subdivided into 16×32 pixel subblocks and 32×16 pixel subblocks. Since the L1-P1 and L1-P2 subblocks are not divided any more after being divided into two subblocks, layer-by-layer partition numbers are not illustrated. In a layer 2 (L2), an L2-P0 (partition number 0 of macroblock layer 2) subblock is subdivided into four 8×8 pixel subblocks, and an L2-P3 (partition number 3 of macroblock layer 2) subblock is subdivided into two 16×8 pixel subblocks. In a macroblock layer 3 (L3), an L3-P0 (partition number 0 of macroblock layer 3) subblock and an L3-P1 (partition number 1 of macroblock layer 3) subblock are respectively subdivided into four 4×4 pixel subblocks. Herein, if the extended macroblock is encoded in units of 16×16 pixel blocks, the L1-P1 block and the L1-P2 block may be encoded in units of four 16×16 pixel blocks like the L1-P3, instead of being respectively divided into 16×32 pixel subblocks and 32×16 pixel subblocks.

FIG. 21 is an illustration diagram for describing a process of sequentially encoding a layer-by-layer partition type number of a macroblock.

When the partition type information of the macroblock illustrated in FIG. 19 is encoded, an encoding may be performed as illustrated in FIG. 21. In FIG. 19, a numeral in the square '□' represents a sequence of encoding a partition type number of each subblock. When layer-by-layer partition type numbers of an extended macroblock are sequentially encoded according to a partition type number encoding sequence, the layer-by-layer partition type numbers may be sequentially encoded according to a sequence illustrated in FIG. 21.

First, since a 64×64 pixel subblock L0-P0 of a macroblock layer 0 is divided into four 32×32 pixel subblocks, a partition type number 3 is encoded. Since the first 32×32 pixel subblock L1-P0 among four 32×32 pixel subblocks in the 64×64 pixel subblock is also divided into four 16×16 pixel subblocks, a partition type number 3 is encoded. Since the first 16×16 pixel subblock L2-P0 among four 16×16 pixel subblocks in the first 32×32 pixel subblock of a layer 1 is also divided into four 8×8 pixel subblocks, a partition type number 3 is encoded. Since four 8×8 pixel blocks L3-P0, L3-P1, L3-P2 and L3-P3 in the relevant 16×16 pixel subblock L2-P0 are not divided into smaller subblocks any more, partition type numbers {3, 3, 0, 0} are respectively encoded. Since subblocks of a layer 3 cannot be divided into smaller subblocks, the partition type numbers of the subblocks of the layer 3 are not encoded.

Since all the partition type numbers of the subblocks in the macroblock layer 3 have been encoded, the partition type numbers of the second 16×16 pixel subblock L2-P1 and the third 16×16 pixel subblock L2-P2 of the macroblock layer 2 are encoded. Herein, since they are not divided into smaller blocks any more, a partition type number 0 is encoded. Since the fourth 16×16 pixel subblock L2-P3 is divided into 16×8 pixel subblocks but a partition type number is not 3, only a partition type number 1 is encoded. Since all of the partition type numbers of four subblocks in the layer 2 have been encoded, the partition type number of the second 32×32 pixel subblock L1-P1 of the layer 1 is encoded. Herein, since the second 32×32 pixel subblock L1-P1 of the layer 1 have been divided into 16×32 pixel subblocks and each of the divided subblocks are not divided into smaller subblocks any more, a partition type number 2 is encoded. In this manner, when encoding of the partition type number is performed on the third 32×32 pixel subblock L1-P2 of the macroblock layer 1, the fourth 32×32 pixel subblock L1-P3 of the macroblock layer 1 and their subordinate four 16×16 pixel subblocks L2-P0, L2-P1, L2-P2 and L2-P3 sequentially, {1, 3, 0, 0, 0, 0} are encoded.

When the partition type information of the macroblock illustrated in FIG. 19 is encoded according to the above-described encoding method, partition type numbers {3, 3, 3, 3, 3, 0, 0, 0, 0, 1, 2, 1, 3, 0, 0, 0, 0} are encoded as illustrated in FIG. 21. Herein, the partition type numbers may be encoded into a binary bit string by using a lossless compression encoding such as binary arithmetic coding or Huffman coding.

For example, if binary arithmetic coding is used, each partition type number may use a different binary value according to a layer number of a partition type number to be currently encoded. If the layer number is smaller than or equal to $\log_2(n/16)$, Table 3 may be used for encoding, and if the layer number is greater than $\log_2(n/16)$, Table 4 may be used for encoding. For example, referring to Table 3, since a partition type number 3 of the subblock L1-P0 of FIG. 11 may be represented by a binary number '01', the partition type number 3 may be encoded by arithmetically encoding binary numbers '0' and '1'. Referring to Table 4, since a partition type number 0 of the subblock L3-P2 belonging to the subblock L2-P0 may be represented by a binary number '1', the partition type number 3 may be encoded by arithmetically encoding a binary number '1'.

TABLE 3

| Partition Type | Binary Stream | |
|---|---|---|
| 0 | 0 | 0 |
| 1 | 1 | 1 |
| 2 | 1 | 0 |
| 3 | 0 | 1 |

TABLE 4

| Partition Type | Binary Stream | | |
|---|---|---|---|
| 0 | 1 | | |
| 1 | 0 | 0 | |
| 2 | 0 | 1 | 1 |
| 3 | 0 | 1 | 0 |

Referring back to FIG. 17, when partition type information of the macroblock for an intra picture is encoded and partition type data are allocated to the partition type field, intra prediction mode data obtained by encoding information on an intra prediction mode are allocated to the intra prediction mode field.

Figure 22:
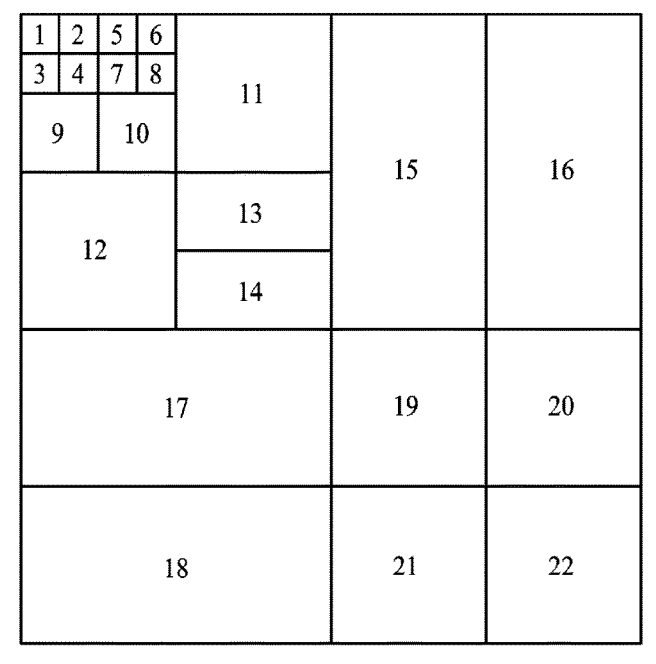

FIG. 22 is an illustration diagram illustrating an encoding sequence of an intra prediction mode according to at least one embodiment of the present disclosure.

Like FIG. 19, FIG. 22 illustrates a case where the extended macroblock is a 64×64 pixel block and the maximum number of partition layers is 4. When the extended macroblock is divided as illustrated in FIG. 22, an intra prediction mode of each subblock of the extended macroblock may be sequentially encoded according to an encoding sequence of an intra prediction mode illustrated in FIG. 22, to generate intra prediction mode data. That is, a number marked in each subblock represents an encoding sequence of an intra prediction mode for encoding an intra prediction mode. If a 64×64 pixel extended macroblock is encoded in units of 16×16 pixel blocks, a 32×32 pixel block corresponding to a fifteenth block and a sixteenth block or a seventeenth block and an eighteenth block may be divided in units of four 16×16 pixel blocks like nineteenth to twenty-second block blocks prior to encoding, instead of being divided into 16×32 pixel blocks or 32×16 pixel blocks.

If a subblock of a luminance component of the extended macroblock is not a 16×16 pixel block, a prediction mode flag indicating whether a prediction direction of a current block estimated from adjacent blocks and a prediction direction of a selected current block are identical, is encoded. If a prediction mode flag indicates that a prediction direction of a block being a current encoding target and a prediction direction of a current block estimated from adjacent blocks are not identical, a prediction mode flag indicating that a prediction direction of a current block and a prediction direction of the current block estimated from adjacent blocks are not identical, and a prediction mode number of a prediction mode indicating which of the remaining prediction directions except a prediction direction of a current block estimated from adjacent blocks among a plurality of intra prediction directions according to the size of a relevant subblock corresponds to a prediction direction, are encoded as an intra prediction mode of a relevant block to generate intra prediction mode data. Herein, if the extended macroblock is divided into subblocks except a 4×4 pixel block, an 8×8 pixel block or a 16×16 pixel block to perform an intra prediction, and if a prediction mode number of a current block estimated by using a left side block and an upper side block of the current block is greater than or equal to 3, a prediction direction of the current block may use the prediction mode number 2 (DC mode) of FIG. 9.

If a prediction direction of a current block estimated from adjacent blocks and a prediction direction of the current block are identical, a prediction mode flag indicating that a prediction direction of a current block estimated from adjacent blocks and a prediction direction of the current block are identical, is encoded as an intra prediction mode to generate intra prediction mode data. If a subblock of a luminance component is a 16×16 pixel block, a prediction mode of a macroblock of a chrominance component encodes a prediction mode number itself of a relevant block as an intra prediction mode, to generate intra prediction mode data. In this manner, intra prediction mode data for each subblock of a macroblock generated by being encoded in a sequence as illustrated in FIG. 22 are allocated to the intra prediction mode field illustrated in FIG. 17.

Figures 23A, 23B:
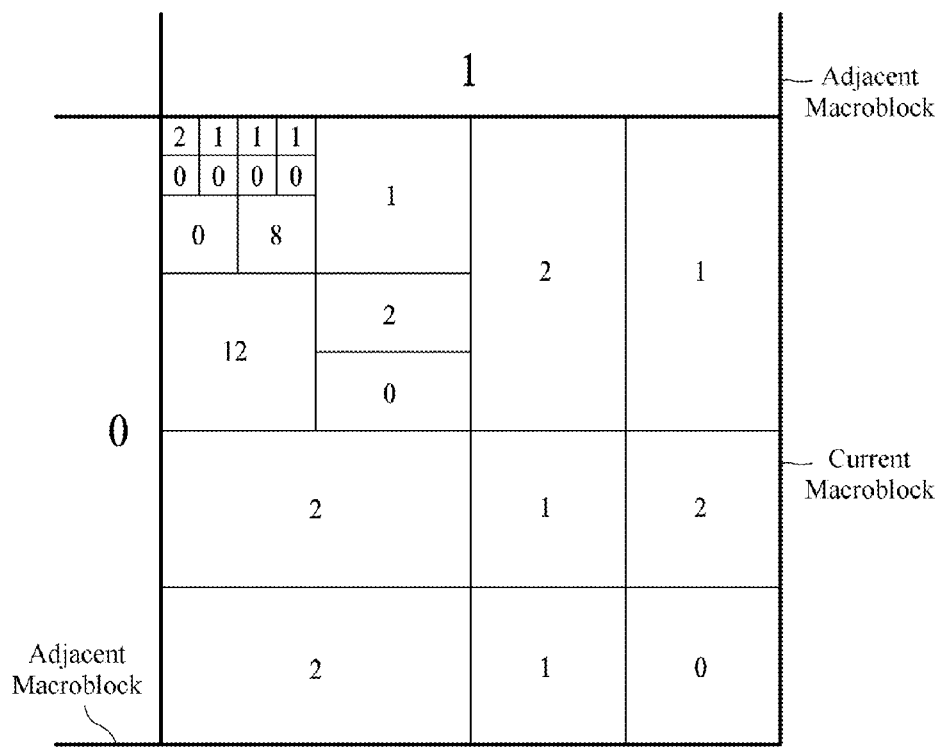
FIGS. 23A and 23B are illustration diagrams for describing an example of a process of encoding an intra prediction mode of a macroblock according to at least one embodiment of the present disclosure.

FIG. 23A and FIG. 23B are an illustration diagram for describing an example of a process of encoding an intra prediction mode of a macroblock according to at least one embodiment of the present disclosure.

FIG. 23A illustrates a case where a current macroblock to be currently encoded is a 64×64 pixel block and is divided into subblocks of various sizes and shapes as illustrated; a left side adjacent block of a current macroblock is intra-predicted in units of 64×64 pixels and thus a prediction mode number of the left side adjacent block is 0 (vertical mode); and an upper side adjacent block of a current macroblock is intra-predicted in units of 64×64 pixels and thus a prediction mode number of the left side adjacent block is 1 (horizontal mode). A numeral marked in each subblock of a current extended macroblock represents a prediction mode number of each subblock.

A prediction mode number of the first 4×4 pixel subblock of a current extended macroblock is 2 (DC mode), and a prediction mode number of a relevant subblock estimated by using a left side adjacent block and an upper side adjacent block is 0. That is, since a prediction mode number 0 of the left side adjacent block is smaller than a prediction mode number 1 of the upper side adjacent block, a prediction mode number of the first 4×4 pixel subblock is estimated to be 0. Since a prediction mode of the first 4×4 pixel subblock is different from a prediction mode of a relevant subblock estimated from adjacent blocks, a prediction mode flag indicating that a prediction direction of a relevant subblock and a prediction mode of a relevant subblock estimated from adjacent blocks are not identical, and a prediction mode number 2 being a prediction mode number of the relevant subblock are encoded as an intra prediction mode. A prediction mode number of the second 4×4 pixel subblock is 1, and a prediction mode number of a relevant subblock estimated from adjacent blocks is 1. Thus, since a prediction direction of the relevant subblock and a prediction direction of the relevant subblock estimated from adjacent blocks are identical, only a prediction mode flag indicating that the prediction directions are identical is encoded as an intra prediction mode of the relevant subblock.

Next, an intra prediction mode of a next subblock is encoded according to an encoding sequence of an intra prediction mode illustrated in FIG. 22. In this case, a prediction mode number of the third 4×4 pixel subblock is 0, and a prediction mode number of a relevant subblock estimated from adjacent blocks is 0. Thus, since a prediction direction of the relevant subblock and a prediction direction of the relevant subblock estimated from adjacent blocks are identical, only a prediction mode flag indicating that the prediction directions are identical is encoded as an intra prediction mode of the relevant subblock. In the case of the eleventh 16×16 pixel subblock, a prediction flag is not encoded, and a prediction mode number 1 of the relevant subblock is encoded as an intra prediction mode of the relevant subblock. FIG. 23 illustrates a case where the fifteenth block and the sixteenth block are divided into 16×32 pixel blocks and are encoded as an intra prediction mode; and the seventeenth block and the eighteenth block are divided into 32×16 pixel blocks and are encoded as an intra prediction mode. However, if an intra prediction encoding is performed on an extended macroblock in units of 16×16 pixel blocks, the division of rectangular pixel blocks such as the fifteenth block and the sixteenth block, or the seventeenth block and the eighteenth block is omitted with respect to subblocks larger than a 16×16 pixel block.

Like FIG. 23A, FIG. 23B illustrates intra prediction mode data included in the intra prediction mode field when an intra prediction mode of a current macroblock is encoded. As illustrated herein, a prediction mode flag and a prediction mode number are encoded with respect to the first 4×4 subblock, and only a prediction mode flag is encoded with respect to the second, third and fourth 4×4 subblocks. In this manner, intra prediction mode data are allocated to the intra prediction mode field according to an encoding sequence as illustrated herein.

When an extended macroblock is intra-prediction-encoded, if it is divided into rectangular subblocks larger than a 16×16 pixel block (for example, 16×32 and 32×16) to perform an intra prediction encoding, an encoded block pattern flag considering the size of a subblock (CBPX_flag: Coded Block Pattern X_flag, hereinafter referred to as 'CBPX flag') and a coded block pattern (CBP) may be encoded and allocated to a CBPX_flag/CBP field. CBP data allocated to the CBPX_flag/CBP field indicate whether a non-zero quantized transform coefficient is included in a subblock of a macroblock. However, as illustrated in FIG. 5, if an extended macroblock is divided in units of 16×16 pixel blocks to perform an intra prediction encoding, an encoding of the block pattern flag may be omitted and increment/decrement information (Δpq) of quantization parameters may be encoded. Herein, the increment/decrement information of quantization parameters may be encoded in units of extended macroblocks, and CBP data may be encoded in units of 16×16 pixel blocks.

Figure 24:
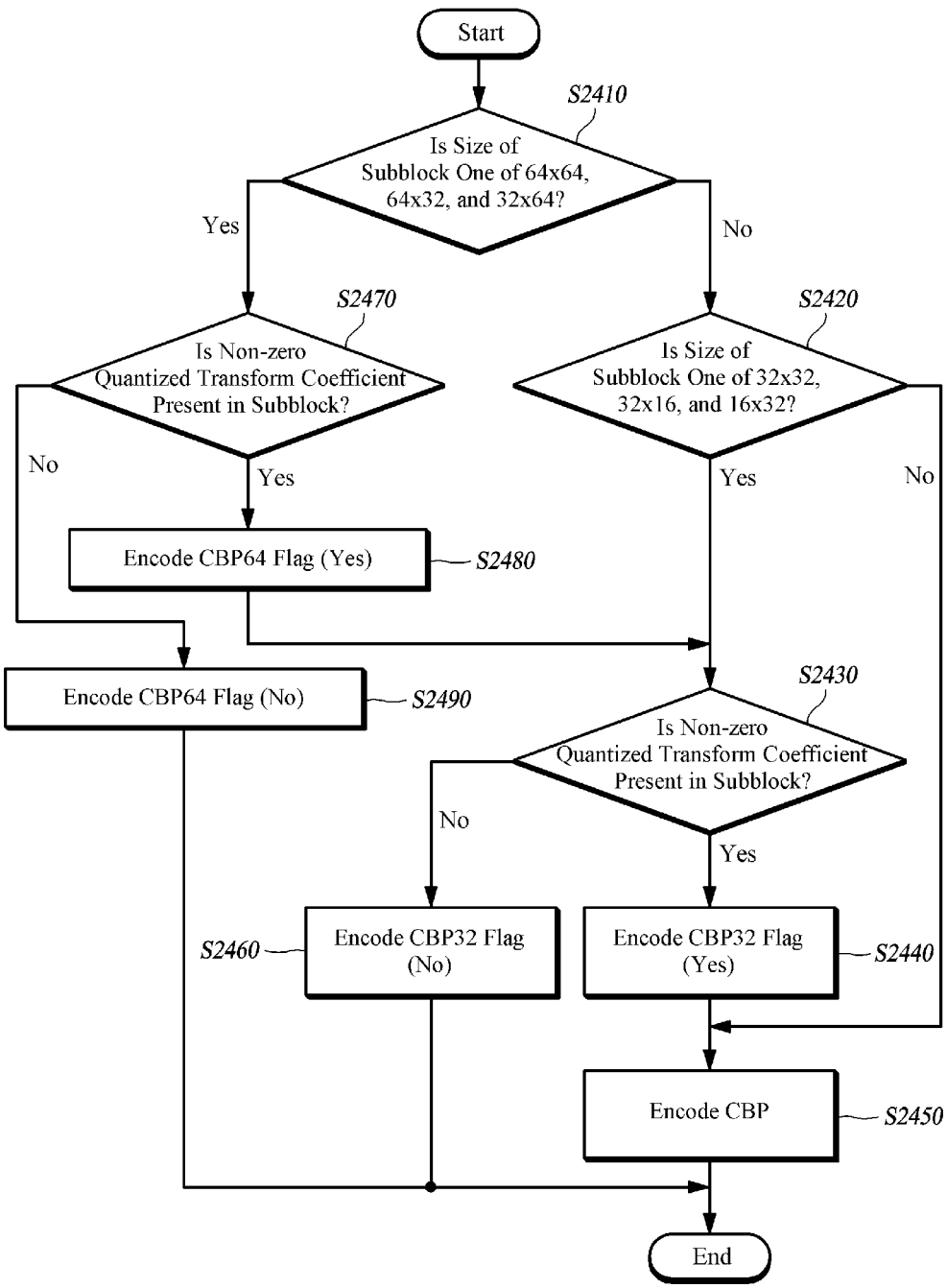
FIG. 24 is an illustration diagram for describing a process of encoding a CBPX_flag and a CBP for an intra macroblock according to at least one embodiment of the present disclosure.

FIG. 24 is an illustration diagram for describing a process of encoding a CBPX_flag and a CBP for an intra macroblock according to at least one embodiment of the present disclosure.

FIG. 24 illustrates a process of encoding a CBPX_flag and a CBP in the case where an extended macroblock is a 64×64 pixel block. The encoder 140 of the video encoding apparatus 100 determines whether the size of a subblock of the extended macroblock is one of 64×64, 64×32 and 32×64 (S2410). If the size of the subblock of the extended macroblock is not one of 64×64, 64×32 and 32×64, the encoder 140 determines whether the size of subblock is one of 32×32, 32×16 and 16×32 (S2420). Herein, if the extended macroblock is divided in units of 16×16 pixels to perform an intra prediction encoding, the encoder 140 may determine in step S2410 whether the size of the subblock is a 64×64 pixel block, that is, whether an intra prediction encoding is performed in units of extended macroblocks. If the size of the subblock is not a 64×64 pixel block, the encoder 140 may determine in step S2420 whether the size of the subblock is a 32×32 pixel block. If it is determined in step S2420 that the size of the subblock is one of 32×32, 32×16 and 16×32, or a 32×32 pixel block, the encoder 140 determines whether a non-zero transform coefficient is present in the subblock (S2430). If a non-zero transform coefficient is present in the subblock, the encoder 140 encodes a CBP32 flag (which may be represented by, for example, 1 bit such as '1') indicating that the non-zero transform coefficient is present in the subblock (S2440), and encodes the CBP in the subblock in units of 16×16 pixel blocks (S2450). If a non-zero transform coefficient is not present in the subblock, the encoder 140 encodes a CBP32 flag (which may be represented by, for example, 1 bit such as '0') indicating that a non-zero transform coefficient is not present in the subblock (S2460).

Herein, a CBP64 flag indicates whether a non-zero encoding coefficient is present in a 64×64 pixel block. Likewise, a CBP32 flag indicates whether a non-zero encoding coefficient is present in a 32×32 pixel block. If a residual block of a luminance component does not have a non-zero transform coefficient, since a transform type need not be transmitted, such a CBPX flag (X: 32, 64, or the like) is used to indicate whether luminance components have a non-zero transform coefficient. The CBP is encoded in units of 16×16 pixel blocks. In this case, 1 bit is used per 8×8 pixel block to indicate whether a non-zero transform coefficient is present per 8×8 pixel block in a 16×16 pixel block. With respect to a chrominance component, 1 bit is used to indicate whether a non-zero transform coefficient is present in two 2×2 chrominance component DC blocks, and 1 bit is used to indicate whether a non-zero transform coefficient is present in two 8×8 chrominance component AC blocks.

On the other hand, if it is determined in step S2420 that the size of the subblock is neither one of 32×32, 32×16 and 16×32, nor a 32×32 pixel block, the encoder 140 proceeds to step S2450 and encodes the CBP. Herein, if the size of the subblock is neither one of 32×32, 32×16 and 16×32, nor a 16×32 pixel block, the encoder 140 may determine whether the size of the subblock is a 16×16, 16×8 or 8×16 pixel block. If the size of the subblock is a 16×16, 16×8 or 8×16 pixel block, and if a non-zero encoding coefficient is present in the relevant subblock, the encoder 140 may encode the CBP16 flag (which may be represented by, for example, 1 bit such as '1'). If not, the encoder 14 may encode the CBP in units of 16×16 pixel blocks without using the CBP flag.

In addition, if it is determined in step S2410 that the size of the subblock is one of 64×64, 64×32 and 32×64, or a 64×64 pixel block, the encoder 140 determines whether a non-zero transform coefficient is present in the subblock (S2470). If a non-zero transform coefficient is present in the subblock, the encoder 140 encodes the CBP64 flag (which may be represented by, for example, 1 bit such as '1') indicating that a non-zero transform coefficient is present in the subblock (S2480); and if a non-zero transform coefficient is not present in the subblock, the encoder 140 encodes the CBP64 flag (which may be represented by, for example, 1 bit such as '0') indicating that a non-zero transform coefficient is not present in the subblock (S2490). Herein, the CBP64 flag indicates whether a non-zero quantized transform coefficient is present in a 64×64 pixel block.

If an intra prediction encoding is performed on a 64×64 pixel extended macroblock in units of 16×16 pixel blocks, the CBP64 flag and the CBP32 flag may be omitted and increment/decrement information (Δpq) of quantization parameters may be encoded as described above. Herein, the increment/decrement information of quantization parameters may be encoded in units of extended macroblocks.

If the CBP flag is encoded, and if the CBP flag is not 0, a transform type is encoded. Exceptionally, if a 16×16 pixel block is divided into four 8×8 pixel blocks, and if an encoded CBP is not 0, a transform type applied in units of 16×16 pixel blocks is encoded.

After the transform type is encoded, the CBP is encoded according to the transform type. If a 16×16 transform is used, only two CBP bits of a chrominance component are encoded; and if an 8×16 transform or a 16×8 transform is used, two CBP bits indicating whether two 8×16 or 16×8 pixel blocks in the 16×16 pixel block have a non-zero transform coefficient are encoded. However, exceptionally, if a CBP bit of the first partition block among two partition blocks is 0, a CBP bit of the second partition block may not be encoded.

Figure 25:
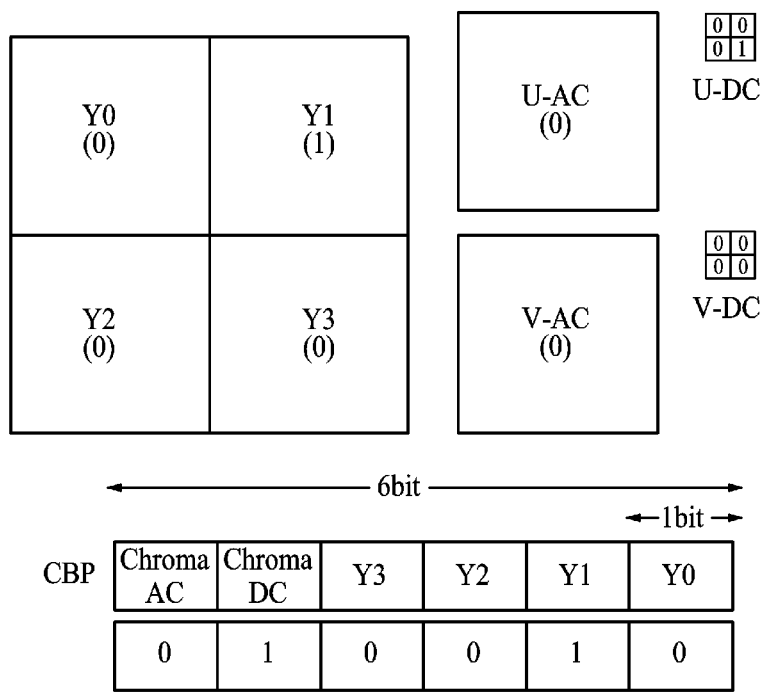
FIG. 25 is an illustration diagram illustrating a structure of a CBP according to at least one embodiment of the present disclosure.

FIG. 25 is an illustration diagram illustrating a structure of a CBP according to at least one embodiment of the present disclosure.

FIG. 25 illustrates a structure of a CBP in the case where an input video is a 4:2:0 format. If a non-zero transform coefficient is not present in the first 8×8 pixel block Y0 of a luminance component, the least significant bit (LSB) of the CBP is 0; and if a non-zero transform coefficient is present in the second 8×8 pixel block Y1, the second LSB of the CBP is 1. In this manner, the CBP is allocated to the third 8×8 pixel block Y2 and the fourth 8×8 pixel block Y3. Since a non-zero quantized transform coefficient is present in two 2×2 chrominance component DC blocks U-DC and V-DC, a bit for a chrominance DC (Chroma DC) is 1; and since a non-zero quantized transform coefficient is not present in two 8×8 chrominance component AC blocks U-AC and V-AC, a bit for a chrominance DC (Chroma AC) is 0.

Figure 26:
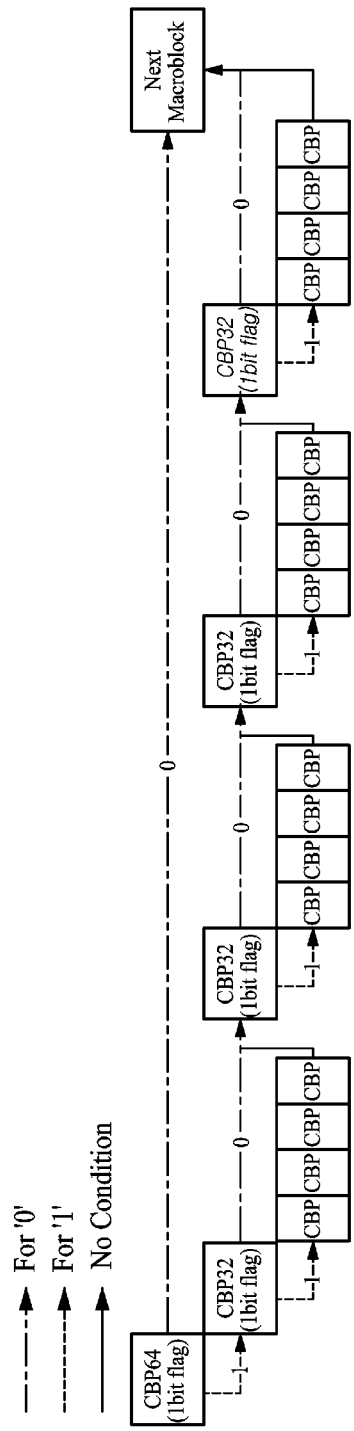
FIG. 26 is an illustration diagram of an example of a sequence of encoding a CBPX flag and a CBP according to at least one embodiment of the present disclosure.

FIG. 26 is an illustration diagram illustrating an example of a sequence of encoding a CBPX flag and a CBP according to at least one embodiment of the present disclosure.

FIG. 26 illustrates an encoding sequence of a CBP32 flag and a CBP in the case where an extended macroblock is a 64×64 pixel block and the size of a subblock being a current encoding target is 64×64, 64×32, or 32×64. In FIG. 26, a dashed dotted arrow indicates a process sequence in the case of the CBPX flag being 0, a dotted arrow indicates a process sequence in the case of the CBPX flag being 1, and a solid arrow indicates a process sequence which occurs unconditionally.

If quantized transform coefficients in a 64×64 pixel block being an extended macroblock are all 0, the CBP64 flag is encoded as 0; and if one or more of the quantized transform coefficients are not 0, the CBP64 flag is encoded as 1. If the CBP64 flag is 0, since there is no more CBP to be encoded, a CBPX flag and a CBP of a next macroblock are encoded. If the CBP64 flag is 1, a CBP32 flag of each 32×32 pixel subblock in the 64×64 pixel block is encoded; and if the CBP32 flag is 1, a CBP of four 16×16 pixel blocks in the 32×32 pixel subblock is encoded.

Figure 27:
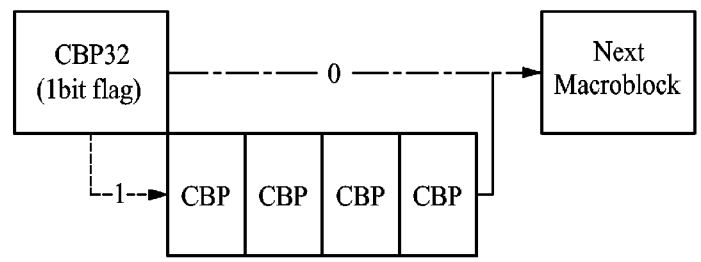
FIG. 27 is an illustration diagram of another example of a sequence of encoding a CBPX flag and a CBP for an intra macroblock according to at least one embodiment of the present disclosure.

FIG. 27 is an illustration diagram illustrating another example of a sequence of encoding a CBPX flag and a CBP for an intra macroblock according to at least one embodiment of the present disclosure.

FIG. 27 illustrates an encoding sequence of a CBP32 flag and a CBP in the case where an encoding target is a 32×32 pixel block and the size of a subblock being a current encoding target is 32×32, 32×16, or 16×32. In FIG. 27, a dashed dotted arrow indicates a process sequence in the case of the CBPX flag being 0, a dotted arrow indicates a process sequence in the case of the CBPX flag being 1, and a solid arrow indicates a process sequence which occurs unconditionally.

Referring back to FIG. 1, the encoder 140 of the video encoding apparatus 100 encodes a CBPX flag (X: an integer greater than or equal to 32) and a CBP and then encodes quantized transform coefficients only with respect to blocks having non-zero quantized transform coefficients, thereby generating encoded video data. If the size of an encoding target block is greater than the size of a transform, the encoder 140 encodes quantized transform coefficients in the block in a raster-scan order.

Figure 28:
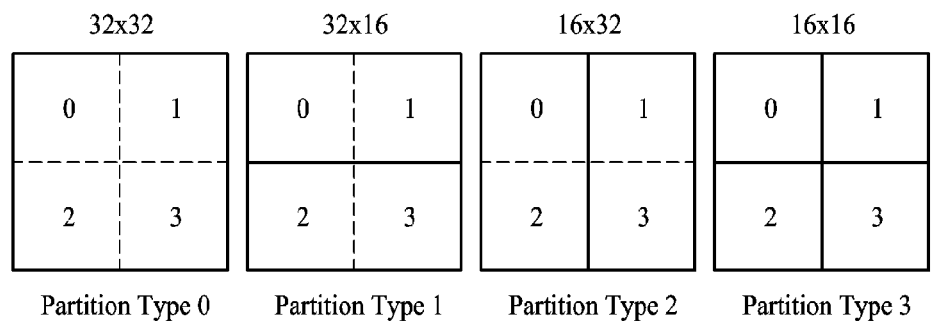
FIG. 28 is an illustration diagram of an encoding sequence of a partition type-by-partition type quantized transform coefficient according to at least one embodiment of the present disclosure.

FIG. 28 is an illustration diagram illustrating an encoding sequence of a partition type-by-partition type quantized transform coefficient according to at least one embodiment of the present disclosure.

FIG. 28 illustrates an encoding sequence of a quantized transform coefficient in the case where an encoding target block is a 32×32 pixel block. Since a 16×16 transform is performed on 16×16 or more pixel blocks (when sixteen 4×4 blocks in a 16×16 block are 4×4-transformed and then a 4×4 transform is performed on sixteen DC coefficients, it may be said that a transform is performed on 16×16 pixel units, which will be referred to as a 16×16 transform for convenience in description), four 16×16 transforms are performed on a 32×32 pixel block. Two 16×16 transforms are performed on each 32×16 pixel block, and two 16×16 transforms are performed on each 16×32 pixel block. One 16×16 transforms is performed on each 16×16 pixel block.

Figure 29:
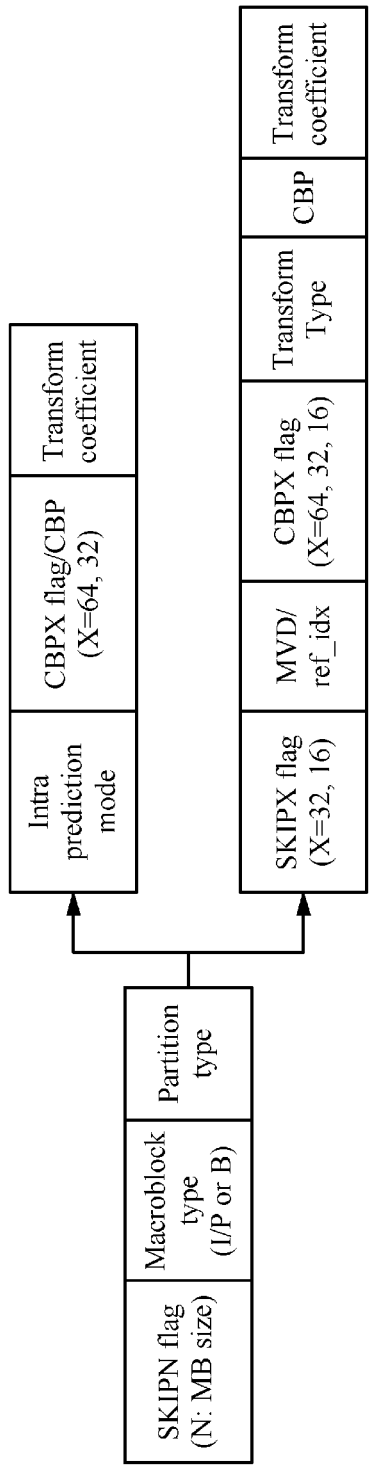
FIG. 29 is an illustration diagram of a syntax structure of encoded data according to at least one embodiment of the present disclosure.

FIG. 29 is an illustration diagram illustrating a syntax structure of encoded data for an inter picture according to at least one embodiment of the present disclosure.

FIG. 29 illustrates a syntax structure of encoded data that are generated when an input video being an inter picture is encoded according at least one embodiment of the present disclosure. As illustrated herein, encoded data of an inter picture according at least one embodiment of the present disclosure may include one or more of a SKIP_N flag field, a macroblock type field, and a partition type field. In the case of an extended macroblock being an intra macroblock, the encoded data may further include one or more of an intra prediction mode field, a CBPX flag/CBP field, and a transform coefficient field. In the case of an extended macroblock being an inter macroblock, the encoded data may further include one or more of an intra prediction mode field, a SKIPX flag field, a differential motion vector/reference picture index field, a CBPX flag field, a transform type field, a CBP field, and a transform coefficient field.

However, the syntax of encoded data for an inter picture illustrated in FIG. 29 is merely exemplary, and is not necessarily configured as illustrated in FIG. 29. That is, it should be noted that the sequence of all or a portion of the syntax of encoded data for an inter picture may be changed differently from that illustrated in FIG. 29, and a portion of the syntax may be omitted.

Referring back to FIG. 1, the encoder 140 of the video encoding apparatus 100 encodes a SKIPN flag indicating whether a macroblock being a current encoding target is a SKIP macroblock. Herein, 'N' denotes the size of a macroblock. For example, when a macroblock is a 64×64 pixel block, a SKIP64 flag indicating whether a 64×64 pixel macroblock is a SKIP macroblock is encoded. When a macroblock is a 32×32 pixel block, a SKIP32 flag indicating whether a 32×32 pixel macroblock is a SKIP macroblock is encoded. Likewise, a SKIP16 flag indicating whether a 16×16 pixel macroblock is a SKIP macroblock is encoded.

If a macroblock is a SKIP macroblock, since a current macroblock has no data to be encoded, a next macroblock is encoded. If a macroblock is not a SKIP macroblock, a macroblock type flag indicating whether the macroblock is an intra macroblock or an inter macroblock is transmitted. For example, if an input video to be currently encoded is a P picture, available macroblock types are an I-macroblock and a P-macroblock; and if an input video to be currently encoded is a B picture, available macroblock types are an I-macroblock and a B-macroblock.

Since a partition type field, an intra prediction mode field for an intra picture, a CBPXflag/CBP field, and a transform coefficient field have been described above with reference to FIG. 17, a SKIPX flag field for an inter picture, a differential motion vector/reference picture index field, a CBPX flag field, a transform type field, a CBP field, and a transform coefficient field will be described below.

In the case of a P-picture or a P-slice, all of the block types in FIG. 4 may be used for a motion estimation, and an intra mode or an inter mode may be selected in an extended macroblock in units of 16×16 pixel blocks. That is, both the intra mode and the inter mode may be used in an extended macroblock of a P-picture or a P-slice.

If an encoding target is a 32×32 pixel block, whether to perform an encoding in units of 32×32 pixel blocks or in units of 16×16 pixel blocks may be indicated by an extended macroblock flag (extended_mb_flag). For example, if the extended macroblock flag is 1, it may indicate that an encoding is performed in units of 32×32 pixel blocks, and if the extended macroblock flag is 0, it may indicate that an encoding is performed in units of 16×16 pixel blocks. If the extended macroblock flag is 0, the extended macroblock may be divided into four 16×16 pixel blocks, so that whether it is an intra mode or an inter mode may be determined in units of 16×16 pixel blocks. In addition, each 16×16 pixel block may be divided into smaller subblocks prior to encoding.

Figure 30:
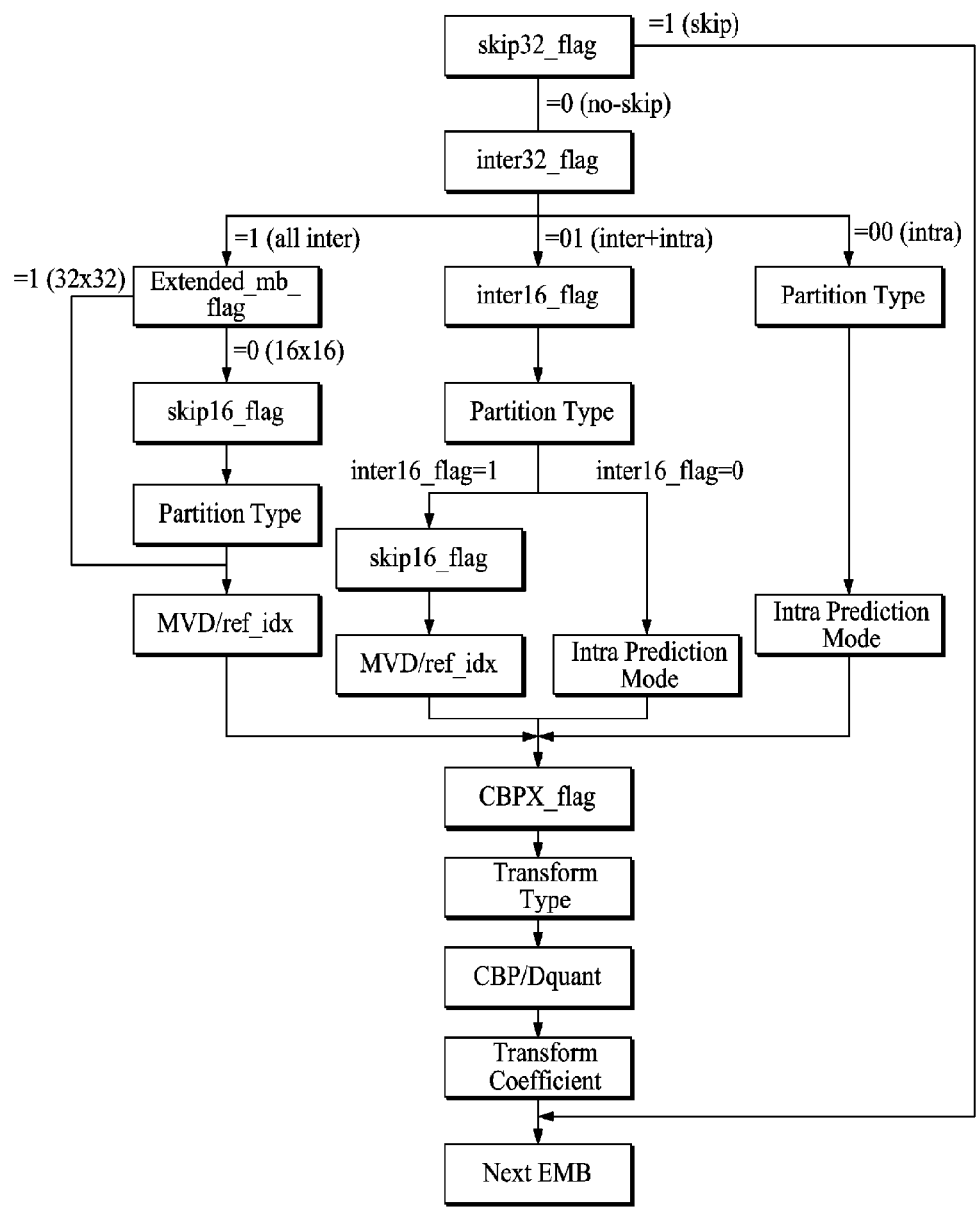
FIG. 30 is a diagram for describing an example of a syntax used in a P-picture (or P-slice) according to at least one embodiment of the present disclosure.

FIG. 30 is a diagram for describing an example of a syntax used in a P-picture (or P-slice) according to at least one embodiment of the present disclosure. For simplicity in description, it is assumed that an extended block is a 32×32 pixel block.

In the case of entropy encoding, if a context-adaptive binary arithmetic coding (CABAC) encoding is performed, a skipX_flag and an interX_flag may have different context tables according to X values. For example, a skip32_flag and a skip16_flag may have different context tables. This will be described later in detail.

The skipX_flag indicates whether a current block to be encoded is a SKIP mode, and may use 1 bit to indicate whether a current block is a SKIP mode, as illustrated in FIG. 5. For example, an encoding bit of the skipX_flag is 1, it may indicate that a current block is a SKIP mode. Herein, 'X' denotes a number greater than or equal to 16, within the range of an extended macroblock.

TABLE 5

| SkipX_flag | Encoding Bits |
| --- | --- |
| No Skip Mode | 0 |
| Skip Mode | 1 |

If a current block is not a SKIP mode, an interX_flag is encoded. Herein, the interX_flag indicates whether a current block is an intra mode or an inter mode, and may indicate whether pixel blocks in a 1 bit or 2 bit extended macroblock are an intra mode or an inter mode, as illustrated in FIG. 6.

TABLE 6

| InterX_flag | Encoding Bits |
| --- | --- |
| All Blocks in EMB are Inter Mode | 1 |
| Intra Block and Inter Block Coexist in EMB | 01 |
| All Blocks in EMB are Intra Mode | 00 |

For example, if an interX_flag is '00', it means that all subblocks in an extended macroblock are an intra mode. In this case, a 32×32 pixel block being an extended macroblock is divided into four 16×16 pixel blocks, and each 16×16 pixel block is encoded by the above-described intra prediction encoding method. Thus, if all subblocks in an extended macroblock are an intra mode, a block type of the subblock, an intra prediction mode of a luminance component and a chrominance component, a CBP, a quantization parameter, and a transform coefficient may be encoded.

As illustrated in FIG. 30, with respect to a 32×32 pixel block being an extended macroblock, if a skip32_flag is 0 and an inter32_flag is 1, it means that all subblocks in the extended macroblock are an inter mode, and an 'extended_mb_flag' being a 1-bit flag is transmitted. Herein, if the extended_mb_flag is 1, it means that a motion compensation is performed in units of extended macroblocks; and since there is one motion vector, one MVD/ref_idx is encoded. Herein, the MVD/rex_idx denotes a motion vector information/reference index included in the extended macroblock. If the extended_mb_flag is 0, it means that the extended macroblock has been divided into 16×16 pixel blocks prior to encoding, and a skip16_flag indicating whether each 16×16 pixel block is a SKIP mode is encoded. In this case, a block type and an MVD/ref_idx are encoded only with respect to a 16×16 pixel block not being a SKIP mode. The skip16_flag may be encoded by using Table 5. Herein, if the skip32_flag and the skip16_flag are CABAC-encoded, the respective syntaxes may have different context tables as described above.

With respect to the extended macroblock, if the skip32_flag is 0 and the inter32_flag is 01, it means that an inter mode and an intra mode are both used in the extended macroblock. In this case, the 'extended_mb_flag' is not necessary, and since it means that the extended macroblock has been divided into 16×16 pixel blocks prior to encoding, it may be encoded by using Table 7 that indicates whether each 16×16 pixel block is an intra mode or an inter mode.

TABLE 7

| Inter16_flag | Encoding Bits |
| --- | --- |
| All Blocks in 16 × 16 Block are Inter Mode | 1 |
| All Blocks in 16 × 16 Block are Intra Mode | 0 |

Herein, if an intra mode and an inter mode coexist in the extended macroblock, all subblocks in each 16×16 pixel block are mostly an inter mode or an intra mode, and it is rare that an intra-mode subblock and an inter-mode subblock will coexist in the 16×16 pixel block. Thus, after a partition type of each 16×16 pixel block is encoded, a luminance component and a chrominance component of the subblocks in a 16×16 pixel block, which has an inter16_flag of 0 or is an intra mode, is encoded as a prediction mode. In addition, with respect to 16×16 pixel blocks, which have an inter16_flag of 1 or are an inter mode, the skip16_flag is encoded by using Table 5. The reason for encoding the skip16_flag after encoding the partition type is that, since the coexistence of an intra mode and an inter mode in the extended macroblock means a region having some textures, there is a high possibility that an inter mode adjacent to an intra mode will be divided into small blocks, and thus the partition type may be better transmitted first and then the skip16_flag may be encoded only with respect to a 16×16 pixel block. However, the encoding sequence is not limited thereto. For example, the partition type may be encoded after the skip16_flag is encoded.

The subsequent encoding of a CBPX_flag, a transform type, a CBP/quantization parameter, and a transform coefficient is the same as described above, and thus a description thereof will be omitted. However, in the case of an intra picture/slice or an intra EMB, a CBPX_flag may not be encoded.

As in the case where the extended macroblock is a 32×32 pixel block, if the extended macroblock is a 64×64 pixel block, partition type information of a current block to be encoded and then the skipX_flag is encoded only with respect to 16×16 or more pixel subblocks. Herein, 'X' denotes a subblock size such as 16 or 32. For example, if a macroblock is a 64×64 pixel block and is not a SKIP mode, and if the size of a subblock of an extended macroblock is one of 64×32, 32×64 and 32×32, a skip32_flag is encoded with respect to each subblock. If the size of a subblock of a 64×64 pixel extended macroblock is 64×32 or 32×64, two skip32_flags are encoded. If the size of a subblock is smaller than 32×32, a skip32_flag is not encoded. In addition, if the size of a subblock is one of 32×16, 16×32 and 16×16, a skip16_flag of each subblock is encoded.

Figure 31:
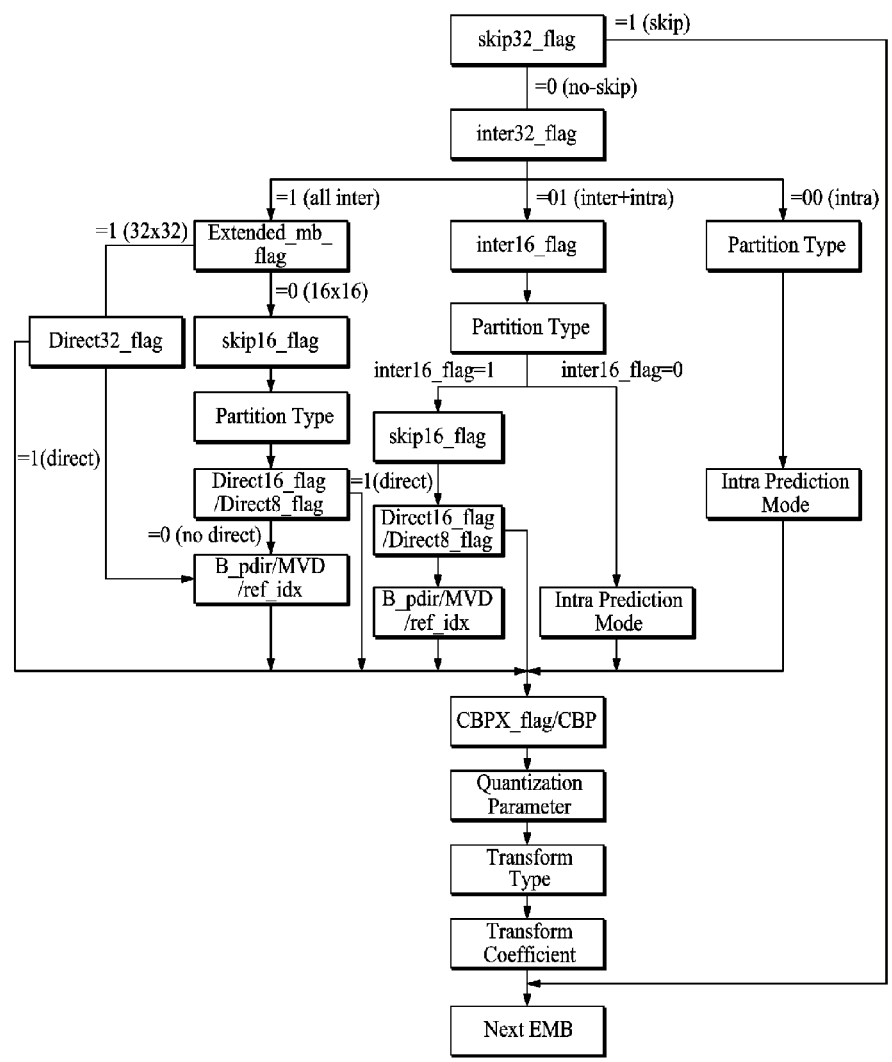
FIG. 31 is a diagram for describing an example of a syntax used in a B-picture (or B-slice) according to at least one embodiment of the present disclosure.

FIG. 31 is a diagram for describing an example of a syntax used in a B-picture (or B-slice) according to at least one embodiment of the present disclosure.

In the case of a B-picture, up to two reference pictures may be selected, which are respectively referred to as an L0 prediction and an L1 prediction. The respective reference pictures perform different functions. In general, the L0 prediction (List 0 Prediction) is used as a forward prediction, and the L1 prediction is used as a reverse prediction. That is, the B-picture may use, as reference pictures, a picture followed by a current encoding target picture and a picture following the current encoding target picture, and the two reference pictures may be simultaneously used (bidirectional prediction) to perform a motion estimation and compensation. All block types of FIG. 2 may be used as the block types used for a motion prediction, and an intra mode or an inter mode may be selected in an extended macroblock in units of 16×16 pixel blocks, as in the case of a P-picture. In at least one embodiment of the present disclosure, the two pictures are not limited as being a picture followed by a current picture and a picture following the current picture, and two random pictures may be used as reference pictures regardless of the sequence thereof. Such two reference pictures may be used to perform a motion estimation/compensation (bidirectional prediction).

Examples of the encoding mode available in the B-picture according to at least one embodiment of the present disclosure include an intra mode, a SKIP mode, a direct mode, an L0 prediction, an L1 prediction, and a bidirectional prediction.

The intra mode may perform an encoding by using the same intra encoding method as described above. The intra mode may be selected in units of extended macroblocks, or in units of 16×16 pixel blocks included in the extended macroblock.

The SKIP mode transmits only a flag indicating that a current block to be encoded is a SKIP mode. Herein, the SKIP mode may be used for 16×16 or more pixel blocks such as a 16×16 pixel block and a 32×32 pixel block. For example, a predicted B_pred_dir, a predicted motion vector MVD, and a predicted ref_idx are used to perform a motion compensation, and a reference block obtained through the motion compensation is a reconstructed block. Herein, the B_pred_dir is a predicted direction of a B-picture, which means two directions of L0 and L1.

The direct mode encodes only a flag indicating a direct mode, and data relevant to a transform coefficient encoding (for example, CBPX_flag/CBP, quantization parameter, transform type, and transform coefficient). That is, the direct mode is an encoding mode omitting a motion information encoding, and may be used for 8×8 or more pixel blocks such as 8×8, 16×16 and 32×32. In the case of an N×N direct mode, a motion estimation and compensation is performed in units of N/2×N/2 pixel blocks. For example, in the case of an 8×8 direct mode, a motion estimation and compensation is performed in units of 4×4 pixel blocks.

The L0 prediction is a unidirectional prediction that uses only L0 motion information, and the L1 prediction is a unidirectional prediction that uses only L1 motion information. The bidirectional prediction is a prediction that uses L0 motion information and L1 motion information and uses an average value of two pictures as a reference picture.

Examples of the motion estimation method for a B-picture include a motion estimation/compensation method of a direct prediction mode, a motion estimation/compensation method of a SKIP mode, a motion estimation/compensation method of a unidirectional prediction (L0 prediction or L1 prediction), and a motion estimation/compensation method of a bidirectional prediction.

First, regarding the motion estimation/compensation method of a direct prediction mode, the direct mode includes a motion estimation/compensation method of a temporal direct prediction mode, and a motion estimation/compensation method of a spatial direct prediction mode using a motion information correlation of a spatial direction (a vertical/horizontal two-dimensional space in a picture). One of the temporal direct prediction mode and the spatial direct prediction mode is selected in units of slices, not in units of macroblocks or blocks. In the direct prediction mode, a reference picture having the smallest reference number in an L1 prediction is important, which is referred to as an 'anchor picture'. The nearest reference picture in a reverse direction of a target picture in a display order is an anchor picture, and a block located at the same spatial position as a target block in the anchor picture is referred to as an 'anchor block'.

In the temporal direct prediction mode, motion information of an anchor block is checked, and an mvCol (MV or the Co-located block, a motion vector of the same block) is used as an L0 motion vector of the anchor block. If an L0 motion vector of the anchor block is absent and an L1 motion vector is present, the L1 motion vector is used as the mvCol. An L0 reference picture of a temporal direct prediction mode is a reference picture of the mvCol, and an L1 reference picture of a temporal direct prediction mode is an anchor picture. If the anchor block does not have encoded motion information in a picture, the magnitude of a motion vector is 0, and an L0 reference picture of a temporal direct prediction mode is a reference picture number 0. In addition, an L0 motion vector mvL0 and an L1 motion vector mvL1 is obtained from the motion vector mvCol. If a motion velocity between the reference picture, the target picture and the anchor picture is constant, the magnitude of mvL0 and mvL1 is proportional to the distance between the reference picture, the target picture and the anchor picture and thus is calculated by proportional distribution. That is, the mvL0 may be calculated by Equation 5 using a distance tb between the reference picture and the target picture and a distance td between the reference picture and the anchor picture.

$$mvL0 = mvCol \times \frac{tb}{td}$$ Equation 5

In addition, since the mvL1 and the mvCol are in the same direction, they may be calculated by Equation 6.

$$mvL1 = -mvCol \times \frac{td - tb}{td} = mvL0 - mvCol$$ Equation 6

Likewise, in the spatial direct prediction mode, an anchor picture being a reference picture having the smallest reference number in an L1 prediction, and an anchor block located at the same spatial position as the anchor picture are used to calculate a motion vector. In the spatial direct prediction mode, a motion vector of a target block is predicted from a motion vector encoded in a target picture. A portion of the concept of the temporal direct prediction mode is also introduced in the spatial direct prediction mode. When motion information of the anchor block satisfies all of the conditions that i) the magnitude of a motion vector of the anchor block is smaller than or equal to ±1 pixel in the horizontal and vertical directions, ii) a reference number of a reference picture of the anchor block is 0, and iii) a reference picture of the minimum reference number in L0 is a short-term reference picture, an L0 motion vector mvL0 and an L1 motion vector mvL1 is set to be 0. In addition, a picture having the smallest reference number in an L0 prediction is set to be an L0 predicted picture, and a picture having the smallest reference number in an L1 prediction is set to be an L1 predicted picture. When these conditions are satisfied, the motion vectors mvL0 and mvL1 of the target block and the reference pictures L0 and L1 are calculated from the motion vector encoded in the target picture.

In the L0 prediction, L0 predicted motion vectors mvA, mvB and mvC located at the left side, the upper side, and the left upper side are used to calculate a mean value of horizontal and vertical components, and it is set to be mvL0. Likewise, in the L1 prediction, L1 predicted motion vectors mvA, mvB and mvC located at the left side, the upper side and the right upper side are used to calculate a mean value of horizontal and vertical components, and it is set to be mvL1. If an adjacent block assumes a unidirectional prediction or an L0 prediction encoded in a picture, or if a motion vector of an L1 prediction is not present, it is replaced by a 0 vector. A minimum value of the reference numbers of the motion vectors mvA, mvB and mvC located at the left side, the upper side, and the right upper side is calculated, and it is set to be a reference number of an N×N block. This reference number calculation is performed independently from the L0 prediction and the L1 prediction. In addition, if an adjacent block assumes a unidirectional prediction, or if a motion vector of an L0 or L1 prediction predictive-encoded in a picture is not present, the block is excluded in calculating a reference number. Herein, it should be noted that, when a direct prediction mode of an N×N pixel block is performed, a process of calculating the mvL0, the mvL1, the L0 reference picture, and the L1 reference picture is performed in units of N×N pixel blocks, but whether to use a 0 vector or the motion vector (mvL0, mvL1) calculated from an adjacent block is determined in units of blocks.

The motion estimation/compensation method of a SKIP mode will be described below.

The SKIP mode is identical to the SKIP mode of a P-picture in that a predicted motion vector is used to perform a motion prediction and compensation. However, a motion vector used in the SKIP mode in a B-picture, and a predicted motion vector of a direct mode of a reference picture are identical to a reference picture. That is, the motion estimation/compensation method of a SKIP mode is identical to the above-described motion estimation/compensation method of a direct prediction mode. The direct mode and the SKIP are different in that the SKIP mode does not have motion information and transform coefficients but the direct mode does not have only motion information.

The motion estimation/compensation method of a unidirectional prediction (L0 prediction or L1 prediction) is identical to the motion estimation/compensation method of a P-picture with the exception that a reference picture is one of L0 and L1. Thus, a description thereof will be omitted.

Lastly, the motion estimation/compensation method of a bidirectional mode will be described below.

With respect to 8×8 or more pixel blocks in a B-picture having motion information, by using the above-described motion estimation/compensation method of a P-picture, an L0 reference picture and mvL0 are calculated to perform an L0 prediction, and an L1 reference picture and mvL1 are calculated to perform an L1 prediction. In addition, an average block of a reference block indicated by the mvL0 in the L0 reference picture calculated through the L0 prediction process and a reference block indicated by the mvL1 in the L1 reference picture calculated through the L0 prediction process may be used as a reference block to perform a bidirectional prediction on the mvL0 and the mvL1. In addition, an L1 prediction regarding motion information of an L0 prediction may be performed to select an optimal mvL1, L1 reference picture with respect to an mvL0/0 reference picture, and a average block of a reference block indicated by the mvL1 in the selected L1 reference picture and a reference block indicated by the mvL0 in the L0 reference picture calculated through the L0 prediction process may be used as a reference block to perform a bidirectional prediction. In addition, an L0 prediction regarding motion information of an L1 prediction may be performed to select an optimal mvL0, L0 reference picture with respect to an mvL1/1 reference picture, and a average block of a reference block indicated by the mvL0 in the selected L0 reference picture and a reference block indicated by the mvL1 in the L1 reference picture calculated through the L1 prediction process may be used as a reference block to perform a bidirectional prediction. The encoding efficiencies of the directional prediction mode with respect to 8×8 or more pixel blocks in a B-picture having motion information may be compared, and one bidirectional prediction mode providing the better encoding efficiency may be selected. With respect to 16×16 or more pixel blocks, when motion information of the above-described bidirectional prediction modes is obtained to determine an optimal encoding mode, transform, quantization, and entropy transform coefficient encoding may be performed, and a prediction error (distortion) and actual encoding bits required in the relevant mode may be used to determine a bidirectional prediction mode.

With respect to the L0 prediction, the L1 prediction and the bidirectional prediction, 8×8 or more pixel blocks may use different reference pictures, but subblocks in an 8×8 pixel block use the same reference picture.

Referring to FIG. 1, the subtracter 120 generates a residual block by subtracting, from the current block, the reference block indicated by the motion vector of the current block estimated by the motion estimator 116. The residual block is transformed and quantized by the transformer/quantizer 130, and a quantized transform coefficient is encoded by the encoder 140, thereby generating encoded data. Herein, a transform method for a B-picture is identical to the above-described transform method of a P-picture, and thus a detailed description thereof will be omitted.

FIG. 31 illustrates data to be transmitted through a bitstream of a B-picture (or B-slice) on the assumption that an extended macroblock is a 32×32 pixel block. In general, a transmission syntax of a B-picture (or B-slice) is similar to the transmission syntax of a P-picture (or B-slice) described with reference to FIG. 30. Herein, only a portion added to the syntax of a P-picture will be described.

A directX_flag is a flag indicating a direct mode only with respect to an extended macroblock, 16×16 or more pixel blocks, and 8×8 or more pixel blocks among the inter blocks not being a SKIP mode, which may be comprised of 1 bits as illustrated in Table 8.

TABLE 8

| DirectX_flag | Encoding Bits |
| --- | --- |
| No Direct Mode | 0 |
| Direct Mode | 1 |

In the case of a direct mode, motion information is not encoded, and information relevant to transform coefficients is encoded. In addition, if an extended macroblock is not a direct mode, data of motion information (for example, B_pdir, MVD, and ref_idx) are encoded. Herein, the B_pdir is information representing a prediction direction (L0 prediction, L1 prediction, and bidirectional prediction) of a current block. Only inter blocks not being a SKIP or direct mode are encoded, and there are three modes as illustrated in Table 9.

TABLE 9

| InterX_flag | Encoding Bits |
| --- | --- |
| L0 Prediction | 00 |
| L1 Prediction | 01 |
| Bidirectional Prediction | 1 |

In the case of a bidirectional prediction, motion information (mvL0 and ref_idx_L0) for an L0 prediction, and motion information (mvL1 and ref_idx_L1) for an L1 prediction are all encoded. In the case of an L0 prediction, only motion information (mvL0 and ref_idx_L0) for an L0 prediction is encoded. In the case of an L1 prediction, only motion information (mvL1 and ref_idx_L1) for an L1 prediction is encoded.

Figure 32:
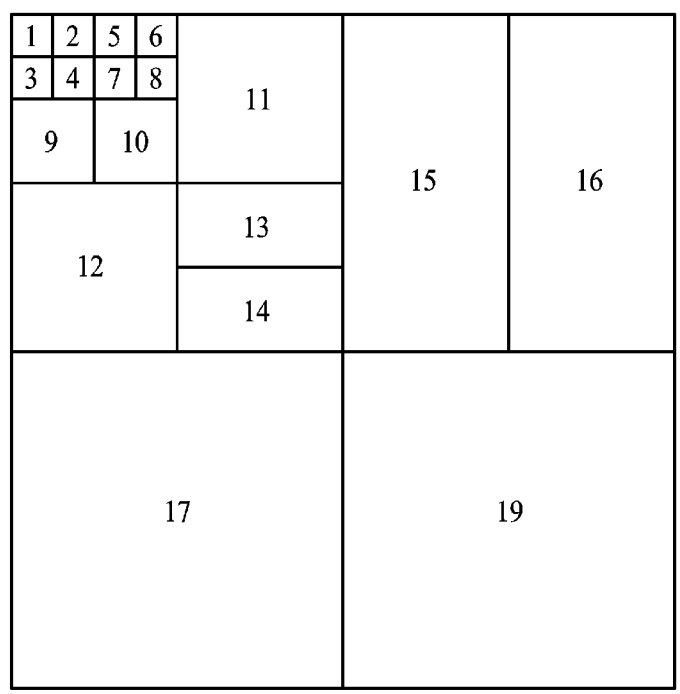
FIG. 32 is an illustration diagram for describing an encoding process of a SKIPX flag according to at least one embodiment of the present disclosure.

FIG. 32 is an illustration diagram for describing an encoding process of a SKIPX flag according to at least one embodiment of the present disclosure.

FIG. 32 illustrates, if a macroblock is a 64×64 pixel block and is divided in subblocks of various sizes and shapes, partition types of the macroblock and an encoding sequence of each subblock. If a macroblock is divided as illustrated in FIG. 32, a SKIP16 flag of the eleventh 16×16 pixel subblock, a SKIP16 flag of the twelfth 16×16 pixel subblock, a SKIP16 flag of the fifteenth 16×32 pixel subblock, a SKIP16 flag of the sixteenth 16×32 pixel subblock, a SKIP32 flag of the seventeenth 32×32 pixel subblock, and a SKIP32 flag of the eighteenth 32×32 pixel subblock are sequentially encoded in the order named.

With respect to the subblocks not being a SKIP macroblock, motion information including a differential motion vector (DMV) being a difference vector between a motion vector of a relevant subblock and a predicted motion vector estimated by using adjacent blocks of the relevant subblock is encoded.

Figure 33:
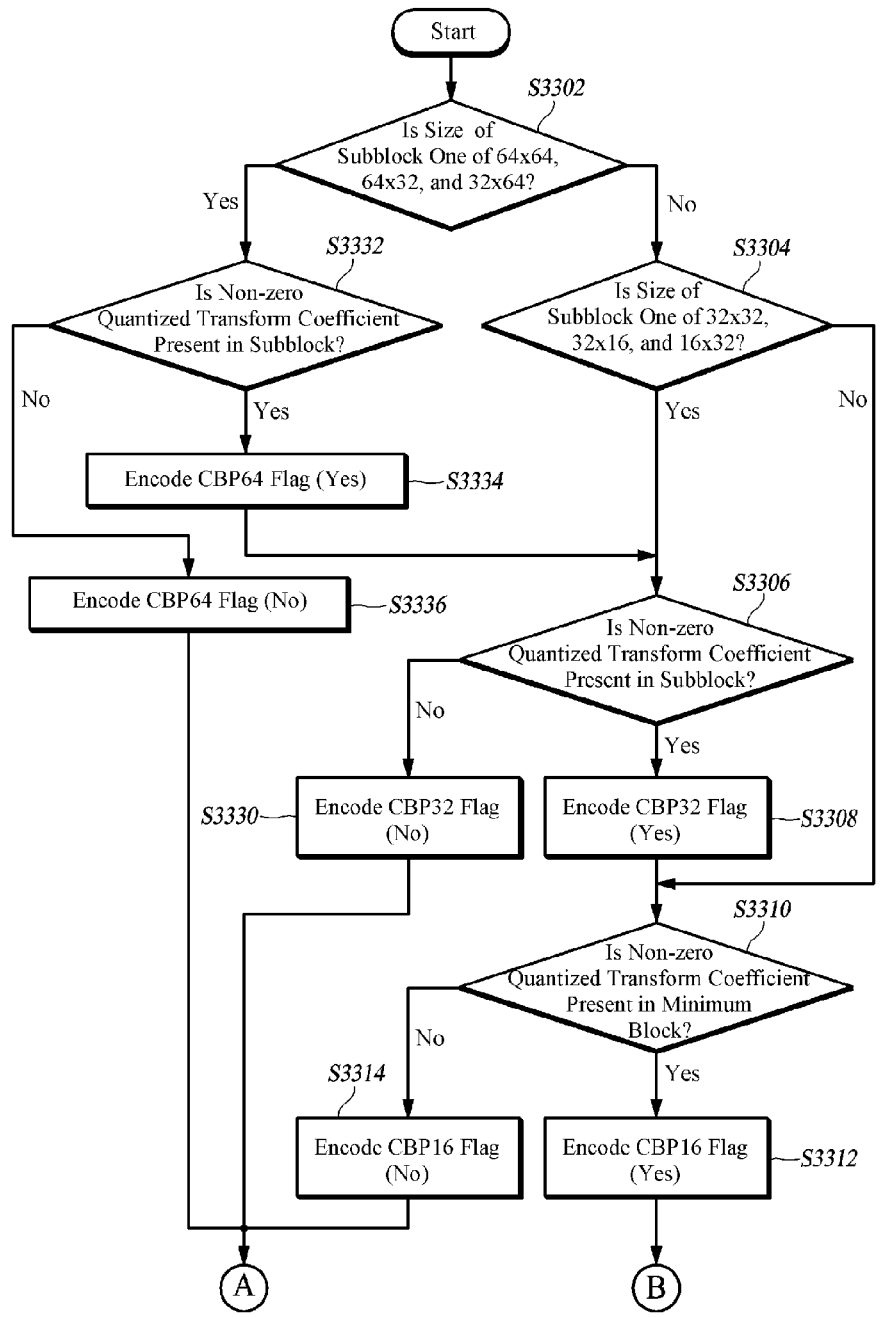
FIGS. 33 and 34 are illustration diagrams for describing a process of encoding a CBPX_flag, a transform type, and a CBP for an inter macroblock according to at least one embodiment of the present disclosure.
Figure 34:
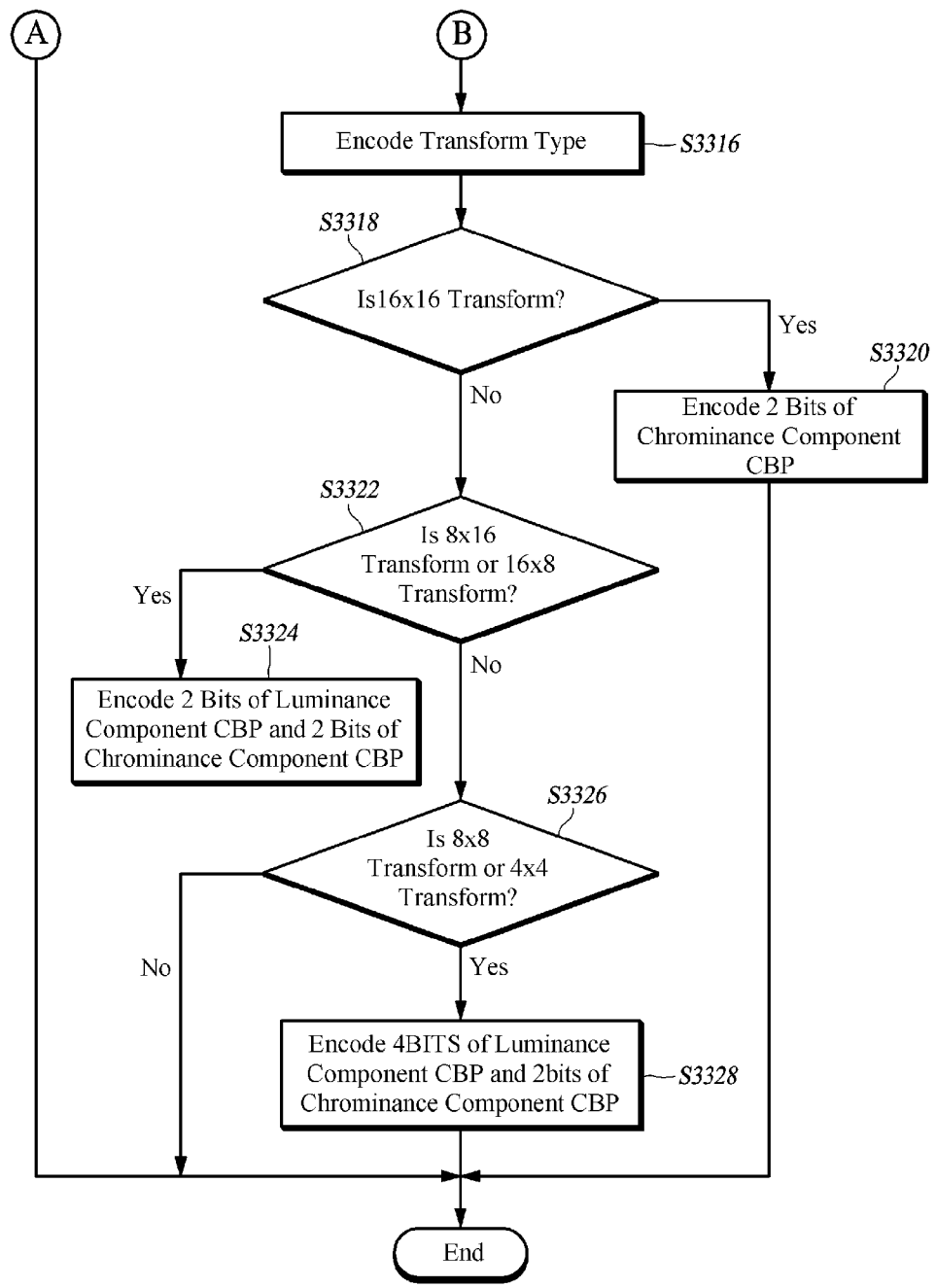

FIGS. 33 and 34 are illustration diagrams for describing a process of encoding a CBPX_flag, a transform type, and a CBP for an inter macroblock according to at least one embodiment of the present disclosure.

FIGS. 33 and 34 illustrate, if a macroblock is a 64×64 pixel block, a process of encoding a CBPX_flag, a transform type, and a CBP. The encoder 140 of the video encoding apparatus 100 determines whether the size of a subblock of the extended macroblock is one of 64×64, 64×32 and 32×64 (S3302). If the size of the subblock of the extended macroblock is not one of 64×64, 64×32 and 32×64, the encoder 140 determines whether the size of subblock is one of 32×32, 32×16 and 16×32 (S3304).

If it is determined in step S3304 that the size of the subblock is one of 32×32, 32×16 and 16×32, the encoder 140 determines whether a non-zero quantized transform coefficient is present in the subblock (S3306). If a non-zero quantized transform coefficient is present in the subblock, the encoder 140 encodes a CBP32 flag (which may be represented by, for example, 1 bit such as '1') indicating that a non-zero quantized transform coefficient is present in the subblock (S3308).

After the CBP32 flag is encoded in step S3308, the encoder 140 determines whether a non-zero quantized transform coefficient is present in a 16×16 pixel block (S3310). If a non-zero quantized transform coefficient is present in a 16×16 pixel block, the encoder 140 encodes a CBP16 flag indicating whether a non-zero quantized transform coefficient is present in the 16×16 pixel block (S3312).

After the CBPX flag is encoded as above, the encoder 140 encodes a transform type only with respect to the blocks having a non-zero quantized transform coefficient (S3316). Herein, if the size of the subblock is greater than or equal to 16×16, a transform type is encoded in units of subblocks; and if the size of the subblock is smaller than 16×16, a transform flag is encoded in units of 16×16. The reason for this is that a transform is selected in units of 16×16 pixels. For example, if the 64×64 pixel macroblock is divided into two 64×32 pixel subblocks and a CBP64 flag is not 0, a transform type is encoded with respect to two 64×32 pixel subblocks having a non-zero CBP32 flag in each 64×32 pixel subblock.

Herein, if the size of the subblock is greater than or equal to 16×16 and all CBPX flags belonging to the subblock are not 0, a transform type of each subblock is encoded by using Table 3.

TABLE 10

| Partition Type | Binary String | |
| --- | --- | --- |
| 4 × 4 Transform | 0 | |
| 8 × 8 Transform | 1 | 0 |
| 16 × 16 Transform | 1 | 1 |

In addition, if a CBP16 flag is not 0 and a 16×16 pixel block is divided into two 8×16 or 16×8 pixel blocks, a transform type is encoded in units of 16×16 pixel blocks by using Table 4.

TABLE 11

| Partition Type | Binary String | |
| --- | --- | --- |
| 4 × 4 Transform | 0 | |
| 8 × 8 Transform | 1 | 0 |
| 16 × 16 or 8 × 16 Transform | 1 | 1 |

If the CBP16 flag is not 0; the 16×16 pixel block is divided into four 8×8 pixel blocks; and a 4×4 transform is selected, 0 is encoded as a transform type; and if an 8×8 transform is selected, 1 is encoded as a transform type. In the other cases, a transform type is not encoded.

After the transform type is encoded in step S3316, the encoder 140 encodes a CBP according to the transform type. To this end, the encoder 140 determines whether the transform type is a 16×16 transform (S3318). If the transform type is a 16×16 transform, the encoder 140 encodes only two CBP bits of a chroma component (S3320). If the transform type is not a 16×16 transform, the encoder 140 determines whether the transform type is an 8×16 transform or a 16×8 transform (S3322). If the transform type is an 8×16 transform or a 16×8 transform, the encoder 140 encodes two CBP bits of a luma component and two CBP bits of a chroma component (S3324). If the transform type is not an 8×16 transform or a 16×8 transform, the encoder 140 determines whether the transform type is an 8×8 transform or a 4×4 transform (S3326). If the transform type is an 8×8 transform or a 4×4 transform, the encoder 140 encodes four CBP bits of a luma component and two CBP bits of a chroma component (S3328). In steps S3320, S3324 and S3328, a description is given of an exemplary method of encoding a CBP of a luma component and a CBP of a chroma component in the case where an input video is a 4:2:0 format. Thus, if the format of an input video changes, a method of encoding a CBP of a luma component and a CBP of a chroma component may vary accordingly.

On the other hand, if it is determined in step S3306 that a non-zero quantized transform coefficient is not present in the subblock, the encoder 140 encodes a CBP32 flag indicating that a non-zero quantized transform coefficient is not present in the subblock (S3330). Since a non-zero quantized transform coefficient is not present in the subblock, a transform type and a CBP are not encoded.

In addition, if it is determined in step S3302 that the size of the subblock is one of 64×64, 64×32 and 32×64, the encoder 140 determines whether a non-zero quantized transform coefficient is present in the subblock (S3330). If a non-zero quantized transform coefficient is present in the subblock, the encoder 140 encodes a CBP64 flag indicating that a non-zero quantized transform coefficient is present in the subblock (S3334). The process proceeds to step S3306. If a non-zero quantized transform coefficient is not present in the subblock, the encoder 140 encodes a CBP64 flag indicating that a non-zero quantized transform coefficient is not present in the subblock (S3336). Since a non-zero quantized transform coefficient is not present in the subblock, a transform type and a CBP are not encoded.

In this manner, after encoding a CBPX (X: an integer greater than or equal to 32) and a CBP, the encoder 140 of the video encoding apparatus 100 encodes a quantized transform coefficient only with respect to blocks having a non-zero quantized transform coefficient to generate encoded video data, and allocates the same to a transform coefficient field. A method of encoding the quantized transform coefficient is the same as the above-described method of encoding the quantized transform coefficient of the intra macroblock.

In at least one embodiment of the present disclosure, a CABAC (Context-based Adaptive Variable Length Code) may be used as a variable-length encoding method, and a CABAC encoding includes a binary arithmetic coding unit and a context calculating unit.

The binary arithmetic coding unit is a binarizing unit for conversion to a binary signal (0 or 1 signal). The context calculating unit retains a plurality of occurrence probabilities of a binary signal to be encoded (context table), and transfers an occurrence probability of a binary signal to the binary arithmetic coding unit while changing an occurrence probability of a binary signal according to a current encoding target and surrounding conditions. Herein, the context table is initialized at the start of a slice encoding/decoding, and is updated in a slice. Each syntax has a different table (occurrence probability) according to a ctxIdx (context number), and the ctxIdx is calculated by Equation 7.

$$ctxIdx = ctxIdx\_offset + ctx\_inc \qquad \text{Equation 7}$$

Figure 35:
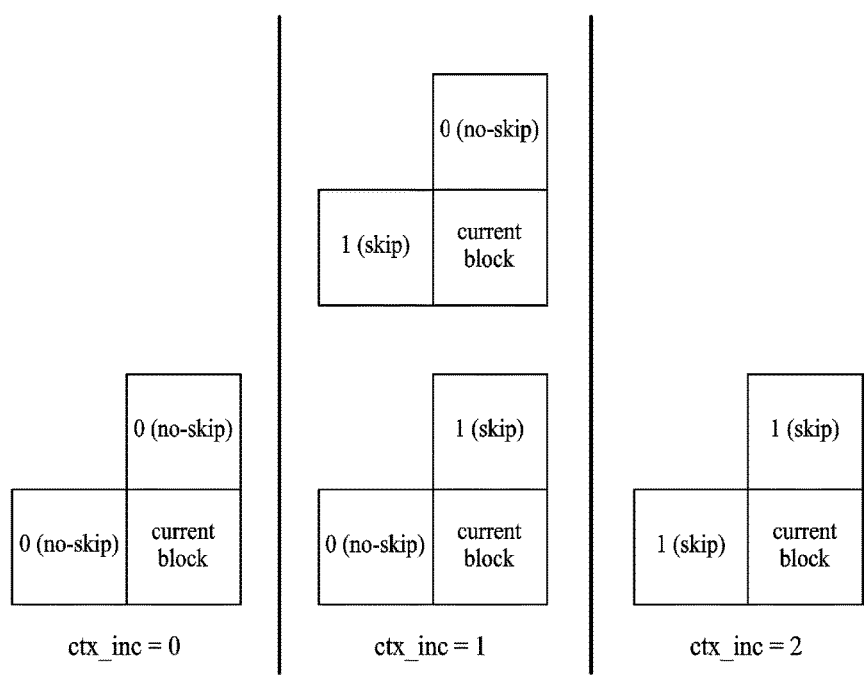
FIG. 35 is a diagram illustrating an example of a ctx_inc for encoding/decoding a skipX_flag according to at least one embodiment of the present disclosure.
Figure 36:
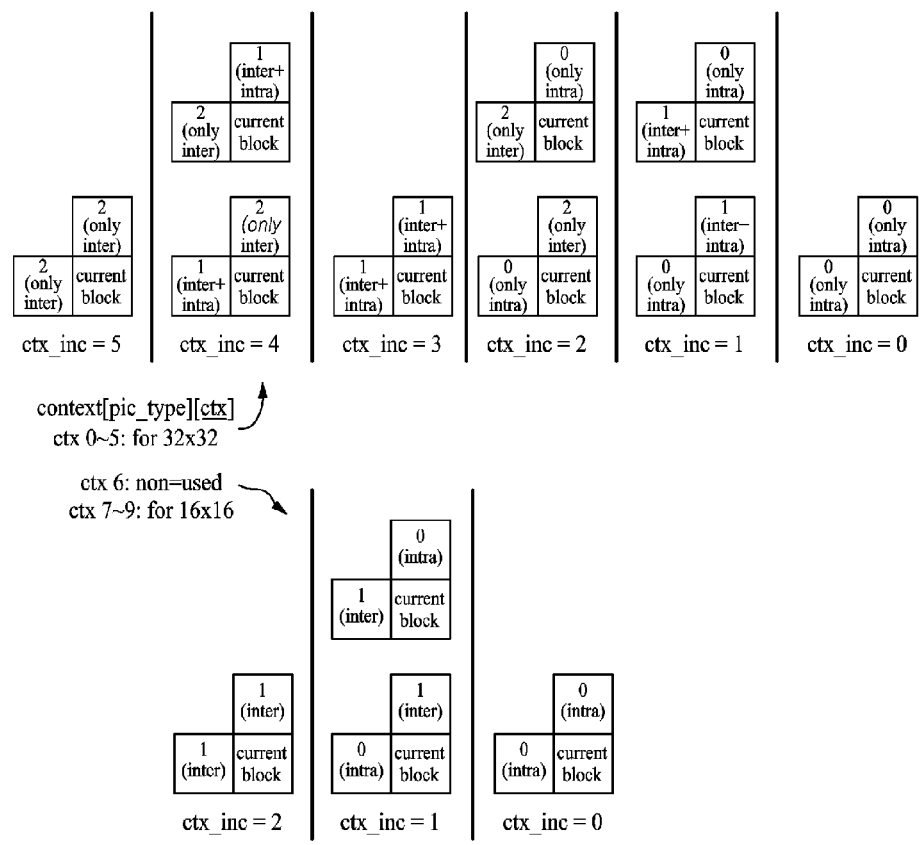
FIG. 36 is a diagram illustrating an example of a ctx_inc for encoding/decoding an interX_flag according to at least one embodiment of the present disclosure.
Figure 37:
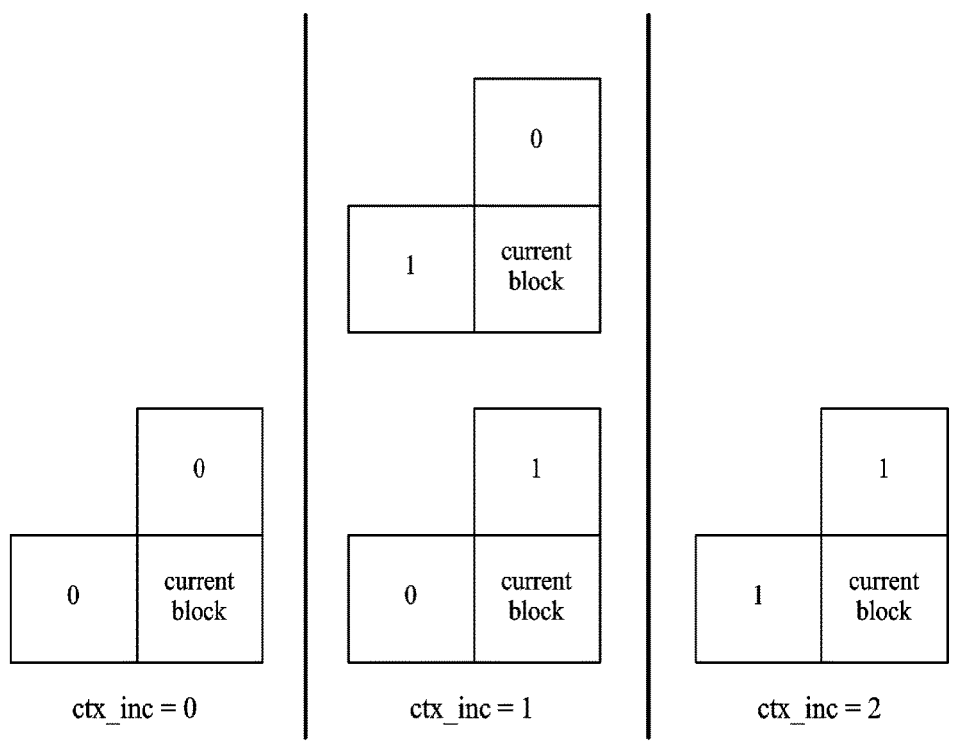
FIG. 37 is a diagram of an example of a ctx_inc for encoding/decoding a directX_flag according to at least one embodiment of the present disclosure.

Herein, a ctx_offset is determined by a picture type and a syntax type. In this case, an interX_flag may be better to use varying tables by the X value, or may use the same table. A ctx_inc is determined according to surrounding conditions when a target syntax is encoded, and examples of the ctx_inc by syntax are illustrated in FIGS. 35 to 37. For example, in the case of a skipX_flag, as illustrated in FIG. 35, ctx_inc=0 may indicate that all of the upper side adjacent block and the left side adjacent block are not a SKIP mode. ctx_inc=1 may indicate that the upper side adjacent block or the left side adjacent block is a SKIP mode. ctx_inc=2 may indicate that all of the upper side adjacent block and the left side adjacent block are a SKIP mode. The context table may be used differently according to each ctx_inc. Likewise, in the case of an interX_flag, as illustrated in FIG. 36, a ctx_inc of 0 to 5 indicates an example of a prediction type of the context table with respect to an extended macroblock being a 32×32 pixel block, a ctx_inc of 7 to 9 indicates an example of a prediction type of the context table with respect to a 16×16 pixel block, and the context table may be used differently according to each ctx_inc. Likewise, an example of the ctx_inc for encoding/decoding a directX_flag is illustrated in FIG. 37. As illustrated in Table 8 above, an encoding bit of the directX_flag may be represented by 1 bit, and the context table may be determined differently according to a case where all of the upper side block and the left side block of an encoding target block are not a direct mode, a case where all of the upper side block and the left side block are a direct mode, and a case where only one of the upper side block and the left side block is a direct mode. In addition, like the illustration of FIG. 37, in the case of the ctx_inc for encoding/decoding an extended_flag, the context table may be used differently according to whether the adjacent blocks of an encoding target block have been encoded in units of extended macroblocks (in this case, an extended_mb_flag may be set to a binary bit 1) or have been encoded in units of 16×16 pixel blocks (In this case, an extended_mb_flag may be set to a binary bit 1). In this manner, in the case of an interX_flag, different context tables may be used according to the X value, picture type, data of adjacent blocks, and whether it is used as a reference picture. In at least one embodiment of the present disclosure, the context table may be selectively used according to the context of adjacent blocks of a current block to be encoded, among the divided subblocks in a macroblock. In this case, whether the adjacent blocks of a current block to be encoded are a SKIP mode, whether they are a SKIP mode in units of macroblocks, and whether they are a SKIP mode in units of subblocks may be considered, and the context table of a skipX_flag, an interX_flag and an extended_mb_flag for a block to be encoded may be used selectively according to such surrounding block conditions.

Figure 39:
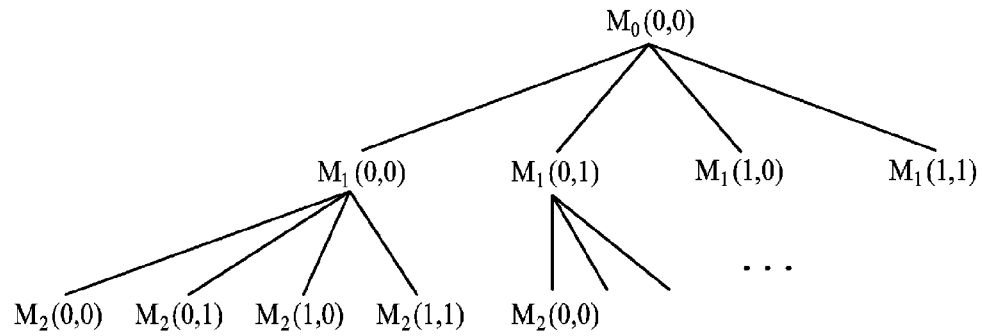

FIGS. 38 and 39 are illustration diagrams for describing a process of encoding partition type information according to at least one embodiment of the present disclosure.

FIG. 38 illustrates a partition type value for each 16×16 pixel block in an extended macroblock to be encoded in order to encode partition type information by using a tree structure.

In FIG. 38A, Mx(a,b) denotes a partition type value of a 16×16 pixel block corresponding to a position of (a,b) in an extended macroblock to be encoded. That is, Mx(0,0) denotes a partition type value of a 16×16 pixel block corresponding to a position of (0,0) in an extended macroblock to be encoded, that is, the first 16×16 pixel block in a raster-scan direction in the extended macroblock, and Mx(0, 1) denotes a partition type value of a 16×16 pixel block corresponding to a position of (0,1) in the extended macroblock, that is, the second 16×16 pixel block in the raster-scan direction in the extended macroblock.

The partition type values of 16×16 pixel blocks illustrated in FIG. 38A are grouped in units of predetermined regions, for example, in units of regions including K×L partition type values, and a minimum value among the partition type values in the grouped region is selected and allocated as a partition type value for the grouped region. When the partition type value for the grouped region is Mx−1(c, d), c=a/K and d=b/L. Herein, Mx−1 is an upper node of Mx, and the greatest value may be selected by a method of selecting the value of the upper node. In addition, it may be adaptively used by encoding the method of selecting the value of the upper node.

FIG. 38B illustrates the result of grouping the partition type values of 16×16 pixel blocks illustrated in FIG. 38A in units of regions including 2×2 partition type values, and then allocating a minimum value among the partition type values in each group as a partition type value of the grouped region. The partition type values of the pixel blocks including the 16×16 pixel blocks (0,0), (0,1), (1,0) and (1,1) illustrated in FIG. 38A are grouped in units of 2×2 regions, and a minimum value among the partition type values $M_X(0,0)$, $M_X(0,1)$, $M_X(1,0)$ and $M_X(1,1)$ of the 16×16 pixel blocks is selected and allocated as a partition type value $M_{X-1}(0,0)$ for the grouped region. In addition, the partition type values of the pixel blocks including the 16×16 pixel blocks (0,2), (0,3), (1,2) and (1,3) are grouped in units of 2×2 regions, and a minimum value among the partition type values $M_X(0,2)$, $M_X(0,3)$, $M_X(1,2)$ and $M_X(1,3)$ of the 16×16 pixel blocks is selected and allocated as a partition type value $M_{X-1}(0,1)$ for the grouped region. In this manner, the same process is performed on the remaining 16×16 pixel blocks. When a process of allocating the partition type values of 16×16 pixel blocks illustrated in FIG. 38A as the partition type values of the grouped regions illustrated in FIG. 38B is repeated up to layers $M_{X-2}$, $M_{X-3}$ . . . $M_1$, the partition type values of grouped regions may be allocated as illustrated in FIG. 36C. When the process is again repeated up to a layer $M_0$, the grouping may be made to have a partition type value of one grouped region as illustrated in FIG. 38D.

Although FIG. 38 illustrates the grouping of partition type values for adjacent 16×16 pixel blocks in units of 2×2 regions, the present disclosure is not limited thereto. For example, the partition type values for adjacent 16×16 pixel blocks may be grouped in units of regions of various sizes such as 4×2 and 2×4, or the partition type values for nonadjacent 16×16 pixel blocks may be grouped in units of predetermined regions to allocate a partition type value.

The allocation of the partition type values of the 16×16 pixel blocks to be encoded as the partition type values of the grouped region as illustrated in FIG. 38 may be represented in a tree structure as illustrated in FIG. 39.

FIG. 39 illustrates partition type values of layer-by-layer grouped regions in a tree structure. If the partition type value of the layer-by-layer grouped region is a node value, the node values in a tree structure illustrated in FIG. 39 may be encoded by encoding a difference from the node value of an upper node.

The method of encoding a difference value between the node values and the node value of an upper node encodes a binary bit 0 corresponding to the difference value and encodes the last binary bit 1. If the difference between the node value of an upper node and the node value of a node to be encoded is 0, a binary bit 1 is encoded. For example, an arithmetic coding method may be used in decoding a binary bit of 0 and 1. In this case, different contexts may be used in the respective layers.

In this manner, when a tree structure is used to encode a partition type value, that is, a node value, a difference value between 0 and a node value of the uppermost node (hereinafter referred to as 'uppermost node value') may be encoded by using a binary bit of 0 and 1 as described above. In allocating the partition type numbers described with reference to FIG. 18, if great partition type numbers are allocated in descending order of occurrence frequency, a difference value between the uppermost node value and the greatest partition type number may be encoded by using a binary bit of 0 and 1. On the other hand, in allocating the partition type numbers described with reference to FIG. 18 if small partition type numbers are allocated in descending order of occurrence frequency, a difference value between the uppermost node value and the smallest partition type number may be encoded by using a binary bit of 0 and 1.

In the case of the remaining node values except the uppermost node value, a difference value between a node value of a node to be encoded and a node value of an upper node of the node may be encoded by using a binary bit of 0 and 1. That is, the respective node values may be encoded by encoding as many binary bits 0 as the difference value and encoding the last binary bit 1. In this case, if a difference value between a node value of a node to be encoded and a node value of an upper node of the node is 0, a binary bit 1 is encoded. In addition, to the contrary, the respective node values may be encoded by encoding as many binary bits 1 as the difference value and encoding the last binary bit 0. In this case, if a difference value between a node value of a node to be encoded and a node value of an upper node of the node is 0, a binary bit 0 is encoded.

However, when the respective node values are encoded, if the upper node value is the maximum value available for the partition type numbers, the node values of the lower nodes of the relevant upper node are not encoded. For example, if the node value of a node $M_1(0,0)$ is 3, the node values of the nodes $M_2(0,0)$, $M_2(0,1)$, $M_2(1,0)$ and $M_2(1,1)$ being the lower nodes of the node $M_1(0,0)$ are not encoded. That is, since $M_1(0,0)$ is the minimum value of $M_2(0,0)$, $M_2(0,1)$, $M_2(1,0)$ and $M_2(1,1)$, all of the $M_2(0,0)$, $M_2(0,1)$, $M_2(1,0)$ and $M_2(1,1)$ have a value greater than or equal to 3. However, in FIG. 18, since the maximum value of the partition type value is 3, the $M_2(0,0)$, $M_2(0,1)$, $M_2(1,0)$ and $M_2(1,1)$ need not be encoded because they cannot have a value other than 3.

In addition, when a difference value between a node to be encoded and an upper node of the node, if the node value of a current node to be encoded is the maximum value available for the partition type numbers, only as many binary bits 0 as the difference value are encoded, and the last binary bit 1 is not encoded. For example, if the node value $M_1(0,0)$ of an upper node of a current node to be encoded and the node values $M_2(0,0)$, $M_2(0,1)$, $M_2(1,0)$ and $M_2(1,1)$ of the current node to be encoded are respectively 1, 2, 3, 3 and 2, the node values $M_2(0,0)$ and $M_2(1,1)$ encode binary bits 01, and the node values $M_2(0,1)$ and $M_2(1,0)$ encode binary bits 00, not binary bits 001.

In addition, when the node value of the last node among the nodes having the same upper node is encoded, if all of the node values of the nodes except the last node are greater than the node value of the upper node, the node value of the last node is not encoded. For example, if the node value $M_1(0,0)$ of an upper node of a node to be encoded and the node values $M_2(0,0)$, $M_2(0,1)$, $M_2(1,0)$ and $M_2(1,1)$ of the node to be encoded are respectively 1, 2, 3, 3 and 1, since all of the node values $M_2(0,0)$, $M_2(0,1)$ and $M_2(1,0)$ are greater than the node value $M_1(0,0)$, the node value $M_2(1,1)$ of the last node is not encoded.

As described above, the node values of the remaining nodes except the uppermost node may be encoded by encoding a difference value between the node value of a node to be encoded and the node value of an upper node of the node by using binary bits of 0 and 1. However, unlike this, the node values of the remaining nodes except the uppermost node may be encoded by encoding a difference value between the node value of each node and the partition type value highest in terms of the occurrence frequency of partition type. Herein, the partition type value highest in terms of the occurrence frequency may or may not be a fixed value. If the partition type value highest in terms of the occurrence frequency is not a fixed value, it may or may not be transmitted to a relevant decoder after being encoded. If the partition type value highest in terms of the occurrence frequency is not transmitted to the decoder, the statistics of the blocks encoded before the current block may be accumulated and the mode highest in terms of the occurrence frequency up to now may be used. In another embodiment of encoding partition type information by using a tree structure, when the partition type values illustrated in FIG. 38A are grouped to determine the partition type value of the grouped region illustrated in FIG. 38B, if great partition type numbers are allocated in descending order of occurrence frequency, the maximum value among the values of the grouped regions may be used as the partition type value of the grouped region.

Figure 40:
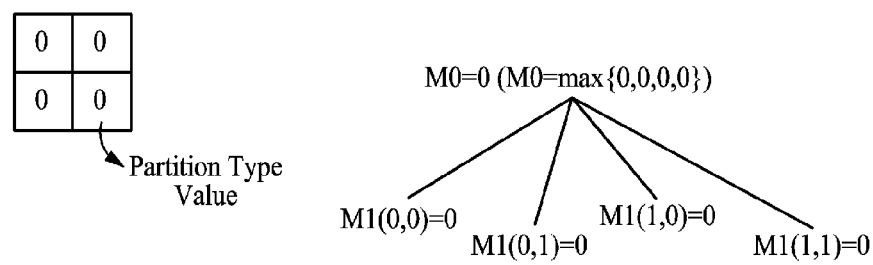
FIG. 40 is a diagram of an example of encoding of a partition type according to at least one embodiment of the present disclosure.
Figure 41:
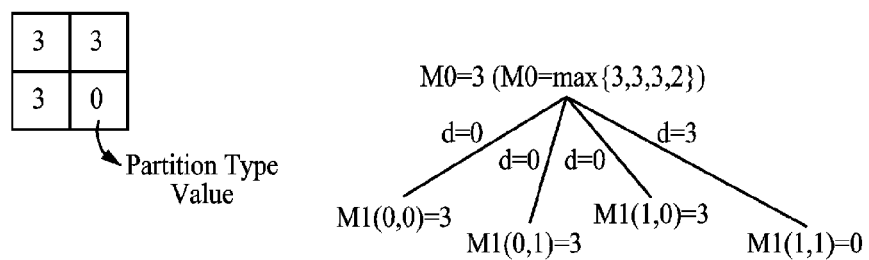
FIG. 41 is a diagram of another example of encoding of a partition type according to at least one embodiment of the present disclosure.

In at least one embodiment of the present disclosure, if the partition type values illustrated in FIG. 18 are used to divide an extended macroblock into 16×16 pixel blocks (that is, extended_mb_flag=0), the partition type is encoded/decoded by using the above-described method. In this case, the value of the lowermost node may be the partition type value of the 16×16 pixel block in the extended macroblock, and the maximum value of the values of the lower nodes may be used as the representative value of the upper node. For example, as illustrated in FIG. 40, if an extended macroblock of 32×32 pixel blocks belongs to an image padded to 16 and is divided into 16×16 pixel blocks, since the representative value of the uppermost node is 0, the uppermost node is encoded by binary bits '000' representing a difference value '3' between the representative value '0' and the maximum value '3' of the partition type. As another example, as illustrated in FIG. 41, if an extended macroblock of 32×32 pixel blocks belongs to an image padded to 16; the 16×16 pixel blocks are divided into 8×8 or less pixel blocks and then encoded; and one 16×16 pixel block is encoded to a 16×16 pixel block, since the representative value of the uppermost node is 3, a binary bit '1' representing a difference value between the representative value '3' of the uppermost node and the maximum value '3' of the partition type is encoded. Herein, if a difference value between the value of the lower nodes and the value of the upper node is 0, binary bits '000' are encoded.

As described with reference to FIGS. 6 to 10, the encoding of an intra prediction mode encodes a 1-bit flag indicating whether an intra prediction mode of 4×4 and 8×8 pixel blocks of a luma component is identical to a predicted intra mode predicted by using adjacent blocks, and uses 3 bits to indicate which of eight prediction modes except predicted prediction directions among nine prediction modes the intra prediction mode corresponds to, if the intra prediction mode is different from the predicted intra mode. In addition, 2 bits are used to indicate which of four prediction modes is used by a 16×16 pixel block. In addition, the encoding of an intra prediction mode encodes a 1-bit flag indicating whether an intra prediction mode of the remaining m×n pixel blocks except 4×4 pixel blocks, 8×8 pixel blocks, and 16×16 pixel blocks is identical to a predicted intra mode predicted by using adjacent blocks, and uses 1 bit to indicate which of two prediction modes except predicted prediction directions among three prediction modes the intra prediction mode corresponds to, if the intra prediction mode is different from the predicted intra mode. In addition, 2 bits are used to indicate which of four prediction modes is used by a 16×16 pixel block of a chroma component. Herein, 4×4, 8×8, 16×16 and m×n pixel blocks of a luma component and a chroma component may use different context tables.

Figure 42:
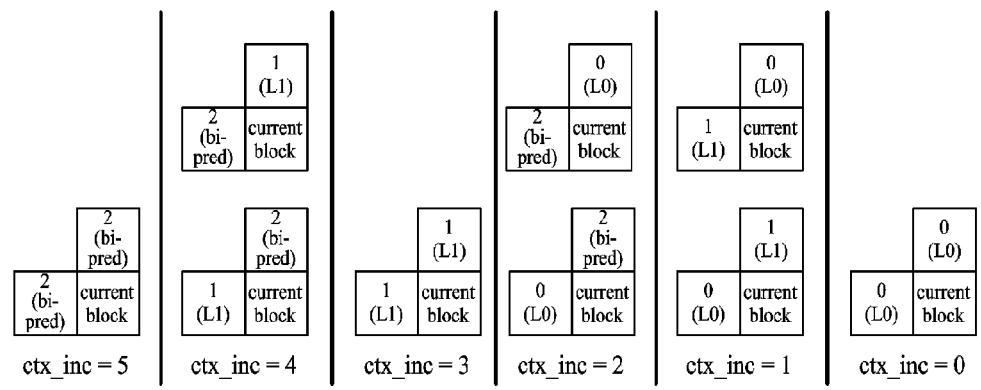
FIG. 42 is a diagram of an example of a ctx_inc for encoding/decoding a B_pdir according to at least one embodiment of the present disclosure.

FIG. 42 is a diagram illustrating an example of a ctx_inc for encoding/decoding of bidirectional prediction. As described above, the ctx_inc is determined according to surrounding conditions when a target syntax is encoded. The encoding bits of a B_pdir representing a bidirectional prediction are the same as illustrated in Table 9. If an adjacent block being an L0 prediction is 0; an adjacent block being an L1 prediction is 1; and an adjacent block assuming a bidirectional prediction is 2, a target syntax may be determined according to surrounding conditions as illustrated in FIG. 42. In this case, if the left side or upper side block is unavailable, an L0 prediction (0) may be used as an unavailable prediction direction. A different context table may be used for each ctx_inc as illustrated in FIG. 43.

In the case of a ctx_inc for encoding/decoding a CBPX_flag, a context table may be determined in a similar way to the case of FIG. 37. For example, if an extended macroblock or an intra picture is an intra mode, a CBPX_flag is not encoded. If the case where an upper side block or a left side block of a current block to be encoded is an intra mode is set to 0; and the case where the upper side block or the left side block is an inter mode is set to 1, a target syntax may be determined by a context table according to surrounding conditions.

Figure 43:
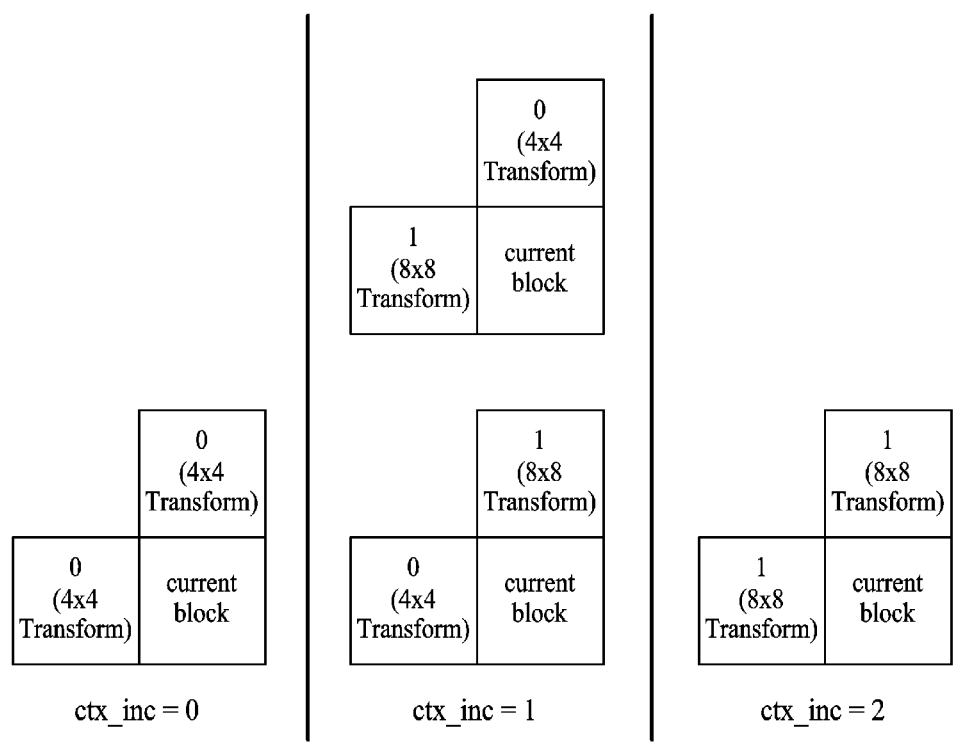
FIG. 43 is a diagram of an example of a ctx_inc for encoding/decoding of a transform type in the event of two available transform types according to at least one embodiment of the present disclosure.

FIG. 43 is a diagram illustrating an example of a ctx_inc for encoding/decoding of a transform type. FIG. 43 illustrates an example of the case where there are two available transform types. As illustrated in Table 1, if a 16×16 pixel block is divided into four 8×8 pixel subblocks, there are two available transform types such as a 4×4 transform and an 8×8 transform. Therefore, a target syntax may be determined by a different context table according to a case where an upper side block and a left side block of a current block are both a 4×4 transform, a case where the upper side block and the left side block are both an 8×8 transform, and a case where one of the upper side block and the left side block is a 4×4 transform and the other is an 8×8 transform.

Figure 44:
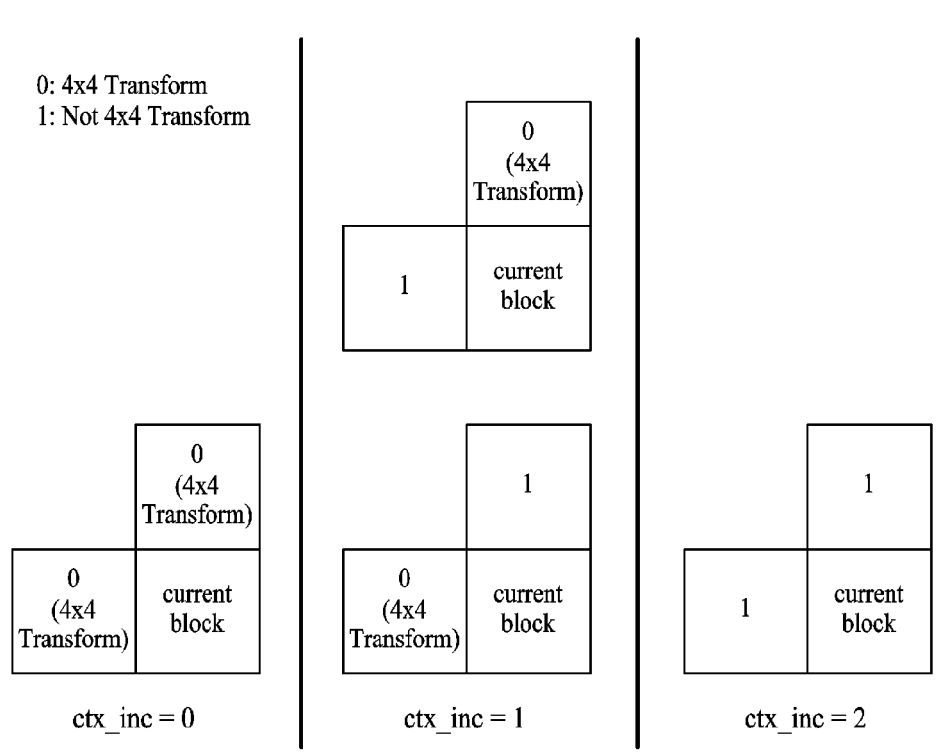
FIG. 44 is a diagram of an example of a ctx_inc for encoding/decoding of a transform type in the event of three available transform types according to at least one embodiment of the present disclosure.
Figure 45:
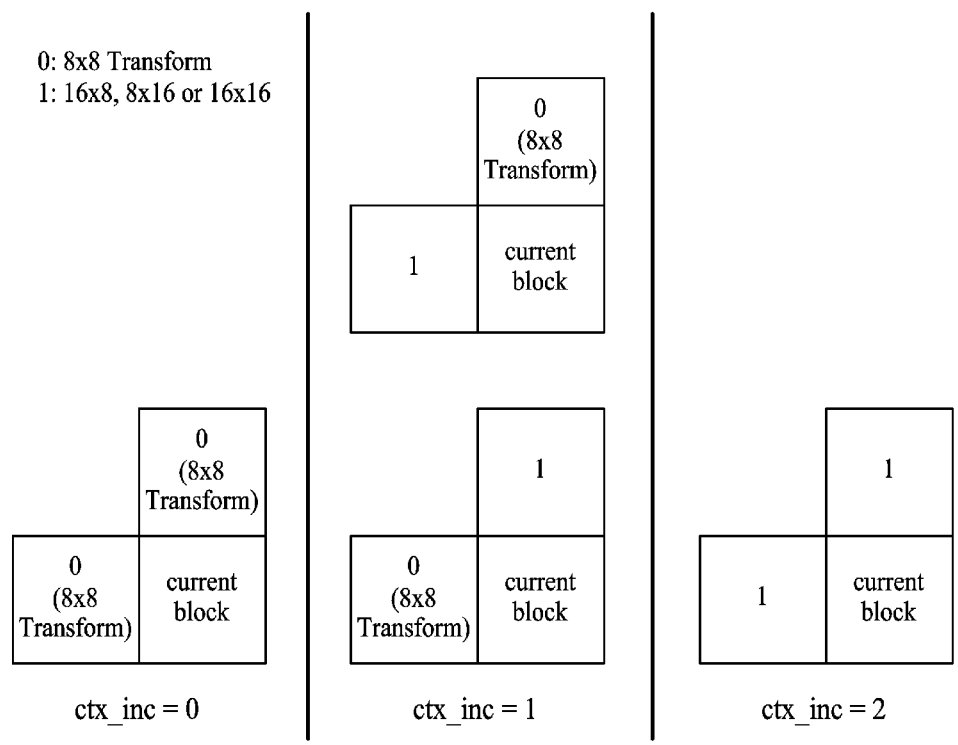
FIG. 45 is a diagram of another example of a ctx_inc for encoding/decoding of a transform type in the event of three available transform types according to at least one embodiment of the present disclosure.

FIGS. 44 and 45 are diagrams illustrating examples of a ctx_inc for encoding/decoding of a transform type in the event of three available transform types. FIG. 44 illustrates an example of a ctx_inc for selecting a context table used to encode the first bit. FIG. 45 illustrates an example of a ctx_inc for selecting a context table used to encode the second bit.

As described above, if a current block is divided into 8×8 or less pixel blocks such as 4×4 pixel blocks, 4×8 pixel blocks, or 8×4 pixel blocks, a 4×4 transform is performed thereon. In addition, a transform lower in encoding cost among a 4×4 transform and an 8×8 transform is performed on an 8×8 pixel block; a transform lower in encoding cost among a 4×4 transform, an 8×8 transform and an 8×16 transform is performed on an 8×16 pixel block; a transform lower in encoding cost among a 4×4 transform, an 8×8 transform and a 16×8 transform is performed on a 16×8 pixel block; and a transform lower in encoding cost among a 4×4 transform, an 8×8 transform and a 16×16 transform is performed on 16×16 or more pixel blocks. Therefore, in encoding the first bit, as illustrated in FIG. 44, a ctx_inc for encoding/decoding a transform type may be used differently according to whether both of an upper side block and a left side block of a current block are a 4×4-transformed block, whether only one of the upper side block and left side block is a 4×4-transformed block, or whether both of the upper side block and left side block are not a 4×4-transformed block. Likewise, in encoding the second bit, as illustrated in FIG. 45, a ctx_inc for encoding/decoding a transform type may be used differently according to whether any one of the upper side block and left side block is an 8×8-transformed block.

Figure 46:
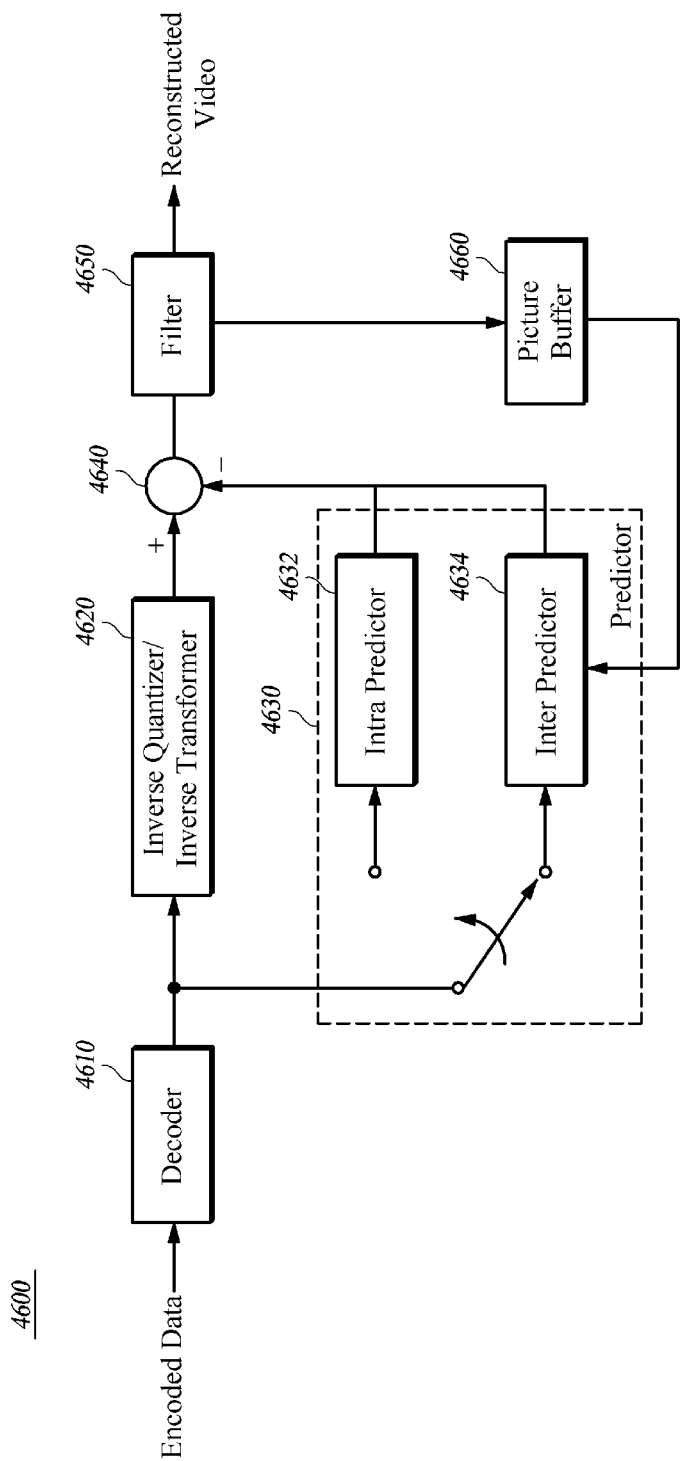
FIG. 46 is a block diagram of a schematic configuration of a video decoding apparatus according to at least one embodiment of the present disclosure.

FIG. 46 is a block diagram illustrating a schematic configuration of a video decoding apparatus according to at least one embodiment of the present disclosure.

A video decoding apparatus 4600 includes a decoder 4610, an inverse quantizer/inverse transformer 4620, a predictor 4630, an adder 4640, a filter 4650, and a picture buffer 4660. Other components of the video decoding apparatus 4600, such as each of the decoder 4610, the inverse quantizer/inverse transformer 4620, the predictor 4630, the adder 4640, the filter 4650, and the picture buffer 4660 is implemented by, or includes, one or more processors and/or application-specific integrated circuits (ASICs). The video decoding apparatus 4600 comprises input units such as one or more buttons, a touch screen, a mic and so on, and output units such as a display, an indicator and so on.

The encoder 4610 uses various encoding/decoding techniques such as entropy decoding to decode encoded data encoded by the video encoding apparatus 100. Data decoded by the decoder 4610 vary according to the type of a picture to be decoded. Information on such a picture type may be extracted from a picture header or a sequence header of the encoded data, or may be extracted and decoded therefrom to be reconstructed. Herein, if an extended macroblock to be currently decoded is positioned across an image boundary as illustrated in FIG. 2 (an actual size of an input image is transmitted in a sequence parameter), a portion belonging to an image in the extended macroblock is found, a prediction mode and text data of a relevant region are obtained by an entropy decoding, and an intra prediction or motion compensation and an inverse transform/inverse quantization are performed to decode a portion belonging to an actual image.

If a picture to be decoded is an intra picture, the type and sequence of data to be decoded in video encoding data by the decoder 4610 are the same as illustrated in FIG. 17. That is, the decoder 4610 reconstructs partition type information by decoding partition type data extracted from an input bitstream, divides a macroblock by using a partition type identified by the partition type information reconstructed, reconstructs as many intra prediction modes as the number of subblocks divided in the macroblock by decoding intra prediction mode data, and reconstructs a CBPX flag or a CBP by decoding CBP data allocated to a CBPX flag/CBP in the sequence identical or similar to the sequence illustrated in FIG. 24 according to the size of each subblock. Thereafter, the decoder 4610 reconstructs transform coefficients by decoding transform coefficient data only with respect to subblocks having non-zero transform coefficients indicated by the CBP. Herein, if the video encoding apparatus 100 has performed an intra prediction encoding on an extended macroblock in units of 16×16 pixel blocks, a decoding of a CBPX flag may be omitted. In this case, encoded quantization parameters may be decoded in units of extended macroblocks.

However, the syntax structure of video encoding data illustrated in FIG. 17 is merely exemplary, and the syntax structure of video encoding data is not limited to the structure illustrated in FIG. 17. In addition, the encoding sequence of a CBPX flag or a CBP illustrated in FIG. 24 is merely exemplary, and the reconstruction sequence of a CBPX flag or a CBP is not limited to the sequence illustrated in FIG. 24.

Herein, a method of decoding an intra prediction mode by the decoder 4610 varies according to the size of a subblock. That is, if the size of a subblock is not 16×16 but 4×4 or 8×8, the decoder 4610 reconstructs a prediction mode flag by decoding 1 bit among intra prediction mode data extracted from a bitstream. If the prediction mode flag indicates that a prediction direction corresponding to an intra prediction mode of a relevant subblock is identical to a prediction direction corresponding to an intra prediction mode of a relevant subblock estimated from adjacent blocks, the decoder 4610 reconstructs the intra prediction mode of a relevant subblock estimated from adjacent blocks as an intra prediction mode of a current block and decodes an intra prediction mode of a next subblock. If the prediction mode flag indicates that a prediction direction corresponding to an intra prediction mode of a relevant subblock is not identical to a prediction direction corresponding to an intra prediction mode of a relevant subblock estimated from adjacent blocks, the decoder 4610 reconstructs an intra prediction mode reconstructed by decoding next three bits of intra prediction mode data as an intra prediction mode of a current block. In addition, if the size of a subblock is 16×16, the decoder 4610 reconstructs an intra prediction mode of a current block by decoding 2 bits among intra prediction mode data extracted from a bitstream. The intra prediction mode reconstructed is inputted to the intra predictor 4632 of the predictor 4630.

In addition, if an extended macroblock being a 32×32 pixel block is an intra mode, a block belonging to an image in the extended macroblock padded to a multiple of 16 pixels is determined and then a partition type of the block is entropy-decoded. In the case of FIG. 3, a block belonging to a padded image in an extended macroblock being a 32×32 pixel block corresponds only to the first 16×16 pixel block, and a partition type of the first 16×16 pixel block is entropy-decoded. If a relevant 16×16 pixel block is divided into two 16×8 pixel blocks, two intra prediction modes are entropy-decoded and a CBP and 16×16 transform coefficients for the 16×16 pixel block are decoded. A relevant 16×16 pixel block is decoded by using a subblock type, an intra prediction mode, and a transform coefficient obtained through the entropy decoding.

If a picture to be decoded is an inter picture, the type and sequence of data to be decoded in video encoding data by the decoder 4610 are the same as illustrated in FIG. 29. That is, the decoder 4610 reconstructs a SKIPN flag indicating whether a macroblock to be currently decoded is a SKIP macroblock, by decoding SKIPN flag data extracted from a bitstream. If a macroblock identified by a reconstructed SKIPN flag is not a SKIP macroblock, the decoder 4610 reconstructs a macroblock type flag and partition type information by decoding macroblock type flag data and partition type data extracted from a bitstream.

In addition, if an extended macroblock is a 32×32 pixel block, a block belonging to an image in the extended macroblock padded to a multiple of 16 pixels is determined and then a skip32_flag is decoded. If an extended macroblock to be currently decoded is a SKIP mode, left side and upper side adjacent blocks are used to find a predicted motion vector and perform motion compensation. In the case of FIG. 3, a block belonging to a padded image in an extended macroblock being a 32×32 pixel block corresponds only to the first 16×16 pixel block, and a skip32_flag is decoded. If an extended macroblock to be currently decoded is a SKIP mode, left side and upper side adjacent blocks are used to find a predicted motion vector and perform motion compensation.

If a macroblock type identified by a reconstructed macroblock type flag is an intra macroblock, it is the same as described above. If a macroblock type is an inter macroblock, the decoder 4610 reconstructs a SKIPX flag by decoding a SKIPX flag only with respect to 16×16 or more pixel subblocks, and reconstructs a motion vector and a reference picture index being motion information by decoding MVD/ref_idx data with respect to a subblock not being a SKIP block identified a reconstructed SKIPX flag or with respect to less than 16×16 pixel subblocks (indicating non-SKIP). In addition, the decoder 4610 reconstructs a CBPX flag, a transform type, and a CBP by decoding non-SKIP blocks in the sequence identical or similar to the sequence illustrated in FIG. 33, and reconstructs quantized transform coefficients only with respect to subblocks having non-zero coefficients identified by a reconstructed CBP. Reconstructed motion information is inputted to the inter predictor 4634 (which may be implemented by a motion compensator), and the reconstructed CBPX flag, CBP, transform type, and quantized transform coefficients are inputted to the inverse quantizer/inverse transformer 4620 in order to reconstruct a target macroblock to be decoded or a residual block of a subblock of the target block.

The inverse quantizer/inverse transformer 4620 reconstructs a residual block by inverse-quantizing/inverse-transforming the quantized transform coefficients received from the decoder 4610. Herein, the inverse quantizer/inverse transformer 4620 may inverse-quantize/inverse-transform the quantized transform coefficients by using the CBPX flag, the CBP, and the transform type received from the decoder 4610.

The predictor 4630 generates a predicted block by predicting a target macroblock to be decoded or a subblock of the target macroblock. To this end, the intra predictor 4632 generates a predicted block of a target macroblock or a subblock of the target macroblock by intra-predicting a target macroblock to be decoded or a subblock of the target macroblock by using an intra prediction mode reconstructed by the decoder 4610. The inter predictor 4634 generates a predicted block of a target macroblock or a subblock of the target macroblock by inter-predicting a target macroblock to be decoded or a subblock of the target macroblock by using motion information reconstructed by the decoder 4610.

The adder 4640 reconstructs a target macroblock to be decoded, by adding the predicted block generated by the predictor 4630 and the residual block reconstructed by the inverse quantizer/inverse transformer 4620.

The target macroblock reconstructed by the adder 4640 is deblocking-filtered by the filter 4650, accumulated in units of pictures, and then outputted as a reconstructed video. The reconstructed video is stored in the picture buffer 4660, so that it may be later used for motion compensation prediction in the inter predictor 4634.

The operations of the intra predictor 4632, the inter predictor 4634 and the inverse quantizer/inverse transformer 4620 are identical or similar to the operations of the intra predictor 223, the inter predictor 114 and the inverse quantizer/inverse transformer 150 of the video encoding apparatus 100 described with reference to FIG. 1, and thus a detailed description thereof will be omitted.

The video decoding apparatus 4600 may be configured as follows according to whether an extended macroblock is an inter macroblock or an intra macroblock.

For example, if a macroblock is an intra macroblock, the decoder 4610 reconstructs partition type information, an intra prediction mode, and a quantized transform coefficient by decoding encoded data; the inverse quantizer/inverse transformer 4620 reconstructs a residual subblock by inverse-quantizing/inverse-transforming the quantized transform coefficient by using a transform selected according to the size of a subblock identified according to the partition type information; the predictor 4630 generates a predicted subblock by predicting a subblock identified according to the partition type information by using the intra prediction mode; and the adder 4640 reconstructs a subblock by adding the predicted subblock and the residual subblock.

As another example, if a macroblock is an inter macroblock, the decoder 4610 reconstructs partition type information, motion information, transform type information, and a quantized transform coefficient by decoding encoded data; the inverse quantizer/inverse transformer 4620 reconstructs a residual subblock by inverse-quantizing/inverse-transforming the quantized transform coefficient by using a transform identified by the transform type information; the predictor 4630 generates a predicted subblock by predicting a subblock identified according to the partition type information by using the motion information; and the adder 4640 reconstructs a subblock by adding the predicted subblock and the residual subblock.

In a video decoding method according to at least one embodiment of the present disclosure, if a macroblock to be decoded is an intra macroblock, the video decoding apparatus 4600 reconstructs partition type information, an intra prediction mode, and a quantized transform coefficient by decoding encoded data; reconstructs a residual subblock by inverse-quantizing/inverse-transforming the quantized transform coefficient by using a transform selected according to the size of a subblock identified according to the partition type information; generates a predicted subblock by predicting a subblock identified according to the partition type information by using the intra prediction mode; and reconstructs a subblock by adding the predicted subblock and the residual subblock.

Herein, if the size of a subblock is one of 4×4, 4×8 and 8×4, the transform selected according to the size of a subblock may be a 4×4 transform. If the size of a subblock is one of 8×8, 8×16 and 16×8, the transform selected according to the size of a subblock may be an 8×8 transform. If the size of a subblock is larger than or equal to 16×16, the transform selected according to the size of a subblock may be a 16×16 transform.

In addition, in a video decoding method according to at least one embodiment of the present disclosure, if a macroblock to be decoded is an inter macroblock, the video decoding apparatus 4600 reconstructs partition type information, motion information, transform type information, and a quantized transform coefficient by decoding encoded data; reconstructs a residual subblock by inverse-quantizing/inverse-transforming the quantized transform coefficient by using a transform identified by the transform type information; generates a predicted subblock by predicting a subblock identified according to the partition type information by using the motion information; and reconstructs a subblock by adding the predicted subblock and the residual subblock.

Herein, the transform identified by the transform type information may be one of a 4×4 transform, an 8×8 transform, an 8×16 transform, a 16×8 transform and a 16×16 transform. In addition, the video decoding apparatus 4600 may filter a reconstructed subblock. For example, the video decoding apparatus 4600 may perform a deblocking filtering on a left boundary and a right boundary of a block according to a selected transform in the reconstructed subblock.

In addition, the video decoding apparatus 4600 may also reconstruct a SKIP_N flag indicating whether a macroblock is a SKIP macroblock, by decoding SKIP_N flag data extracted from encoded data. The video decoding apparatus 4600 may perform a decoding process only on a macroblock identified as not being a SKIP macroblock by the SKIP_N flag.

In addition, the video decoding apparatus 4600 may also reconstruct a macroblock type flag indicating whether a macroblock is an intra macroblock or an inter macroblock, by decoding macroblock type flag data extracted from encoded data. The video decoding apparatus 4600 may detect, from the macroblock type flag, whether a macroblock to be decoded is an intra macroblock or an inter macroblock, by decoding macroblock type flag data extracted from the encoded data, and determine whether to perform an intra prediction decoding or an inter prediction decoding.

Regardless of the type of a macroblock, partition type information may be identified by a partition layer-by-partition layer partition type number. In this case, the video decoding apparatus 4600 may also reconstruct a CBPX flag and a CBP corresponding to the size of a subblock by decoding CBP data extracted from the encoded data. Herein, the CBPX flag may a flag indicating whether a non-zero quantized transform coefficient is present in an X×X pixel block, and the CBP may be a flag indicating whether a non-zero quantized transform coefficient is present in a 16×16 pixel block.

Second Embodiment

A second embodiment of the present disclosure will be described below. In particular, the second embodiment of the present disclosure describes a CABAC encoding according to a syntax, a syntax structure of a transform subblock and a predicted subblock.

In addition, when relevant encoding information is encoded by using CABAC, it is encoded and decoded by using a different context table according to a macroblock, a subblock, a predicted subblock, and a transform subblock.

In the second embodiment of the present disclosure, an input video may be inputted to the video encoding apparatus 100 in units of frames or in units of fields, or may be inputted to the video encoding apparatus 100 after being divided into N×N pixel macroblocks (N: an integer greater than or equal to 16). A macroblock described below may be divided into square subblocks. In addition, each macroblock and subblocks may be divided into predicted subblocks for the purpose of prediction. The macroblock and the subblocks may be variably divided into predicted subblocks having various sizes such as M×M, (M/2)×(M/2), M×(M/2), (M/2)×M, 1×M, and M×1 (M=N). In addition, a transform type may be determined according to a transform subblock. Herein, the transform subblock may be obtained by variably dividing a macroblock or a subblock of the macroblock like the predicted subblock.

If not a multiple of N, an input video may be padded to a multiple of N and then a video compression may be performed.

The video encoding apparatus 100 calculates an encoding efficiency of each subblock in the case where a macroblock is divided into subblocks, and determines the subblock providing the highest encoding efficiency as a final intra block or inter block. The encoding efficiency may be measured based on Equation 1.

A block mode determining process may include determining an optimal prediction mode of each predicted subblock (intra prediction mode, and motion data) with respect to all types of available blocks, and determining a block type. Generally, in determining a prediction mode (in selecting an intra prediction mode or a motion vector/reference picture), in order to reduce a calculation amount, Equation 2 is used to determine an optimal prediction mode.

In determining a type of a subblock, Equation 8 may be used to strictly calculate an RDcost.

$$RDcost=Distortion+\lambda \cdot Bit[block\ type, prediction\ infor,\\ transform\ info, CBP, coefficient] \quad \text{Equation 8}$$

'Distortion' in Equation 8 may be expressed as Equation 4.

In determining a prediction mode of a subblock, Equation 9 may be used to calculate an RDcost.

$$RDcost=Distortion+\lambda \cdot Bit[prediction\ info] \quad \text{Equation 9}$$

A video encoding method according to the present embodiment will be described with reference to the video encoding apparatus 100 illustrated in FIG. 1. However, it will be readily understood from the following description that some of the elements of the video encoding apparatus 100 perform different operations from the first embodiment.

Hereinafter, a video encoding method according to the second embodiment of the present disclosure, and encoded data generated through the video encoding method will be described according to picture types.

Figure 47:
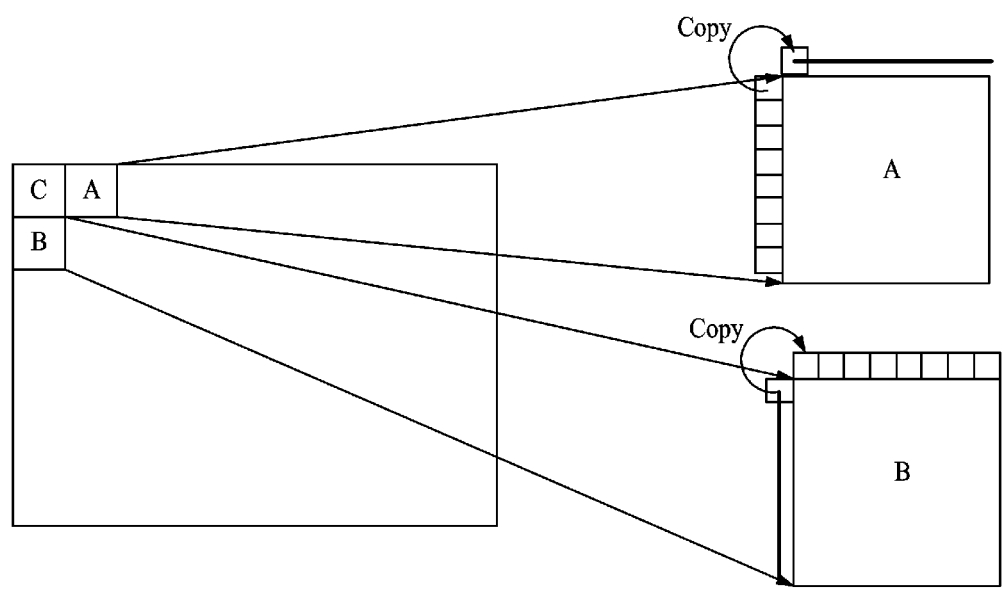
FIG. 47 is an illustration diagram of an intra prediction at a video boundary or a slice boundary.

The intra predictor 112 of the predictor 110 generates a reference block by using adjacent pixels of a block to be encoded (hereinafter referred to as 'current block'), and determines an intra prediction mode by comparing the current block with the reference block. Herein, the adjacent pixels include pixels adjacent to the current block, and also include pixels that are included in blocks adjacent to the current block. FIG. 47 is an illustration diagram illustrating an intra prediction at a video boundary or a slice boundary.

Referring to FIG. 47, if a current block is A, since a reference pixel is only a pixel of a block C being a left block, a prediction mode is restricted. Thus, a pixel of the block C is copied to the top side of the block A. Likewise, in the case of a block B, since a reference pixel is only a pixel of the block C being an upper block, a pixel of the block C is copied to the left side of the block B.

Also, a pixel having no value may be assumed to be 128 for use.

Among the intra prediction modes, a plane mode is encoded with a plane flag. For example, if a current prediction mode is a plane mode, a plane flag is encoded with 1.

Figure 48:
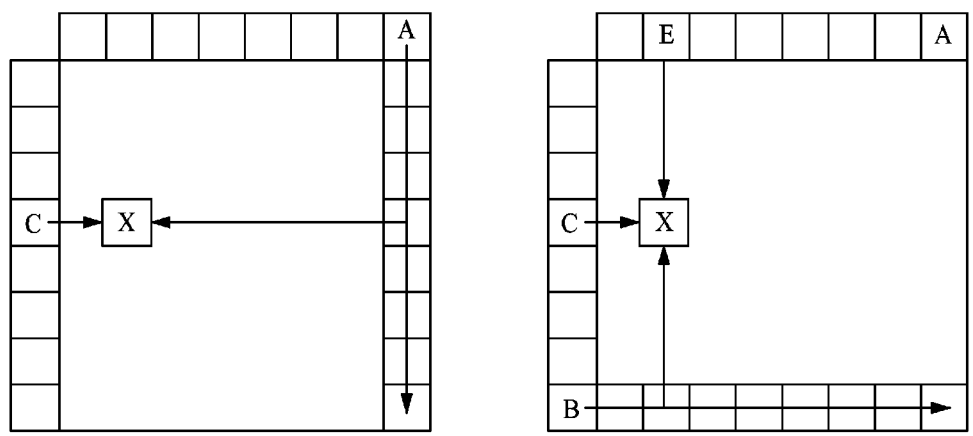
FIG. 48 is a diagram of an example of a plane mode.

FIG. 48 is a diagram illustrating an example of a plane mode.

Referring to FIG. 48, in the case of a plane mode, blocks 48-1 and 48-2 are generated, and an average value of the two blocks is used as a prediction pixel. In the case of the block 48-1, as illustrated herein, a pixel A is copied to the downward direction thereof, and the remaining pixels are generated at positions by using copied values and pixels adjacent to the left side of the current block. For example, referring to FIG. 8, when a pixel X is generated, since a position of the pixel X is (2, 4), a value of the pixel X is calculated by an equation of $Ax(2/8)+Cx(6/8)$. The block 48-2 is generated in the same manner as the block 48-1.

When an intra prediction mode is encoded, a flag indicating whether a prediction mode of a current block is identical to a prediction mode of an adjacent intra block is encoded. This is referred to as a prediction mode flag. If a prediction mode flag is 1, it indicates that an intra prediction mode of an adjacent block and an intra prediction mode of a current block are identical. In this case, a prediction mode indication index is encoded. The prediction mode indication index indicates which of adjacent blocks has the same intra mode as a current block.

If an intra prediction mode of an adjacent block and an intra prediction mode of a current block are different from each other, a prediction mode flag is encoded with 0, and a prediction mode of the current block among the remaining prediction modes except prediction modes of adjacent blocks among the prediction modes is encoded. Alternatively, a prediction mode of the current block among the remaining prediction modes except only prediction modes allocated small numbers among prediction modes of adjacent blocks is encoded.

An intra prediction of a chroma component may be performed in units of N/2×N/2 pixel blocks. Prediction directions may use an average value prediction independent of a prediction mode of a luma component, a horizontal prediction, a vertical prediction, a plane prediction, a mode according to an intra prediction mode of a luma component, and a prediction mode such as a prediction mode using pixel characteristics of a luma component.

The transformer/quantizer 130 determines a transform type in each macroblock or subblocks, and performs a transform/quantization according to the transform type. The transform type refers to the size of a subblock and a transform mode. The transform mode refers to not only known DCT, but also modified DCT, DST (Discrete Sine Transform), and KLT (Karhunen-Loeve Transform). The transform mode may be adaptively selected per transform subblock, per macroblock, per subblock, or according to an intra prediction mode. Also, the transform mode may be adaptively selected according to the size of a transform subblock.

Herein, the transform type may be represented by a transform subblock partition flag. For example, if a transform subblock partition flag of a T×T subblock is 1, the size of a transform subblock is (T/2)×(T/2). In this case, DST may be used as a horizontal transform, and KLT may be used as a vertical transform.

In addition, a CBP flag is encoded and decoded per macroblock, subblock or transform subblock.

In the case of a P-picture or a P-slice, an intra mode or an inter mode may be selected in units of macroblocks or subblocks. That is, both an intra mode and inter mode may be used in an extended macroblock of a P-picture or a P-slice.

In the case of a B-picture or a B-slice, up to two reference pictures may be selected, which will be respectively referred to as an L0 prediction and an L1 prediction. The two reference pictures perform different functions. In general, the L0 prediction (List 0 Prediction, used mainly as a forward prediction) is used as a forward prediction, and the L1 prediction (List 1 Prediction, used mainly as a reverse prediction) is used as a reverse prediction. Inter-picture encoding methods for a P-picture and a B-picture will be described later in detail.

Referring back to FIG. 1, the motion estimator 116 of the inter predictor 114 of the predictor 110 detects a block most similar to a current prediction subblock, that is, a reference block from a reference picture, and outputs a motion vector (MV) representing the relative position of the reference block with respect to the current block. The motion estimation generates a motion vector by comparing subblocks in the macroblock with one or more reference pictures in the picture buffer 180.

The motion vector is encoded by the encoder 140 and is included in encoded data. The encoder 140 selects a predicted motion vector among motion vectors of adjacent blocks of a current block and motion vectors of colocated blocks (i.e. reference picture blocks at the same location as the current block). The encoder 140 generates motion information data by encoding only a differential motion vector (DMV) that is a difference vector between the predicted motion vector and the motion vector of the current block. Herein, the encoder 140 may also encode a reference picture index in addition to the differential motion vector.

In addition, in at least one embodiment of the present disclosure, a batch mode is used with respect to a macroblock, a subblock, a predicted subblock. The batch mode is mode that uses motion information (prediction direction, motion vector, and reference picture) of adjacent motion blocks or colocated blocks as motion information of a current block. Thus, in the case of a batch mode, a batch mode flag and a predicted motion information index are encoded.

In addition, in at least one embodiment of the present disclosure, a SKIP mode is used with respect to a macroblock or a subblock. In the case of a SKIP block, a predicted motion vector is used to perform a motion estimation and compensation. Herein, an encoder encodes a SKIP flag and a predicted motion vector index. As another example, not a predicted motion vector, but predicted motion information may used to perform a motion estimation and compensation of a SKIP mode. In this case, a SKIP flag and a predicted motion information index are decoded.

A transform method of an inter prediction block is the same as the transform method of an intra prediction block described above.

Figure 49A:
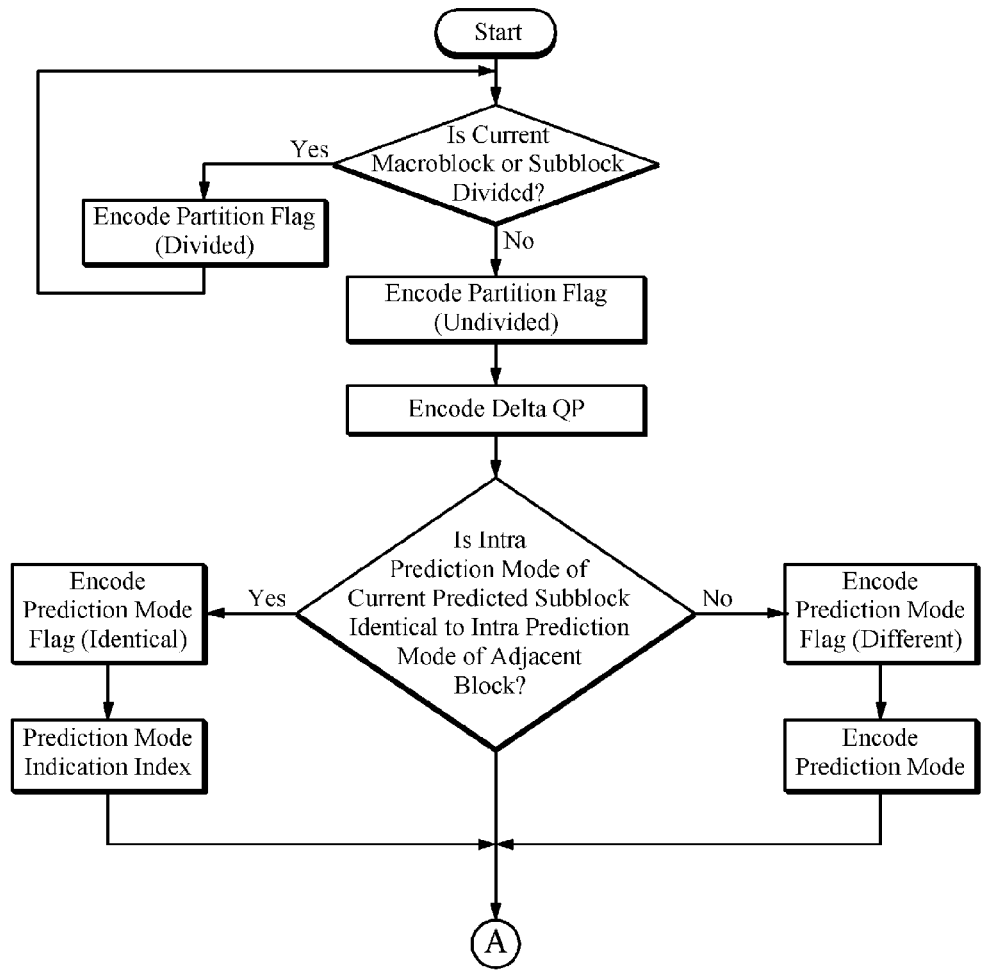
FIGS. 49A and 49B are illustration diagrams of a flow chart of encoding a macroblock and a subblock of an intra picture according to at least one embodiment of the present disclosure.
Figure 49B:
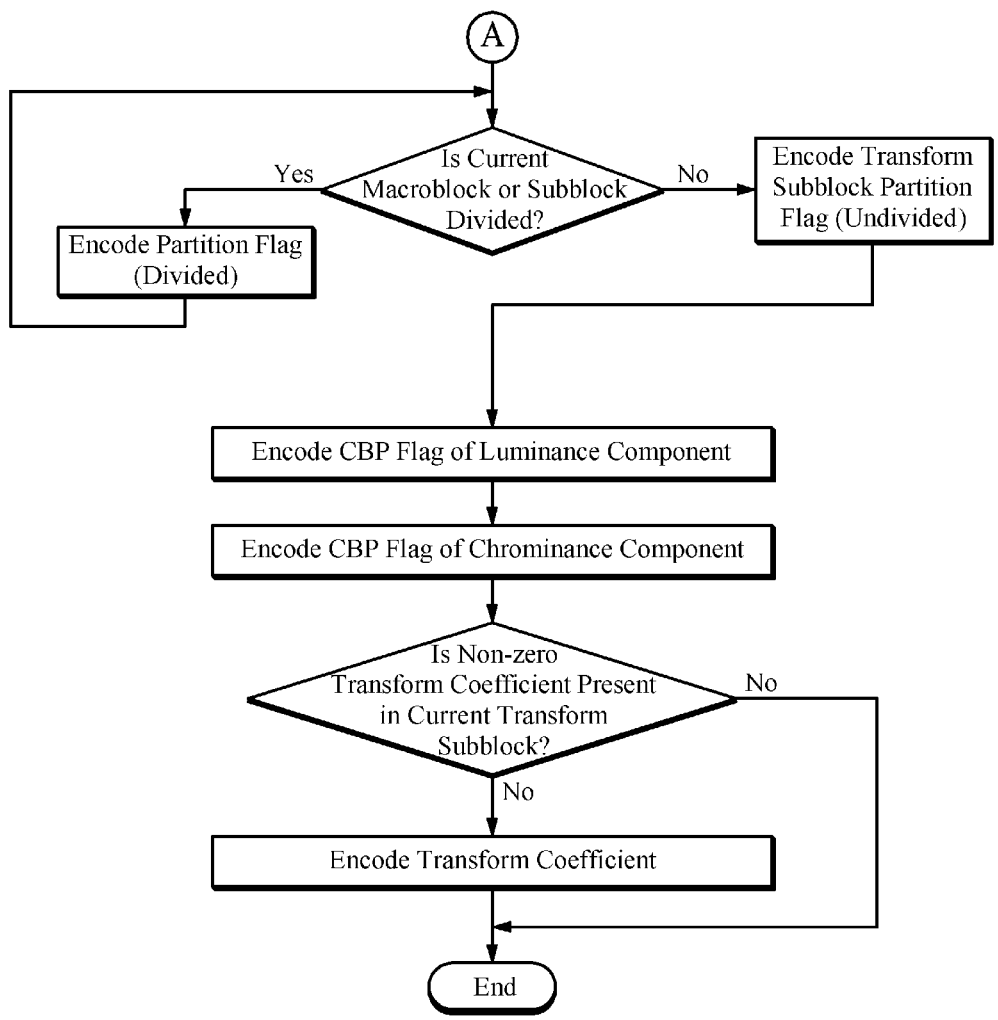

FIGS. 49A and 49B are diagrams for illustrating a flow chart of encoding a macroblock and a subblock of an intra picture according to at least one embodiment of the present disclosure.

Figure 50A:
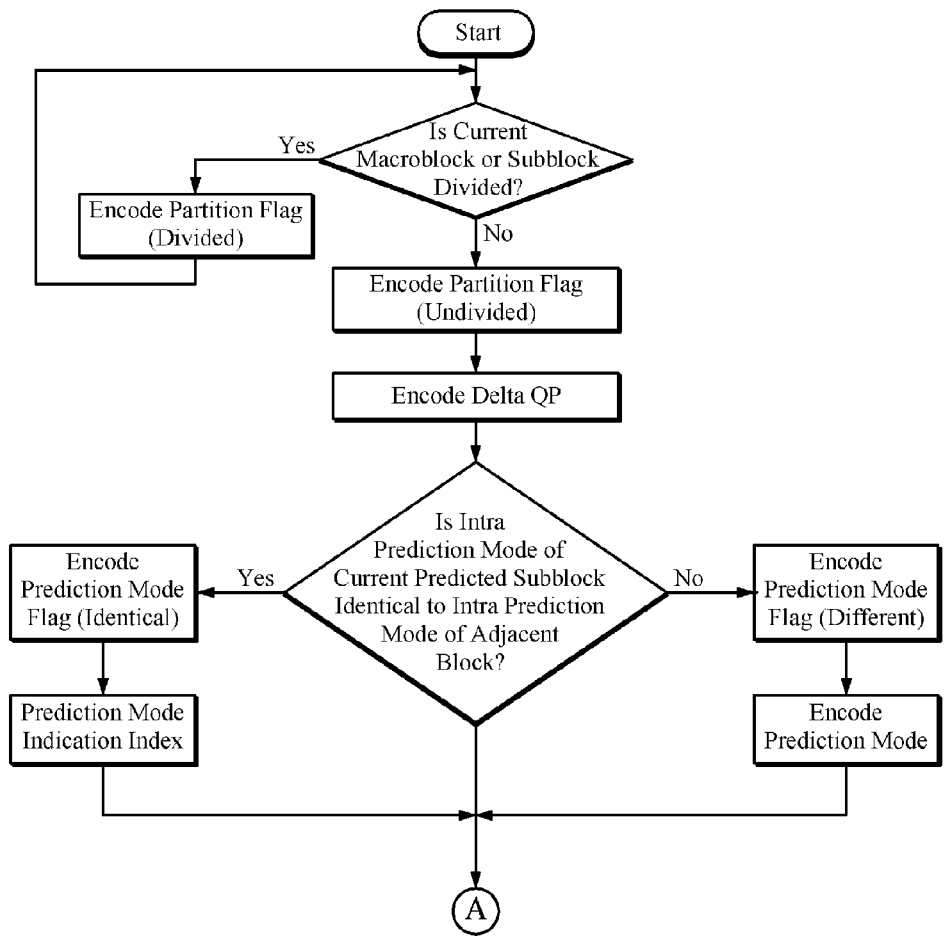
FIGS. 50A and 50B are another illustration diagrams illustrating a flow chart of encoding a macroblock and a subblock of an intra picture according to an embodiment of the present disclosure.
Figure 50B:
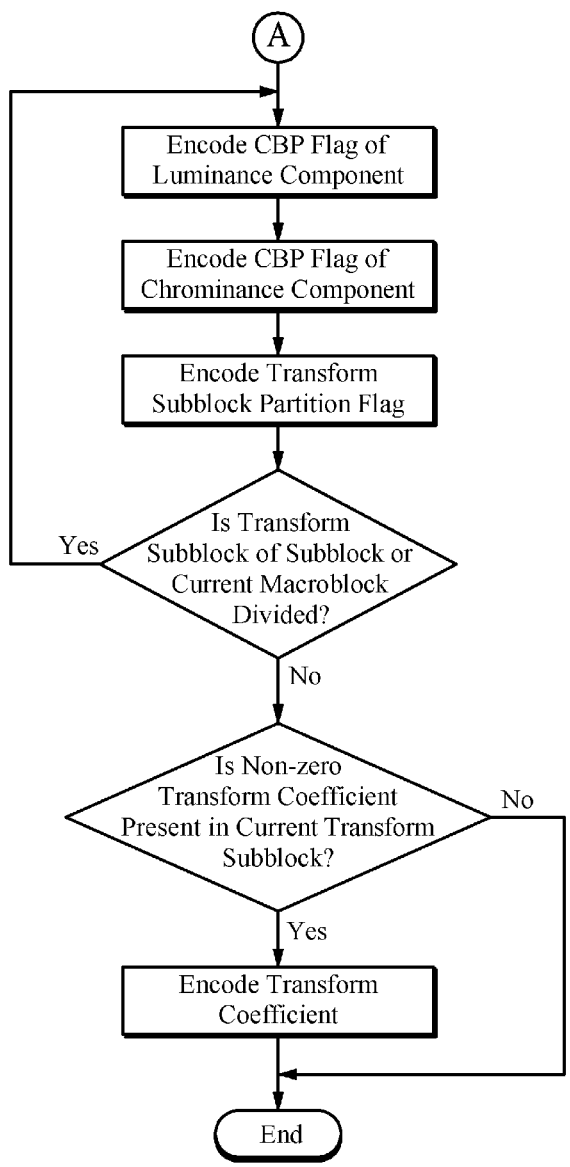

FIGS. 50A and 50B are another diagrams for illustrating a flow chart of encoding a macroblock and a subblock of an intra picture according to at least one embodiment of the present disclosure.

Referring to FIGS. 49A, 49B, 50A and 50B, a subblock and a macroblock of an intra picture includes a partition flag, a Delta QP, a prediction mode flag, a prediction mode indication index, a prediction mode, a transform subblock partition flag, a luma component CBP flag, a chroma component CBP flag, and transform coefficients. However, a syntax flow chart of an intra picture illustrated in FIGS. 49 and 50 is merely exemplary. That is, a portion of all of syntax of an intra picture may be changed, and a portion of the syntax may be omitted.

In the present embodiment, as in other embodiments of the present disclosure, a CABAC is used to encode and decode each syntax. A detailed description of CABAC will be omitted to avoid repetition of the earlier statement A ctx_inc of a partition flag, a prediction mode flag, a prediction mode indication index, a plane mode flag, a transform subblock partition flag, and a CBP flag in FIGS. 49A, 49B, 50A and 50B may be determined in a similar way to the method of determining a ctx_inc of a skipX_flag described in the first embodiment with reference to FIG. 35. Thus, a detailed description thereof will be omitted.

Figure 51A:
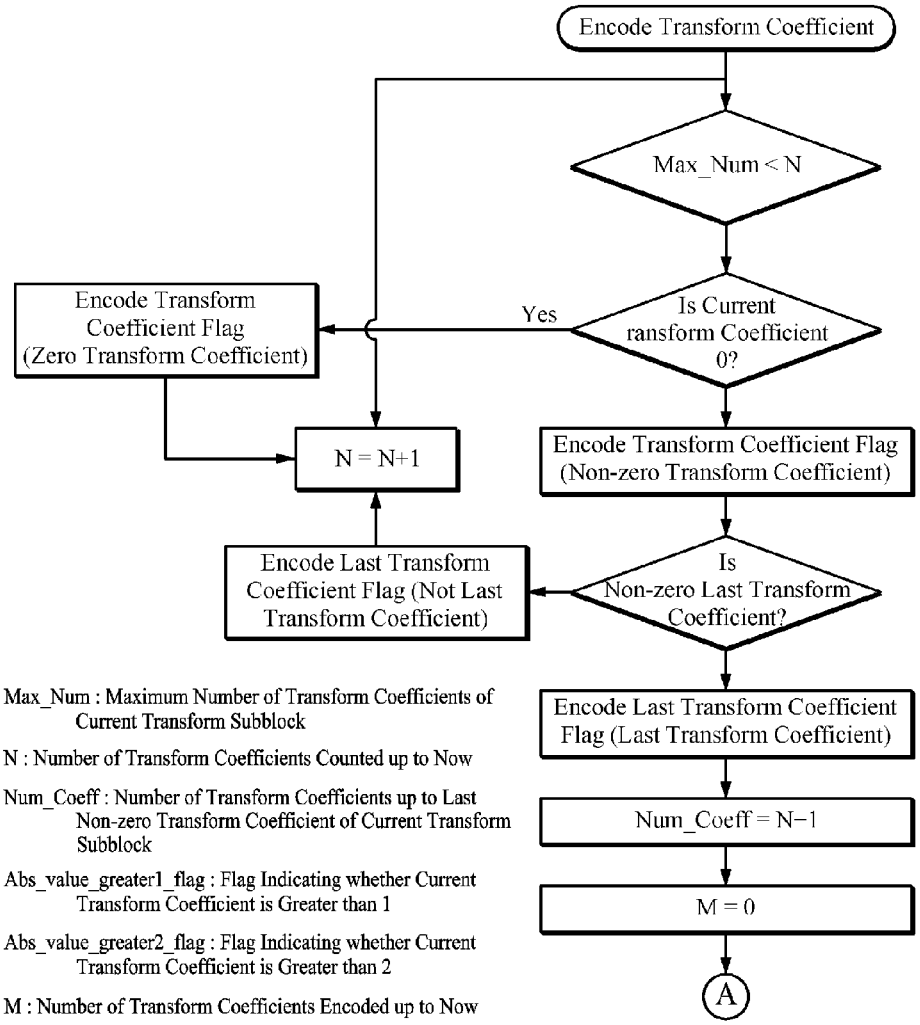
FIGS. 51A and 51B are illustration diagrams of a sequence of encoding a transform coefficient of a transform subblock according to at least one embodiment of the present disclosure.
Figure 51B:
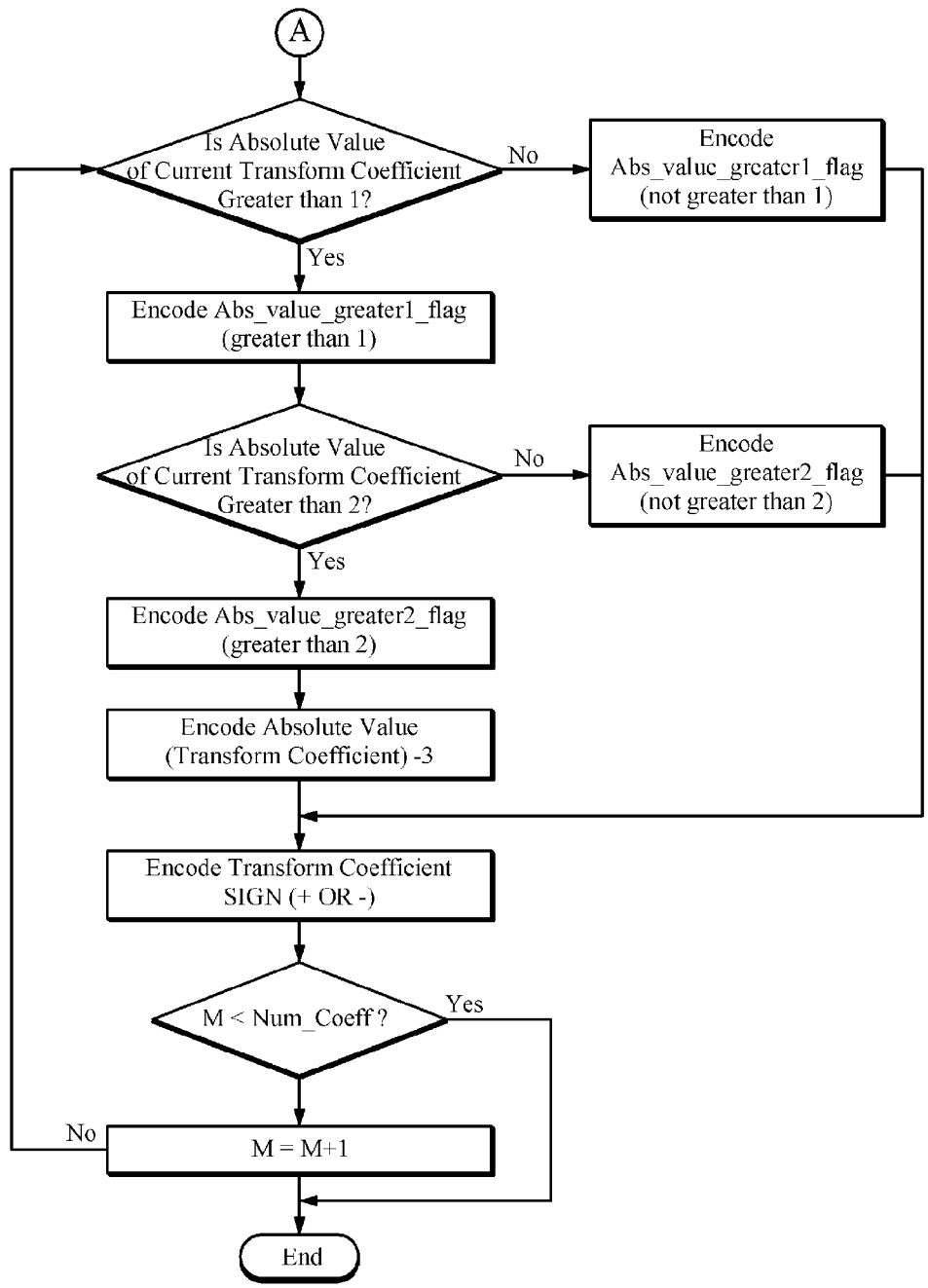

FIGS. 51A and 51B are diagrams for illustrating a sequence of encoding a transform coefficient of a transform subblock according to at least one embodiment of the present disclosure.

Referring to FIGS. 51A and 51B, a transform coefficient flag, a last transform coefficient flag, a Abs_value_greater1_flag, an Abs_value_greater2_flag, Absolute(Transform Coefficient)-3, and Transform coefficient sign (+ or −) are included. However, a syntax flow chart of a transform coefficient illustrated in FIGS. 51A and 51B is merely exemplary. That is, a portion of all of syntax of a transform coefficient may be changed, and a portion of the syntax may be omitted.

Figure 52A:
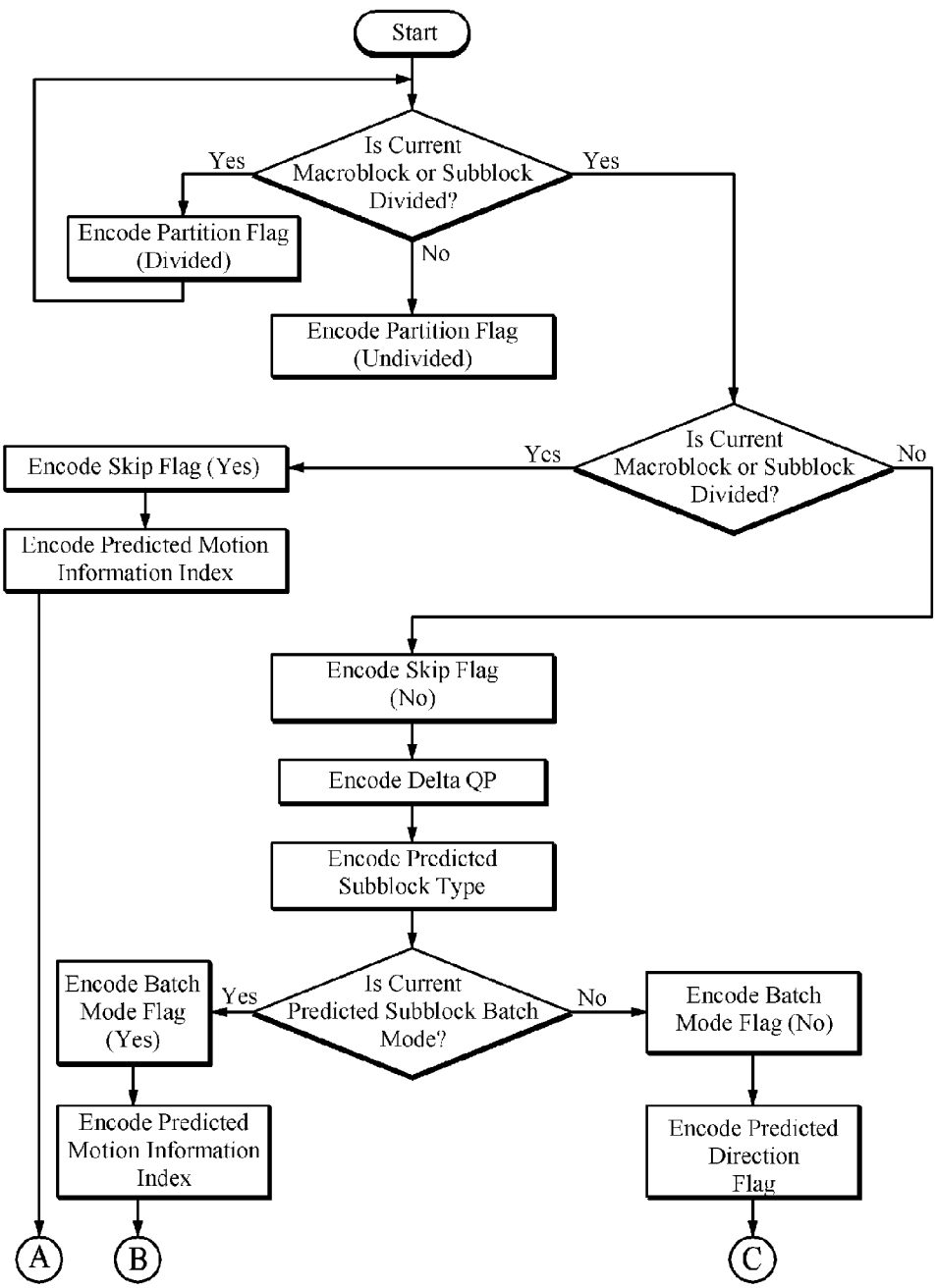
FIGS. 52A to 52C are illustration diagrams of a sequence of encoding an inter macroblock and a subblock of an inter picture according to at least one embodiment of the present disclosure.
Figure 52B:
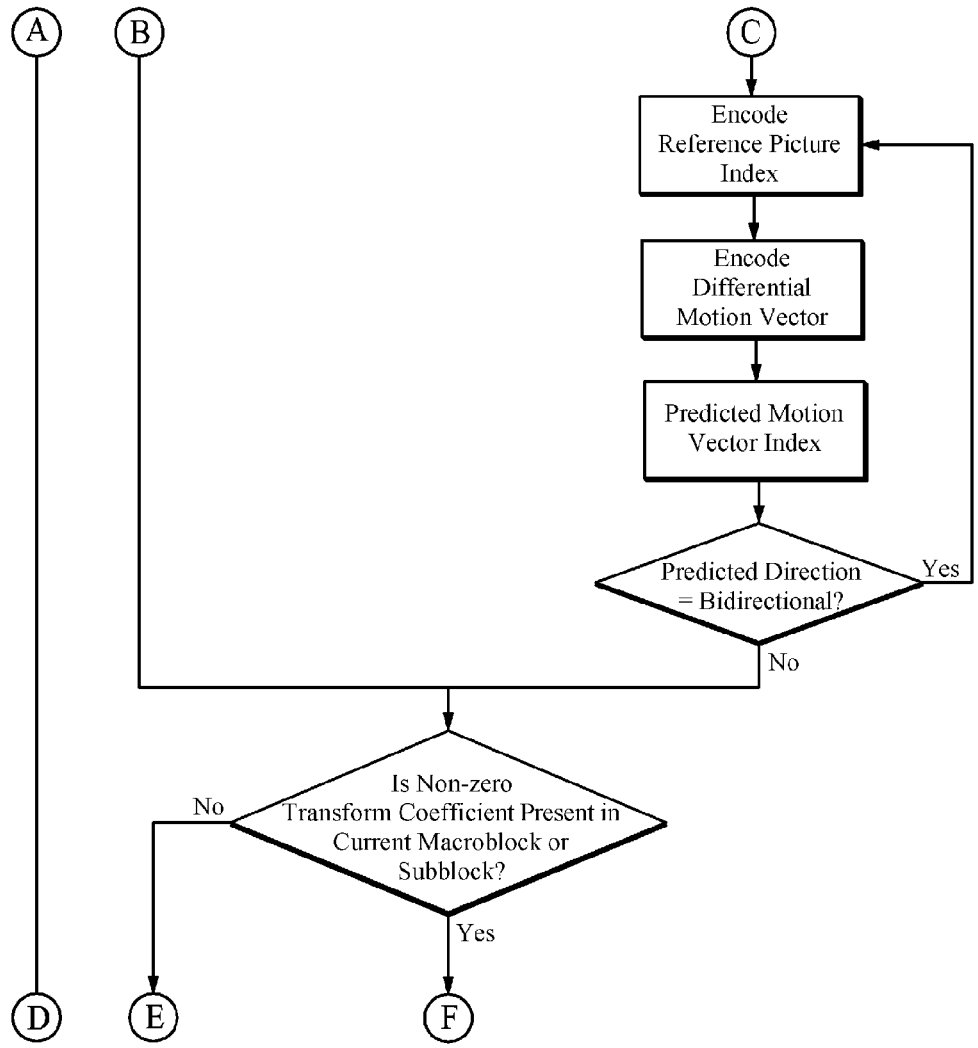
Figure 52C:
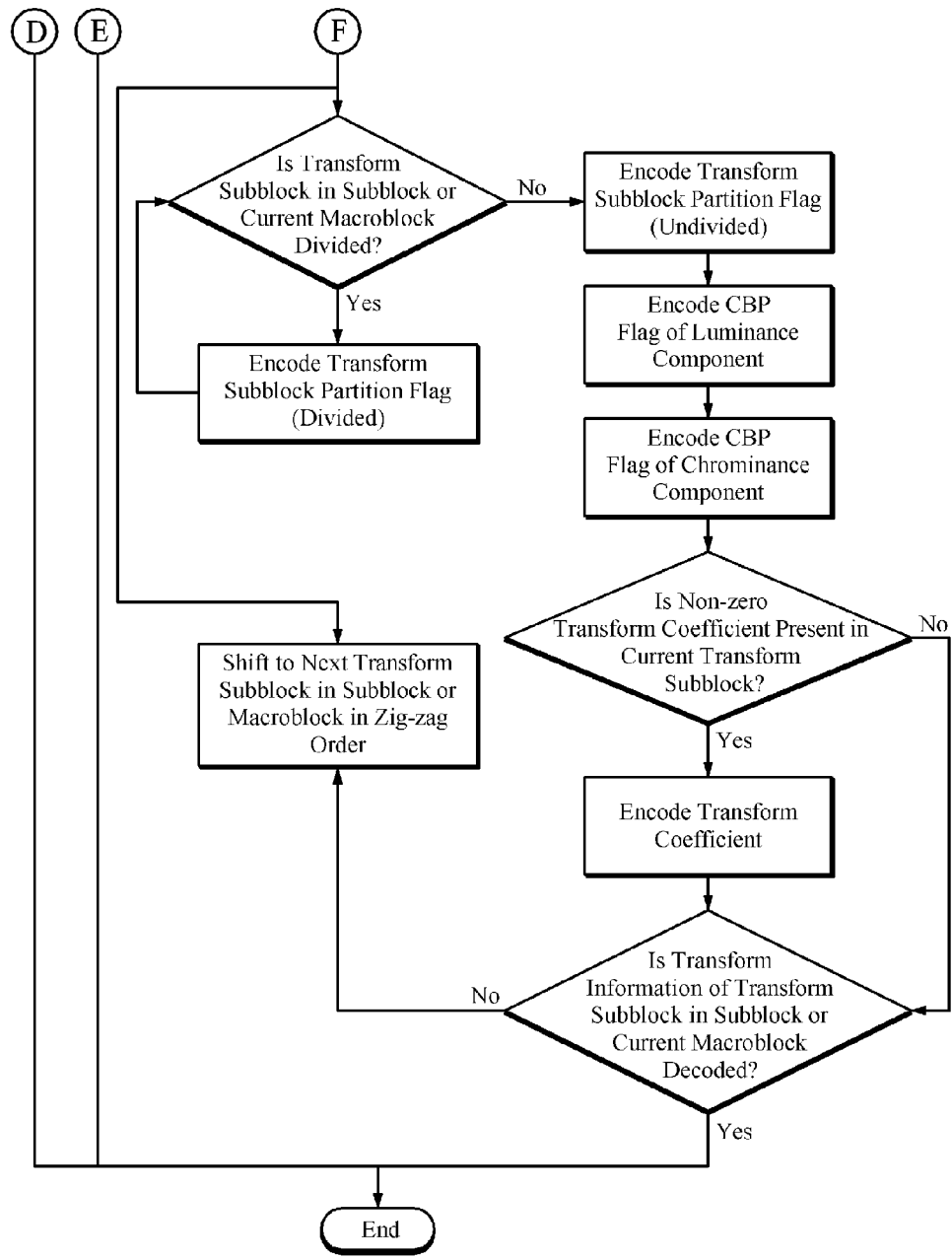

FIGS. 52A-52C are diagrams for illustrating a sequence of encoding an inter macroblock and a subblock of an inter picture according to at least one embodiment of the present disclosure.

Referring to FIGS. 52A-52C, a partition flag, a SKIP flag, a batch mode flag, a predicted motion information index, a prediction direction flag, a Delta QP, a predicted subblock type, a reference picture index, a differential motion vector, a predicted motion vector index, a transform subblock partition flag, and a CBP flag are included. However, a syntax flow chart of an inter picture illustrated in FIGS. 52A-52C are merely exemplary. That is, a portion of all of a syntax of an inter picture may be changed, and a portion of the syntax may be omitted.

A predicted subblock type of FIGS. 52A-52C represents the size of a predicted subblock in a subblock or a current macroblock and whether it is an inter prediction or an intra prediction. Herein, an inter prediction is illustrated. If it is an intra prediction, syntax after a predicted subblock type may be encoded similarly with reference to FIGS. 49A, 49B, 50A and 50B.

In addition, a transform coefficient encoding of an inter prediction may be encoded similarly with reference to FIGS. 51A and 51B. Thus a detailed description thereof will be omitted.

As in the first embodiment of the present disclosure, each syntax may use a CABAC encoding with reference to Equation 7. However, a ctx_inc for each syntax may vary according to surrounding conditions.

FIG. 53 is an illustration diagram for a ctx_inc of a batch mode flag.

For example, a batch mode flag may be CABAC-encoded with reference to FIGS. 37 and 53.

Also, a differential motion vector may be CABAC-encoded with reference to FIG. 54.

FIG. 54 is an illustration diagram for a ctx_inc of an x component of a differential motion vector.

A ctx_inc of an x component of a differential motion vector is determined by using a threshold X flag of an adjacent block as illustrated in FIG. 54. A value of a threshold X flag of an adjacent block is determined according to a predetermined threshold value and a value of an x component of a differential motion vector. For example, it is assumed that the threshold value is 9. In this case, if an absolute value of a differential motion vector x component is smaller than the threshold value '9', a value of the threshold X flag is 1; and if the absolute value is greater than 9, a value of the threshold X flag is 0. Herein, the threshold value may be selected by a user. In the case of a y component of a differential motion vector, a ctx_inc is determined in the same way as in the case of the x component of a differential motion vector.

A ctx_inc of syntax in FIG. 54 may be determined similarly as described in the first embodiment, and thus a detailed description thereof will be omitted.

According to some embodiments of the present disclosure as described above, the video compression efficiency and video reconstruction efficiency can be improved by dividing an extended macroblock into subblocks of various sizes and shapes and encoding/decoding a video by using different prediction units and transform units depending on the sizes of the subblocks.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have not been described for limiting purposes. Accordingly, the scope of the claimed invention is not to be limited by the above embodiments but by the claims and the equivalents thereof.

What is claimed is:

1. A video decoding method, comprising:
reconstructing a syntax corresponding to at least one of a first block, a second block and a third block wherein:
the first block is generated by dividing a frame for decoding,
the second block corresponds to a unit of a prediction and is generated by dividing the first block, and
the third block corresponds to a unit of transformation and is generated by dividing the first block in a tree structure; and
reconstructing a prediction block corresponding to at least one of the first block, the second block and the third block,
wherein a prediction pixel in the prediction block is generated by averaging a horizontal prediction value and a vertical prediction value,
wherein the horizontal prediction value is calculated by using a pixel adjacent to the left side of the prediction block and an upper-right pixel outside of the prediction block, and the vertical prediction value is calculated by using a pixel adjacent to the upper side of the prediction block and a low-left pixel outside of the prediction block, and
wherein the upper-right pixel outside of the prediction block is shared for calculating the horizontal prediction value of each prediction pixel in the prediction block, and
the lower-left pixel outside of the prediction block is shared for calculating the vertical prediction value of each prediction pixel in the prediction block.

2. The video decoding method of claim 1, wherein the third block is divided in the tree structure when a transform subblock partition flag is 1.

3. The video decoding method of claim 1, wherein the syntax corresponding to at least one of the first block, the second block and the third block includes a prediction mode flag for indicating that an intra prediction is performed based on the intra prediction of an adjacent block and an indication index is included in the first block if the prediction mode flag is 1.

4. A video encoding apparatus, comprising:
an encoder configured to encode a syntax corresponding to at least one of a first block, a second block and a third block, wherein
the first block is generated by dividing a frame,
the second block corresponds to a unit of a prediction and is generated by dividing the first block, and
the third block corresponds to a unit of transformation and is generated by dividing the first block in a tree structure; and
a predictor configured to generate a prediction block corresponding to at least one of the first block, the second block and the third block,
wherein a prediction pixel in the prediction block is generated by averaging a horizontal prediction value and a vertical prediction value,
wherein the horizontal prediction value is calculated by using a pixel adjacent to the left side of the prediction block and an upper-right pixel outside of the prediction block, and the vertical prediction value is calculated by using a pixel adjacent to the upper side of the prediction block and a low-left pixel outside of the prediction block, and
wherein the upper-right pixel outside of the prediction block is shared for calculating the horizontal prediction value of each prediction pixel in the prediction block, and
the low-left pixel outside of the prediction block is shared for calculating the vertical prediction value of each prediction pixel in the prediction block.

5. The video encoding apparatus of claim 4, wherein the third block is divided in the tree structure if a transform subblock partition flag is 1.

6. The video encoding apparatus of claim 4, wherein the syntax corresponding to at least one of the first block, the second block and the third block includes a prediction mode flag for indicating that an intra prediction is performed based on the intra prediction of an adjacent block and an indication index is included in the first block if the prediction mode flag is 1.

* * * * *